United States Patent
Konishi et al.

(10) Patent No.: US 10,301,401 B2
(45) Date of Patent: May 28, 2019

(54) OLEFIN POLYMERIZATION CATALYST AND METHOD FOR PRODUCING OLEFIN POLYMER

(71) Applicants: JAPAN POLYETHYLENE CORPORATION, Tokyo (JP); JAPAN POLYPROPYLENE CORPORATION, Tokyo (JP)

(72) Inventors: Yohei Konishi, Kanagawa (JP); Yasuo Maruyama, Kanagawa (JP); Naomasa Sato, Kanagawa (JP); Akio Tanna, Mie (JP)

(73) Assignees: JAPAN POLYETHYLENE CORPORATION, Tokyo (JP); JAPAN POLYPROPYLENE CORPORATION, Tokyo (JP)

( * ) Notice: Subject to any disclaimer, the term of this patent is extended or adjusted under 35 U.S.C. 154(b) by 0 days.

(21) Appl. No.: 15/328,196

(22) PCT Filed: Jul. 23, 2015

(86) PCT No.: PCT/JP2015/071016
§ 371 (c)(1),
(2) Date: Jan. 23, 2017

(87) PCT Pub. No.: WO2016/013629
PCT Pub. Date: Jan. 28, 2016

(65) Prior Publication Data
US 2017/0210830 A1    Jul. 27, 2017

(30) Foreign Application Priority Data
Jul. 24, 2014 (JP) ................. 2014-150452

(51) Int. Cl.
*C08F 4/70* (2006.01)
*C08F 4/80* (2006.01)
*C08F 4/02* (2006.01)
*C08F 10/02* (2006.01)

(52) U.S. Cl.
CPC ............ *C08F 4/80* (2013.01); *C08F 4/025* (2013.01); *C08F 10/02* (2013.01); *C08F 2410/01* (2013.01)

(58) Field of Classification Search
CPC .......... C08F 4/10; C08F 4/12; C08F 4/60065; C08F 4/7098; C08F 222/10; C08F 4/7031; C08F 4/7032
See application file for complete search history.

(56) References Cited

U.S. PATENT DOCUMENTS

| 6,897,272 B1 * | 5/2005 | Brookhart | C08F 110/02 502/11 |
| 8,618,319 B2 * | 12/2013 | Shimizu | C07F 9/5022 556/138 |
| 2005/0043541 A1 | 2/2005 | Walter et al. | |
| 2009/0326174 A1 | 12/2009 | Scott et al. | |
| 2010/0010180 A1 * | 1/2010 | Prades | C08F 10/00 526/161 |
| 2011/0213110 A1 | 9/2011 | Shimizu et al. | |
| 2011/0257351 A1 | 10/2011 | Kobayashi et al. | |

FOREIGN PATENT DOCUMENTS

| EP | 43 36 829 A1 | 5/1995 | |
| JP | H1-247405 A | 10/1989 | |
| JP | 2003048914 A | 2/2003 | |
| JP | 2007-106845 A | 4/2007 | |
| JP | 2009132898 A | 6/2009 | |
| JP | 2010077430 A | 4/2010 | |
| JP | 2010150246 A | 7/2010 | |
| JP | 2010202647 A | 9/2010 | |
| JP | 2010260913 A | 11/2010 | |
| JP | 2013-209349 A | 10/2013 | |
| WO | WO 98/56832 A1 * | 12/1998 | ............ C08F 4/70 |
| WO | 2006045740 A1 | 5/2006 | |
| WO | 2009/155509 A1 | 12/2009 | |

OTHER PUBLICATIONS

Preishuber-Pflugl et al., "Highly Active Supported Nickel Diimine Catalysts for Polymerization of Ethylene", Macromolecules, vol. 35, No. 16, 2002, pp. 6074-6076.
Wegner et al., "Gas Phase Polymerization of Ethylene with Supported α-Diimine Nickel(II) Catalysts", Macromolecules, vol. 43, No. 8, 2010, pp. 3624-3633.
Terao et al., "Ethylene/Polar Monomer Copolymerization Behavior of Bis(phenoxy-imine)Ti Complexes: Formation of Polar Monomer Copolymers", J. Am. Chem. Soc., vol. 130, No. 52, 2008, pp. 17636-17637.
Severn et al., ""Bound but Not Gagged"—Immobilizing Single-Site α-Olefin Polymerization Catalysts", Chem. Rev., vol. 105, No. 11, 2005, pp. 4073-4147.
Nakamura et al., "Coordination-Insertion Copolymerization of Fundamental Polar Monomers", Chem. Rev., vol. 109, No. 11, 2009, pp. 5215-5244.
Ittel et al., "Late-Metal Catalysts for Ethylene Homo- and Copolymerization", Chem. Rev., vol. 100, No. 4, 2000, pp. 1169-1203.
Boffa, "Copolymerization of Polar Monomers with Olefins Using Transition-Metal Complexes", Chem. Rev., vol. 100, No. 4, 2000, pp. 1479-1493.
International Search Report issued with respect to Application No. PCT/JP2015/071016, dated Oct. 20, 2015.
International Preliminary Report on Patentability issued with respect to Application No. PCT/JP2015/071016, dated Jan. 24, 2017.

(Continued)

*Primary Examiner* — Rip A Lee
(74) *Attorney, Agent, or Firm* — Greenblum & Bernstein, P.L.C.

(57) ABSTRACT

An object of the present invention is to provide a novel catalyst for olefin (co)polymer production, which has high activity without using a large amount of a cocatalyst and is aimed for obtaining a particulate olefin (co)polymer. The invention relates to an olefin polymerization catalyst which comprises: a solid carrier (1) that has been brought into contact with a specific compound; and a metal catalyst component (2) that contains a transition metal compound (C) containing a transition metal M belonging to Group 9, 10, or 11 of the periodic table and has a reactive group $R^a$.

14 Claims, No Drawings

(56) References Cited

OTHER PUBLICATIONS

European Search Report issued with respect to Application No. 15824879.9, dated May 15, 2017.
Dao Zhang et al., "Mesoporous zeolite SBA-15 supported nickel diimine catalysts for ethylene polymerization", Chinese Science Bulletin, vol. 49, 3, 2004, pp. 249-253.
Wei Wu et al., "Recent progress in immobilization of late-transition-metal complexes with diimine ligands for olefin polymerization", Chinese Science Bulletin, vol. 58, No. 15, 2013, pp. 1741-1750.
Office Action issued in CN 201580041187.2, dated Sep. 4, 2018, with English translation.
Office Action issued in EP 15 824 879.9, dated Dec. 18, 2018.
Office Action issued in JP 2015-146077, dated Jan. 8, 2019, with English translation.
Notification of the Second Office Action for CN App. No. 201580041187.2 dated Apr. 3, 2019 (w/translation).

* cited by examiner

OLEFIN POLYMERIZATION CATALYST AND METHOD FOR PRODUCING OLEFIN POLYMER

TECHNICAL FIELD

The present invention relates to an olefin polymerization catalyst, an olefin-prepolymerization catalyst, and a method for producing an olefin polymer. More specifically, it provides an olefin polymerization catalyst capable of producing a particulate olefin (co)polymer having high mechanical and thermal properties at low costs, an olefin-prepolymerization catalyst derived from the olefin polymerization catalyst, and a method for producing an olefin polymer.

BACKGROUND ART

Polymers or copolymers (hereinafter collectively referred to as "(co)polymers") of olefin(s) and copolymers of an olefin and a polar monomer play very important roles as industrial materials. In order to produce the important (co)polymers efficiently and in order to maintain plants, polymers produced in recent plants are particulate (Non-Patent Document 1). The former olefin (co)polymers are produced in a particulate state using a Ziegler catalyst and a metallocene-supported catalyst, but the production has a disadvantage that a very expensive cocatalyst (methylaluminoxane, an organoaluminum compound, or a boron compound) is used in a large amount for activating the catalyst and removing poisoning substances (e.g., see Non-Patent Document 1). Furthermore, since these polymerization catalysts are poisoned by a polar monomer, it is impossible to produce a copolymer of an olefin and a polar monomer (e.g., see Non-Patent Document 2). Similarly, in the case of polymerization of an olefin using an FI catalyst that is an early periodic transition metal catalyst, it has been reported that there is a need for a relatively large amount of the cocatalyst in order to scavenge the poisoning substance or it is only possible to produce a copolymer with a polar monomer in which the olefin portion and the polar part are relatively apart from each other (e.g., see Non-Patent Document 3).

In contrast, it has been reported that catalysts of a diimine-based complex or a bis(imino)pyridine-based complex having nickel, palladium, iron, or cobalt as a central metal, which have been recently found by Brookhart, Gibson, et al., can polymerize olefins without using any expensive cocatalyst and further can also produce a copolymer of an olefin and a polar monomer (e.g., see Non-Patent Document 4). Therefore, there have been made efforts to support the catalysts to produce particulate (co)polymers (e.g., see Non-Patent Document 1) and there is a report that a particulate polymer can be produced (e.g., Non-Patent Document 5). However, since a polymer produced from a diimine-based supported catalyst has many methyl branches, there is a report that the melting point of the polymer is low (e.g., see Non-Patent Document 6).

Compared to the diimine-based catalyst and bis(imino)pyridine-based catalyst, recently, there are reports that an olefin polymer and an olefin/polar monomer copolymer having excellent mechanical and thermal properties are produced by using a phosphine-sulfonate-based Pd catalyst or a phosphine-phenol-based catalyst (e.g., see Non-Patent Document 7 and Patent Document 1). It, however, is very difficult to support these catalysts that are neutral complexes. The activity of supported catalysts reported was also very low (e.g., see Patent Document 2).

PRIOR ART DOCUMENTS

Patent Documents

Patent Document 1: WO 2010/050256
Patent Document 2: JP-T-2011-525211 (the term "JP-T" as used herein means a published Japanese translation of a PCT patent application)

Non-Patent Documents

Non-Patent Document 1: Chem. Rev. 2005, Vol. 105, p 4073.
Non-Patent Document 2: Chem. Rev. 2000, Vol. 100, p 1479.
Non-Patent Document 3: J. Am. Chem. Soc. 2008, Vol. 130, p 17636.
Non-Patent Document 4: Chem. Rev. 2000, Vol. 100, p 1169.
Non-Patent Document 5: Macromolecules 2010, Vol. 43, p 3624.
Non-Patent Document 6: Macromolecules 2002, Vol. 35, p 6074.
Non-Patent Document 7: Chem. Rev. 2009, Vol. 109, p 5215.

SUMMARY OF THE INVENTION

Problems that the Invention is to Solve

As described above, development of an olefin (co)polymerization catalyst useful for obtaining olefin (co)polymers has been required, but the amount of a cocatalyst to be used and activity of a supported catalyst that produces particulate olefin (co)polymers are not always satisfactory. Therefore, there has been required development of a technology of an olefin (co)polymerization catalyst for obtaining a particulate olefin (co)polymer, which has high activity without using a large amount of a cocatalyst.

Under such circumstances, an object of the present invention is to provide a novel catalyst for olefin (co)polymer production for obtaining a particulate olefin (co)polymer, which has high activity without using a large amount of a cocatalyst, and a method for producing an olefin (co)polymer using the same.

Means for Solving the Problems

As a result of extensive studies, the present inventors have found a method for producing a particulate olefin (co)polymer at high activity without using a large amount of a cocatalyst by using an olefin polymerization catalyst that contains a metal catalyst component having a specific structure and a solid carrier having been subjected to a specific treatment, and thus have completed the present invention.

That is, the present invention relates to the following <1> to <13>.

<1>

An olefin polymerization catalyst comprising a solid carrier (1) and a metal catalyst component (2) shown in the following:

Solid carrier (1): a solid carrier that has been brought into contact with $M^1(OR^b)_n R^c_{3-n}$, $ZnR^b_2$, or $LiR^b$ ($M^1$ represents aluminum or boron, $R^b$ and $R^c$ each independently represent a hydrocarbon group having 1 to 20 carbon atoms, and n represents an integer of 1 to 3)

Metal catalyst component (2): a metal catalyst component that contains a transition metal compound (C) containing a transition metal M belonging to Group 9, 10, or 11 of the periodic table and has a reactive group $R^a$, wherein $R^a$ represents $OR^8$, $CO_2R^8$, $CO^2M'$, $C(O)N(R^8)_2$, $C(O)R^8$, $SR^8$, $SO_3R^8$, $P(O)(OR^8)_{2-y}(R^9)_y$, $P(OR^9)_{3-x}(R^9)_x$, $P(R^9)_2$, $NHR^8$, $N(R^8)_2$, $Si(OR^8)_{3-x}(R^8)_x$, $OSi(OR^8)_{3-x}(R^8)_x$, $SO_3M'$, $PO_3M'_2$, $PO_3M''$, $P(O)(OR^9)_2M'$, or an epoxy-containing group (where $R^8$ represents a hydrogen atom or a hydrocarbon group having 1 to 10 carbon atoms, $R^9$ represents a hydrocarbon group having 1 to 10 carbon atoms, M' represents an alkali metal, an ammonium, a quaternary ammonium, or a phosphonium, M" represents an alkaline earth metal, x represents an integer of 0 to 3, and y represents an integer of 0 to 2).

<2>

The olefin polymerization catalyst according to the <1> above, wherein the metal catalyst component (2) contains a compound represented by the following general formula (A) or (B) and the transition metal compound (C):

[Chem 1]

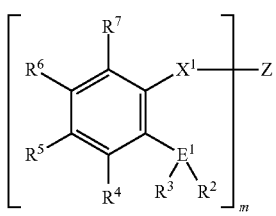

(A)

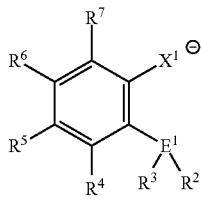

(B)

wherein Z is hydrogen or a leaving group; m represents the valence of Z; $E^1$ represents phosphorus, arsenic, or antimony; $X^1$ represents oxygen or sulfur; $R^2$ and $R^3$ each independently represent a hydrocarbon group having 1 to 30 carbon atoms which may contain a hetero atom, and may be combined with each other to form a ring; $R^4$ to $R^6$ each independently represent a hydrogen atom, a halogen atom, a hydrocarbon group having 1 to 30 carbon atoms which may contain a hetero atom, a cyano group, or a nitro group; $R^7$ represents a hydrocarbon group having 1 to 30 carbon atoms which may contain a hetero atom; and at least one of $R^2$ to $R^7$ is necessarily a substituent containing a reactive group represented by the general formula (I)]

-Q-$R^a$ (I)

wherein Q represents a hydrocarbon group having 1 to 20 carbon atoms which may contain a hetero atom, $R^a$ represents $OR^8$, $CO_2R^8$, $CO^2M'$, $C(O)N(R^8)_2$, $C(O)R^8$, $SR^8$, $SO_3R^8$, $P(O)(OR^8)_{2-y}(R^9)_y$, $P(OR^9)_{3-x}(R^9)_x$, $P(R^9)_2$, $NHR^8$, $N(R^8)_2$, $Si(OR^8)_{3-x}(R^8)_x$, $OSi(OR^8)_{3-x}(R^8)_x$, $SO_3M'$, $PO_3M'_2$, $PO_3M''$, $P(O)(OR^9)_2M'$, or an epoxy-containing group (where $R^8$ represents a hydrogen atom or a hydrocarbon group having 1 to 10 carbon atoms, $R^9$ represents a hydrocarbon group having 1 to 10 carbon atoms, M' represents an alkali metal, an ammonium, a quaternary ammonium, or a phosphonium, M" represents an alkaline earth metal, x represents an integer of 0 to 3, and y represents an integer of 0 to 2).

<3>

The olefin polymerization catalyst according to the <1> or <2> above, which is obtained by bringing the metal catalyst component (2) into contact with the solid carrier (1).

<4>

The olefin polymerization catalyst according to the <2> above, which is obtained by bringing a mixture resulting from contact between the compound represented by the general formula (A) or (B) and the solid carrier (1) in contact with the transition metal compound (C).

<5>

The olefin polymerization catalyst according to any one of the <1> to <4> above, wherein the metal catalyst component (2) contains a metal complex represented by the following general formula (D):

[Chem 2]

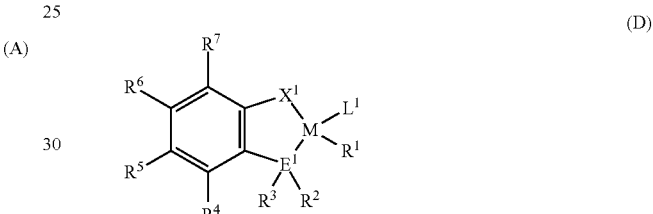

(D)

wherein M is a transition metal belonging to Group 9, 10, or 11 of the periodic table; $E^1$ represents phosphorus, arsenic, or antimony; $X^1$ represents oxygen or sulfur; $L^1$ represents a ligand coordinated to M, $R^1$ represents a hydrogen atom or a hydrocarbon group having 1 to 20 carbon atoms which may contain a hetero atom; also, $L^1$ and $R^1$ may be combined with each other to form a ring; $R^2$ and $R^3$ each independently represent a hydrocarbon group having 1 to 30 carbon atoms which may contain a hetero atom and may be combined with each other to form a ring; $R^4$ to $R^6$ each independently represent a hydrogen atom, a halogen atom, a hydrocarbon group having 1 to 30 carbon atoms which may contain a hetero atom, a cyano group, or a nitro group; and $R^7$ represents a hydrocarbon group having 1 to 30 carbon atoms which may contain a hetero atom, provided that at least one of $R^2$ to $R^7$ is necessarily a substituent containing a reactive group represented by the general formula (I)]

-Q-$R^a$ (I)

wherein Q represents a hydrocarbon group having 1 to 20 carbon atoms which may contain a hetero atom, $R^a$ represents $OR^8$, $CO_2R^8$, $CO^2M'$, $C(O)N(R^8)_2$, $C(O)R^8$, $SR^8$, $SO_3R^8$, $P(O)(OR^8)_{2-y}(R^9)_y$, $P(OR)_{3-x}(R^9)_x$, $P(R^9)_2$, $NHR^8$, $N(R^8)_2$, $Si(OR^8)_{3-x}(R^8)_x$, $OSi(OR^8)_{3-x}(R^8)_x$, $SO_3M'$, $PO_3M'_2$, $PO_3M''$, $P(O)(OR^9)_2M'$, or an epoxy-containing group (where $R^8$ represents a hydrogen atom or a hydrocarbon group having 1 to 10 carbon atoms, $R^9$ represents a hydrocarbon group having 1 to 10 carbon atoms, M' represents an alkali metal, an ammonium, a quaternary ammonium, or a phosphonium, M" represents an alkaline earth metal, x represents an integer of 0 to 3, and y represents an integer of 0 to 2).

<6>
The olefin polymerization catalyst according to any one of the <1> to <5> above, wherein the transition metal M is nickel, palladium, platinum, cobalt, or rhodium.
<7>
The olefin polymerization catalyst according to any one of the <1> to <6> above, wherein the solid carrier (1) is either an inorganic oxide or a polymer carrier.
<8>
The olefin polymerization catalyst according to any one of the <1> to <7> above, wherein $R^a$ is $OR^8$, $CO_2R^8$, $C(O)N(R^8)_2$, $C(O)R^8$, $SR^8$, $P(R^9)_2$, $NHR^8$, $N(R^8)_2$, or $Si(OR^8)_{3-x}(R^8)_x$, (where $R^8$ represents a hydrogen atom or a hydrocarbon group having 1 to 10 carbon atoms, $R^9$ represents a hydrocarbon group having 1 to 10 carbon atoms, and x represents an integer of 0 to 3).
<9>
An olefin-prepolymerization catalyst wherein the olefin polymerization catalyst according to any one of the <1> to <8> above is prepolymerized with an α-olefin.
<10>
The olefin-prepolymerization catalyst according to the <9> above, wherein the prepolymerization is carried out in the presence of a Lewis base.
<11>
The olefin-prepolymerization catalyst according to the <9> or <10>, wherein the α-olefin is ethylene or propylene.
<12>
A method for producing an olefin polymer, which comprises homopolymerizing or copolymerizing an olefin having 2 or more carbon atoms in the presence of the olefin polymerization catalyst or olefin-prepolymerization catalyst according to any one of the <1> to <11> above.
<13>
A method for producing an olefin/(meth)acrylate ester copolymer, which comprises copolymerizing an olefin having 2 or more carbon atoms and a (meth)acrylate ester in the presence of the olefin polymerization catalyst or olefin-prepolymerization catalyst according to any one of the <1> to <11> above.

Advantage of the Invention

In the present invention, since it is possible to produce a particulate olefin (co)polymer at high activity without using a large amount of an expensive cocatalyst, an olefin (co)polymer can be produced at low costs.

Modes for Carrying Out the Invention

The present invention is an olefin polymerization catalyst comprising a solid carrier that has been brought into contact with $M^1(OR^b)_nR^c_{3-n}$, $ZnR^b_2$, or $LiR^b$ and a metal catalyst component that contains a transition metal compound containing a transition metal M belonging to Group 9, 10, or 11 of the periodic table and has a reactive group $R^a$ and is an olefin-prepolymerization catalyst wherein the polymerization catalyst is prepolymerized. Moreover, the invention is a method for producing a polymer of an olefin having 2 or more carbon atoms and a method for producing an α-olefin/(meth)acrylate ester copolymer by copolymerizing an olefin having 2 or more carbon atoms and a (meth)acrylate ester, which are performed in the presence of the polymerization catalyst or the pre-polymerization catalyst.

Hereinafter, constituent monomers of the polymers, polymerization catalysts, production methods, and the like will be described in detail.

Incidentally, in the following description, the term "polymerization" means collectively homopolymerization of one kind of monomer and copolymerization of plural kinds of monomers, and both cases are described simply as "polymerization", in the case where both cases especially need not to be distinguished. Moreover, "(meth)acrylic acid" means acrylic acid or methacrylic acid.

1. Constituent Monomer of Copolymer

The olefin polymerization catalyst according to the invention is suitably used at the time of homopolymerization or copolymerization using an α-olefin (a) as a monomer or at the time of copolymerization of an α-olefin (a) and a (meth)acrylate ester (b).

(a) α-Olefin.

The component (a) in the present invention is an α-olefin represented by the general formula: $CH_2=CHR^{11}$. Here, $R^{11}$ is a hydrogen atom or a hydrocarbon group having 1 to 20 carbon atoms, which may have a branch, a ring and/or an unsaturated bond. When the carbon number of $R^{11}$ is larger than 20, sufficient polymerization activity tends to be less expressed. For this reason, among them, as a preferable component (a), there is mentioned the α-olefin in which $R^{11}$ is a hydrogen atom or a hydrocarbon group having 1 to 10 carbon atoms.

As further preferable components (a), there are mentioned ethylene, propylene, 1-butene, 1-pentene, 1-hexene, 1-octene, 1-decene, 3-methyl-1-butene, 4-methyl-1-pentene, vinylcyclohexene, and styrene. Incidentally, a single component (a) may be used or a plurality of components (a) may be used in combination.

(b) (Meth)Acrylate Ester

The component (b) in the present invention is a (meth) acrylate represented by the general formula $CH_2=C(R^{12})CO_2(R^{13})$. Here, $R^{12}$ is a hydrogen atom or a hydrocarbon group having 1 to 10 carbon atoms, which may have a branch, a ring, and/or an unsaturated bond. $R^{13}$ is a hydrocarbon group having 1 to 30 carbon atoms, which may have a branch, a ring, and/or an unsaturated bond. Furthermore, $R^{13}$ may contain a hetero atom at any position therein.

When the carbon number of $R^{12}$ is 11 or more, sufficient polymerization activity tends to be less expressed. Therefore, $R^{12}$ is a hydrogen atom or a hydrocarbon group having 1 to 10 carbon atoms and, as a preferable component (b), there is mentioned a (meth)acrylate ester in which $R^{12}$ is a hydrogen atom or a hydrocarbon group having 1 to 5 carbon atoms. As a more preferable component (b), there is mentioned a methacrylate ester in which $R^{12}$ is a methyl group or an acrylate ester in which $R^{12}$ is a hydrogen atom. Similarly, when the carbon number of $R^{13}$ is larger than 30, polymerization activity tends to be lowered. Therefore, the carbon number of $R^{13}$ is 1 to 30, but $R^{13}$ has preferably 1 to 12 carbon atoms, and further preferably 1 to 8 carbon atoms.

In addition, the hetero atom which may be contained in $R^{13}$ includes oxygen, sulfur, selenium, phosphorus, nitrogen, silicon, fluorine, boron, and the like. Of these hetero atoms, oxygen, silicon, and fluorine are preferable, and oxygen is further preferable. Moreover, $R^{13}$ containing no hetero atom is also preferable.

As further preferable components (b), there are mentioned methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, hydroxyethyl (meth)

acrylate, dimethylaminoethyl (meth)acrylate, diethylaminoethyl (meth)acrylate, 2-aminoethyl (meth)acrylate, 2-methoxyethyl (meth)acrylate, 3-methoxypropyl (meth)acrylate, glycidyl (meth)acrylate, ethyleneoxide (meth)acrylate, trifluoromethyl (meth)acrylate, 2-trifluoromethylethyl (meth)acrylate, perfluoroethyl (meth)acrylate, (meth)acrylamide, (meth)acryldimethyl amide, 2-hydroxybutyl (meth)acrylate, 4-hydroxybutyl (meth)acrylate, and the like. Incidentally, a single component (b) may be used or a plurality of components (b) may be used in combination.

2. Solid Carrier

The solid carrier is a solid carrier composed of an inorganic or organic compound and having a particle diameter of usually 5 μm or more, preferably 10 μm and usually 5 mm or less, preferably 2 mm or less.

As a usable carrier, any carrier can be used so long as the carrier does not impair the gist of the present invention.

Generally, inorganic oxides and polymer carriers can be suitably used. Specifically, as the carrier, there are mentioned $SiO_2$, $Al_2O_3$, MgO, $ZrO_2$, $TiO_2$, $B_2O_3$, CaO, ZnO, BaO, $ThO_2$, and the like, or mixtures thereof, and also, mixed oxides such as $SiO_2$—$Al_2O_3$, $SiO_2$—$V_2O_5$, $SiO_2$—$TiO_2$, $SiO_2$—MgO, and $SiO_2$—$Cr_2O_3$ can be used. Inorganic silicates, polyethylene carriers, polypropylene carriers, polystyrene carriers, polyacrylic acid carriers, polymethacrylic acid carriers, polyacrylate ester carriers, polyester carriers, polyamide carriers, polyimide carriers, and the like can be used. As for these carriers, particle diameter, particle diameter distribution, pore volume, specific surface area, and the like are not particularly limited, and any carrier can be used.

As the inorganic silicates, clay, clay mineral, zeolite, diatomaceous earth, and the like can be used. For these substances, synthetic materials may be used or naturally occurring minerals may be used. Specific examples of the clay and clay mineral include allophane group such as allophane; kaoline group such as dickite, nacrite, kaolinite, and anorchisite; halloysite group such as metahalloysite and halloysite; serpentine group such as chrysotile, lizardite, and antigorite; smectites such as montmorillonite, zaukonite, beidellite, nontronite, saponite, and hectorite; vermiculite minerals such as vermiculite; mica minerals such as illite, sericite, and glauconite; attapulgite; sepiolite; palygorskite; bentnite; Kibushi clay; Gaerome clay; hisingerite; pyrophyllite; chlorite group; and the like. These substances may form a mixed layer.

Artificially synthesized ones include synthetic mica, synthetic hectorite, synthetic saponite, synthetic taeniolite, and the like.

Among these specific examples, preferable ones include kaoline group such as dickite, nacrite, kaolinite, and anorchisite; halloysite group such as metahalloysite and halloysite; serpentine group such as chrysotile, lizardite, and antigorite; smectites such as montmorillonite, zaukonite, beidellite, nontronite, saponite, and hectorite; vermiculite minerals such as vermiculite; mica minerals such as illite, sericite, and glauconite; synthetic mica; synthetic hectorite; synthetic saponite; and synthetic taeniolite. Particularly preferable ones include smectites such as montmorillonite, zaukonite, beidellite, nontronite, saponite, and hectorite; vermiculite minerals such as vermiculite; synthetic mica; synthetic hectorite; synthetic saponite; and synthetic taeniolite.

These carriers may be used as they are, or may be subjected to an acid treatment with hydrochloric acid, nitric acid, sulfuric acid, and the like, and/or a salt treatment with LiCl, NaCl, KCl, $CaCl_2$, $MgCl_2$, $Li_2SO_4$, $MgSO_4$, $ZnSO_4$, $Ti(SO_4)_2$, $Zr(SO_4)_2$, $Al_2(SO_4)_3$, and the like. Said treatment may be carried out after the corresponding acid and base are mixed to form a salt in the reaction system. In addition, shape control such as pulverization or granulation and/or a drying treatment may be conducted.

3. $M^1(OR^b)_nR^c_{3-n}$, $ZnR^b_2$, or $LiR^b$ Treatment

The polymerization catalyst of the invention contains a solid carrier (1) where the solid carrier has been brought into contact with $M^1(OR^b)_nR^c_{3-n}$, $ZnR^b_2$, or $LiR^b$. $M^1$ represents aluminum or boron, $R^b$ aryl $R^c$ each independently represents a hydrocarbon group having 1 to 20 carbon atoms and n represents an integer of 1 to 3.

In specific $R^b$ and $R^c$, a hydrocarbon group having 1 to 20 carbon atoms is preferably an alkyl group, a cycloalkyl group, an alkenyl group, or an aryl group.

Here, examples of the alkyl group and the cycloalkyl group include a methyl group, an ethyl group, a propyl group, an isopropyl group, a butyl group, an isobutyl group, a t-butyl group, a pentyl group, a hexyl group, a heptyl group, an octyl group, a nonyl group, a decyl group, a tricyclohexylmethyl group, a 1,1-dimethyl-2-phenylethyl group, a 1,1-dimethylpropyl group, a 1,1,2-trimethylpropyl group, a 1,1-diethylpropyl group, 1-phenyl-2-propyl group, a 1,1-dimethylbutyl group, a 2-pentyl group, a 3-pentyl group, a 2-hexyl group, a 3-hexyl group, a 2-ethylhexyl group, a 2-heptyl group, a 3-heptyl group, a 4-heptyl group, a 2-propylheptyl, a 2-octyl group, a 3-nonyl group, a cyclopropyl group, a cyclobutyl group, a cyclopentyl group, a methylcyclopentyl group, a cyclohexyl group, a methylcyclohexyl group, a cycloheptyl group, a cyclooctyl group, a cyclododecyl group, a 1-adamantyl group, a 2-adamantyl group, an exo-norbornyl group, an end-norbornyl, a 2-bicyclo[2.2.2]octyl group, a norpinanyl group, a decahydronaphthyl group, a menthyl group, a neomenthyl group, a neopentyl group, a 5-decyl, and the like.

Of these, preferable substituents include a methyl group, an ethyl group, a propyl group, a butyl group, an isobutyl group, a pentyl group, and an octyl group.

The alkenyl group includes a vinyl group, an ally group, a butenyl group, a cinnamyl group, and a styryl group.

The aryl group includes a phenyl group, a naphthyl group, an anthracenyl group, and a fluorenyl group, and examples of the substituents which may be present on the aromatic rings of these aryl groups are an alkyl group, an aryl group, a fused aryl group, a phenylcyclohexyl group, a phenylbutenyl group, a tolyl group, a xylyl group, a p-ethylphenyl group, and the like. Of these, a preferable substituent is a phenyl group.

Among these specific examples, particularly preferable substituents are a methyl group, an ethyl group, an isopropyl group, a butyl group, and a phenyl group. These are illustrative ones and it is obvious that the substituents are not limited thereto.

Specific examples of preferable $M^1(OR^b)_nR^c_{3-n}$ include $AlMe_2BHT$, $AlMeBHT_2$, $AlEt_2BHT$, $AlEtBHT_2$, $AliPr_2BHT$, $AliPrBHT_2$, $AlBu_2BHT$, $AlBuBHT_2$, $AlEt_2(OEt)$, $AlEt(OEt)_2$, $AlEt(OiPr)_2$, $AlEt_2(OiPr)$, $AlBu_2(OEt)$, $AlBu(OEt)_2$, $AlBu_2(OiPr)$, $AlBu(OiPr)_2$, $Al(OMe)_3$, $Al(OEt)_3$, $Al(OiPr)_3$, $Al(OBu)_3$, $B(OMe)_3$, $B(OEt)_3$, $B(OBu)_3$, and the like.

In addition, specific examples of preferable $ZnR^b_2$ include $ZnMe_2$, $ZnEt_2$, $ZnBu_2$, and the like.

Furthermore, specific examples of preferable $LiR^b$ include LiMe, LiBu, LiPh, and the like.

Here, Me represents a methyl group, Et represents an ethyl group, iPr represents an isopropyl group, Bu represents a butyl group (n-butyl group, isobutyl group), and BHT represents 2,6-di-t-butyl-4-methylphenolate group.

By using the solid carrier (1) where a solid carrier has been brought into contact with $M^1(OR^b)_nR^c_{3-n}$, $ZnR^b_2$, or $LiR^b$, on the solid carrier (1), it becomes possible to support the metal catalyst component (2) having a reactive group $R^a$ onto the solid carrier (1) through substitution of the functional group on the solid carrier surface with another functional group by the contact or physical adsorption of the compound, which has been brought into contact, onto the solid carrier surface, so that the case is preferable. In the case where $M^1(OR^b)_nR^c_{3-n}$, $ZnR^b_2$, or $LiR^b$ has not been brought into contact, the functional group on the surface of the solid carrier (1) does not have a sufficient property for supporting the metal catalyst component (2) and thus the support of the metal catalyst component (2) is impossible or becomes insufficient.

It is considered that the solid carrier (1) which has been brought into contact with $M^1(OR^b)_nR^c_{3-n}$, $ZnR^b_2$, or $LiR^b$ has various states, for example, a case where the functional group on the solid carrier surface is substituted with another substituent by a chemical reaction with the compound that has been brought into contact, a case where the compound that has been brought into contact is physically adsorbed on the solid carrier surface, and the like, so that it is difficult to specify the structure of the solid carrier (1) unequivocally after the contact.

4. Polymerization Catalyst

The catalyst of the invention contains the above solid carrier (1) and the metal catalyst component (2) to be mentioned later.

In particular, a polymerization catalyst obtained by bringing the metal catalyst component (2) into contact with the solid carrier (1) is preferable. Moreover, there is preferable a polymerization catalyst obtained by bringing a mixture resulting from contact between a coordinative compound having a reactive group $R^a$ that constitutes the metal catalyst component (2) and the solid carrier (1) into contact with the transition metal compound (C) that constitutes the metal catalyst component (2), and it is more preferable to bring a compound represented by the general formula (A) or (B) as the compound having the reactive group $R^a$ into contact with the solid carrier (1).

By bringing the metal catalyst component (2) or the coordinative compound having the reactive group $R^a$ and the transition metal compound (C) which constitute the metal catalyst component (2) into contact with the solid carrier (1), there are considered a case where the functional group on the surface of the solid carrier (1) is substituted with another substituent by a chemical reaction with the metal catalyst component (2) or the coordinative compound that has been brought into contact, a case where the metal catalyst component (2) or the coordinative compound is physically adsorbed onto the surface of the solid carrier (1), and the like, so that it is difficult to specify the structure of the solid carrier (1) unequivocally after the contact.

The contact method between the metal catalyst component (2) and the solid carrier (1) is not particularly limited. The contact may be performed not only at the time of preparing the catalyst but also at the prepolymerization or polymerization of the olefin having 2 or more carbon atoms.

Furthermore, the contact order of individual components is not particularly limited.

That is, (1) after the coordinative compound having the reactive group $R^a$ is brought into contact with the transition metal compound (C), the resulting one may be brought into contact with the solid carrier (1) that has been brought into contact with $M^1(OR^b)_nR^c_{3-n}$, $ZnR^b_2$, or $LiR^b$, (2) after the solid carrier (1) that has been brought into contact with $M^1(OR^b)_nR^c_{3-n}$, $ZnR^b_2$, or $LiR^b$ is brought into contact with the coordinative compound having the reactive group $R^a$, the transition metal compound (C) may be brought into contact therewith, (3) after the coordinative compound having the reactive group $R^a$ is brought into contact with the transition metal compound (C), $M^1(OR^b)_nR^c_{3-n}$, $ZnR^b_2$, or $LiR^b$ and the solid carrier may be brought into contact simultaneously, (4) after the coordinative compound having the reactive group $R^a$ is brought into contact with the transition metal compound (C) and a metal complex represented by the general formula (D) is isolated, the resulting one may be brought into contact with $M^1(OR^b)_nR^c_{3-n}$, $ZnR^b_2$, or $LiR^b$.

Incidentally, as an example of the coordinative compound having the reactive group $R^a$, there may be mentioned the compound represented by the general formula (A) or (B) to be described later.

Moreover, at or after the contact of individual catalyst components, a polymer of an olefin having 2 or more carbon atoms or a solid of an inorganic oxide such as silica or alumina may be made co-present or brought into contact.

Furthermore, at or after the contact of individual catalyst components, a Lewis base to be mentioned later may be made co-present or brought into contact.

Contact pressure and time are not particularly limited and a polymerization catalyst can be obtained under a pressure ranging from increased pressure to reduced pressure for a time ranging from 1 second to 24 hours.

The contact may be performed in an inactive gas such as nitrogen or may be carried out in an inactive hydrocarbon solvent such as pentane, hexane, heptane, toluene, or xylene. These solvents are preferably used after they are subjected to an operation of removing poisoning substances such as water and sulfur compounds. As a contact temperature, the contact is performed at a temperature ranging from −20° C. to the boiling point of the solvent used, particularly it is preferable to perform it at a temperature ranging from room temperature to the boiling temperature of the solvent.

The use ratio of the catalyst components is not particularly limited. But, in the case where an ion-exchangeable layered compound excluding a silicate salt or an inorganic silicate salt is used as a cocatalyst component, preferable results are obtained in view of polymerization activity and the like by setting the ratio so that the transition metal compound becomes 0.0001 to 10 mmol, preferably 0.001 to 5 mmol, $M^1(OR^b)_nR^c_{3-n}$, $ZnR^b_2$, or $LiR^b$ becomes 0 to 10,000 mmol, preferably 0.01 to 100 mmol per g of the cocatalyst component. Moreover, it is preferable to control the ratio of the transition metal M in the transition metal compound (C) to $M^1$, Zn, or Li in $M^1(OR^b)_nR^c_{3-n}$, or $ZnR^b_2$, or $LiR^b$ becomes 1:0.1 to 100, preferably 1:0.5 to 50 in terms of a molar ratio, similarly in view of polymerization activity and the like.

The amount of the Lewis base is 0.0001 to 1,000 equivalents, preferably 0.1 to 100 equivalents, and further preferably 0.3 to 30 equivalents, relative to the transition metal M in the catalyst component.

The thus obtained catalyst may be used after washed with an inactive hydrocarbon solvent such as n-pentane, n-hexane, n-heptane, toluene, or xylene or may be used without washing.

At the washing, according to need, aforementioned $M^1(OR^b)_nR^c_{3-n}$, $ZnR^b_2$, or $LiR^b$ may be newly used in combination. The amount of $M^1(OR^b)_nR^c_{3-n}$, $ZnR^b_2$, or $LiR^b$ to be used on this occasion is preferably an amount so that the ratio of $M^1$, Zn, or Li in $M^1(OR^b)_nR^c_{3-n}$, $ZnR^b_2$, or $LiR^b$ to the transition metal M in the transition metal compound (C) becomes 1:0.1 to 100 in terms of a molar ratio.

Moreover, an olefin polymer may be produced via an olefin-prepolymerization catalyst obtained by prepolymerizing the obtained catalyst with an α-olefin. That is, the olefin-prepolymerization catalyst is obtained by preliminary polymerizing the obtained catalyst with an α-olefin. The pre-polymerization catalyst may be washed according to need. The prepolymerization may be carried out in an inactive gas such as nitrogen in an inactive hydrocarbon solvent such as n-pentane, n-hexane, n-heptane, toluene, or xylene. Furthermore, the α-olefin to be used has preferably low molecular weight and specifically, ethylene or propylene is preferred.

Furthermore, at the time of prepolymerization of the olefin polymerization catalyst, with incorporating a Lewis base to be mentioned later, the catalyst may be preliminarily polymerized with the α-olefin in the presence of the Lewis base. The obtained prepolymerization catalyst can be used for the production of the olefin polymer after washing according to need.

Incidentally, the structure of the olefin-prepolymerization catalyst after prepolymerization contains a polymer formed by the prepolymerization as a part of the catalyst component as compared to the structure before the prepolymerization, but it is difficult to define the structure unequivocally. The polymerization catalyst or the polymerization catalyst component can be macro-analyzed as the constituent components, for example, contained metal components, polymer species formed by the prepolymerization, and the like. On the other hand, such micro structures that the prepolymerization selectively proceeds at what portions or partial structures and as a result, the prepolymerization polymers are present locally at what catalyst portions can take various forms and thus it is difficult to define the forms of the micro structures specifically by the use of the current analytical techniques.

5. Metal Catalyst Component

The metal catalyst component (2) to be used in the invention contains a transition metal compound (C) containing a transition metal M belonging to Group 9, 10, or 11 of the periodic table and has a reactive group $R^a$.

The metal catalyst component (2) may contain a transition metal compound (C) containing a transition metal M and a compound containing a reactive group $R^a$, may contain a compound containing a transition metal M and having a reactive group $R^a$, or may be a mixture thereof.

The metal catalyst component (2) that has a reactive group $R^a$ and contains a transition metal compound (C) containing a transition metal M belonging to Group 9, 10, or 11 of the periodic table can be obtained by bringing the coordinative compound having the reactive group $R^a$ and the transition metal compound (C).

As the coordinative compound having the reactive group $R^a$ is preferably compounds represented by the general formula (A) or (B) and compounds represented by the following general formulae (E), (F), and (G). They are illustrative and it is obvious that the coordinative compound is not limited thereto.

[Chem 3]

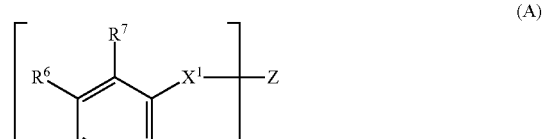

(A)

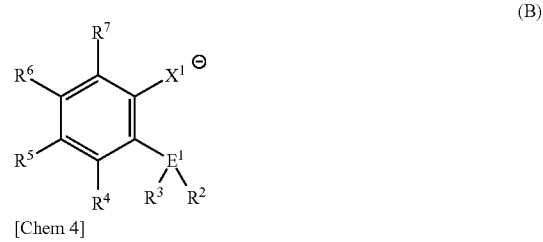

(B)

[Chem 4]

(E)

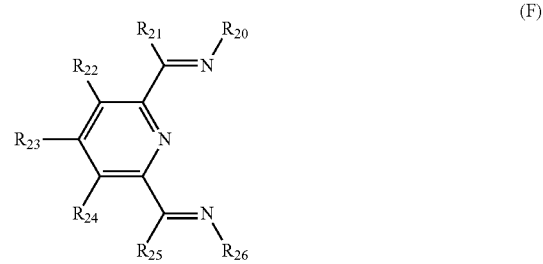

(F)

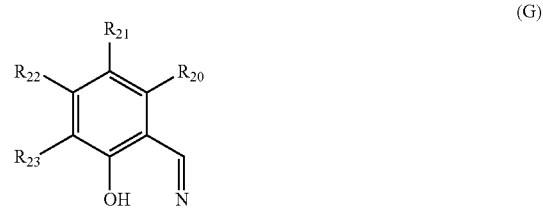

(G)

The compounds represented by the general formula (A) or (B) will be mentioned later.

In the general formulae (E), (F), and (G), $R^{20}$ to $R^{26}$ each independently represent a hydrogen atom, a halogen atom, a hydrocarbon group having 1 to 30 carbon atoms which may contain a hetero atom, a cyano group, or a nitro group. At least one of $R^{20}$ to $R^{26}$ is necessarily a substituent containing a reactive group represented by the general formula (I):

-Q-$R^a$ (I).

In $R^{20}$ to $R^{26}$, preferable specific examples of the halogen atom are fluorine, chlorine, and bromine. Of these, further preferable substituent is chlorine.

In $R^{20}$ to $R^{26}$, as the hetero atom of the hydrocarbon group having 1 to 30 carbon atoms which may contain a hetero atom, oxygen, nitrogen, phosphorus, sulfur, selenium, silicon, fluorine, and boron may be mentioned. Among these hetero atoms, oxygen, nitrogen, sulfur, and silicon are preferred. Moreover, as hetero-atom-containing groups containing the hetero atom, oxygen-containing groups include an alkoxy group, an aryloxy group, an acyl group, an aroyl group, and a carboxylate group; nitrogen-containing groups include an amino group and an amide group; sulfur-containing groups include a thioalkoxy group and a thioaryloxy group; phosphorus-containing substituents include a phosphino group; selenium-containing groups include a selenyl group; silicon-containing groups include a trialkylsilyl group, a dialkylarylsilyl group, and an alkyldiarylsilyl group; fluorine-containing groups include a fluoroalkyl group and a fluoroaryl group; and boron-containing groups include an alkylboron group and an arylboron group.

As specific examples of the hetero atom-containing group, the oxygen-containing groups can include a methoxy group, an ethoxy group, an n-propoxy group, an isopropoxy group, an n-butoxy group, a t-butoxy group, a phenoxy group, a p-methylphenoxy group, a p-methoxyphenoxy group, an acetyl group, a benzoyl group, an acetoxy group, an ethylcarboxylate group, a t-butylcarboxylate group, a phenylcarboxylate group, and the like.

The nitrogen-containing groups can include a dimethylamino group, a diethylamino group, a di-n-propylamino group, a dicyclohexylamino group, and the like.

The sulfur-containing groups can include a thiomethoxy group, a thioethoxy group, a thio-n-propoxy group, a thio-isopropoxy group, a thio-n-butoxy group, a thio-t-butoxy group, a thiophenoxy group, a p-methylthiophenoxy group, a p-methoxythiophenoxy group, and the like.

The phosphorus-containing groups can include a dimethylphosphino group, a diethylphosphino group, a di-n-propylphosphino group, a dicyclohexylphosphino group, and the like.

The selenium-containing groups can include a methylselenyl group, an ethylselenyl group, an n-propylselenyl group, an n-butylselenyl group, a t-butylselenyl group, a phenylselenyl group, and the like.

In $R^{20}$ to $R^{26}$, the hydrocarbon group having 1 to 30 carbon atoms is preferably an alkyl group, a cycloalkyl group, an alkenyl group, or an aryl group.

Here, examples of the alkyl group and the cycloalkyl group include a methyl group, an ethyl group, a propyl group, an isopropyl group, a butyl group, an isobutyl group, a t-butyl group, a pentyl group, a hexyl group, a heptyl group, an octyl group, a nonyl group, a decyl group, a tricyclohexylmethyl group, a 1,1-dimethyl-2-phenylethyl group, a 1,1-dimethylpropyl group, a 1,1,2-trimethylpropyl group, a 1,1-diethylpropyl group, 1-phenyl-2-propyl group, a 1,1-dimethylbutyl group, a 2-pentyl group, a 3-pentyl group, a 2-hexyl group, a 3-hexyl group, a 2-ethylhexyl group, a 2-heptyl group, a 3-heptyl group, a 4-heptyl group, a 2-propylheptyl, a 2-octyl group, a 3-nonyl group, a cyclopropyl group, a cyclobutyl group, a cyclopentyl group, a methylcyclopentyl group, a cyclohexyl group, a methylcyclohexyl group, a cycloheptyl group, a cyclooctyl group, a cyclododecyl group, a 1-adamantyl group, a 2-adamantyl group, an exo-norbornyl group, an end-norbornyl, a 2-bicyclo[2.2.2]octyl group, a norpinanyl group, a decahydronaphthyl group, a menthyl group, a neomenthyl group, a neopentyl group, a 5-decyl, and the like.

Of these, preferable substituents include an isopropyl group, an isobutyl group, and a cyclohexyl group.

The alkenyl group includes a vinyl group, an allyl group, a butenyl group, a cinnamyl group, and a styryl group.

The aryl group includes a phenyl group, a naphthyl group, an anthracenyl group, and a fluorenyl group, and examples of the substituents which may be present on the aromatic rings of these aryl groups, an alkyl group, an aryl group, a fused aryl, a phenylcyclohexyl group, a phenylbutenyl group, a tolyl group, a xylyl group, a p-ethylphenyl group, and the like. Of these, a preferred substituent is a phenyl group.

Among these specific examples, particularly preferred substituents are a methyl group, an ethyl group, and a phenyl group and particularly preferred is a methyl group. These are illustrative ones and it is obvious that the substituents are not limited thereto.

In the general formula (I), Q represents a hydrocarbon group having 1 to 20 carbon atoms which may contain a hetero atom, $R^a$ represents $OR^8$, $CO_2R^8$, $CO_2M'$, $C(O)N(R^8)_2$, $C(O)R^8$, $SR^8$, $SO_3R^8$, $P(O)(OR^8)_{2-y}(R^9)_y$, $P(OR^9)_{3-x}(R^9)_x$, $P(R^9)_2$, $NHR^8$, $N(R^8)_2$, $Si(OR^8)_{3-x}(R^8)_x$, $OSi(OR^8)_{3-x}(R^8)_x$, $SO_3M$, $PO_3M'_2$, $PO_3M''$, $P(O)(OR^9)_2M'$, or an epoxy-containing group (where $R^8$ represents a hydrogen atom or a hydrocarbon group having 1 to 10 carbon atoms, $R^9$ represents a hydrocarbon group having 1 to 10 carbon atoms, M' represents an alkali metal, an ammonium, a quaternary ammonium, or a phosphonium, M" represents an alkaline earth metal, x represents an integer of 0 to 3, and y represents an integer of 0 to 2).

In the general formula (I), Q represents a hydrocarbon group having 1 to 20 carbon atoms which may contain a hetero atom. Q is a divalent group and one of two bonds of Q is bonded to $R^a$.

When examples of Q are specifically mentioned, as hydrocarbon groups, —$CH_2$—, —$CH_2$—$CH_2$—, and —$(CH_2)_3$— may be mentioned.

As ones to be mentioned as a hetero atom, an oxygen atom, a sulfur atom, and a nitrogen atom may be mentioned, and as hydrocarbons which may contain an oxygen atom, there may be mentioned —$CH_2$—O—$CH_2$—, —$CH_2$—(O—$CH_2$)$_2$—, —$CH_2$—(O—$CH_2$)$_3$—, —$CH_2$—O—$CH_2CH_2$—, —$CH_2$—(O—$CH_2CH_2$)$_2$—, —$CH_2$—O—$CH_2CH_2CH_2$—, —$CH_2CH_2$—O—$CH_2$—, —$CH_2CH_2$—O—$CH_2CH_2$—, and —$CH_2CH_2$—O—$CH_2CH_2CH_2$—.

Moreover, as hydrocarbons which may contain a sulfur atom, there may be mentioned —$CH_2$—S—$CH_2CH_2$—, —$CH_2$—(S—$CH_2CH_2$)$_2$, —$CH_2CH_2$—S—$CH_2CH_2$—, and —$CH_2$—S—$CH_2CH_2CH_2$—.

Furthermore, as hydrocarbon groups which may contain a nitrogen atom, there may be mentioned —$CH_2$—N($CH_3$)—$CH_2CH_2$—, —$CH$—(N($CH_3$)—$CH_2CH_2$)$_2$—, —$CH_2CH_2$—N($CH_3$)—$CH_2CH_2$—, and —$CH_2$—N($CH_3$)—$CH_2CH_2CH_2$—.

For being supported on the carrier, it is considered that an adequate length is necessary for Q and, as preferable Q, there may be mentioned hydrocarbon groups of —$CH_2$—$CH_2$— and —$(CH_2)_3$—, —$CH_2$—O—$CH_2CH_2$—, —$CH_2$—O—$CH_2CH_2CH_2$—, —$CH_2CH_2$—O—$CH_2CH_2$—, and —$CH_2CH_2$—O—$CH_2CH_2CH_2$—.

Moreover, as hydrocarbons which may contain a sulfur atom, there may be mentioned —$CH_2$—S—$CH_2CH_2$—, —$CH_2CH_2$—S—$CH_2CH_2$—, and —$CH_2$—S—$CH_2CH_2CH_2$—.

Furthermore, as hydrocarbon groups which may contain a nitrogen atom, there may be mentioned —$CH_2$—N($CH_3$)—$CH_2CH_2$—, —$CH_2CH_2$—N($CH_3$)—$CH_2CH_2$—, and —$CH_2$—N($CH_3$)—$CH_2CH_2CH_2$—.

From the viewpoints of synthesis of the ligand and synthesis of the complex component, as further preferable Q, there may be mentioned hydrocarbon groups of —$CH_2$—$CH_2$— and —$(CH_2)_3$—, —$CH_2$—O—$CH_2CH_2$—, and —$CH_2$—O—$CH_2CH_2CH_2$—. Moreover, as hydrocarbons which may contain a sulfur atom, there may be mentioned —$CH_2$—S—$CH_2CH_2$— and —$CH_2CH_2$—S—$CH_2CH_2$—.

Furthermore, as hydrocarbon groups which may contain a nitrogen atom, there may be mentioned —$CH_2$—N($CH_3$)—$CH_2CH_2$—.

$R^a$ represents $OR^8$, $CO_2R^8$, $CO_2M'$, $C(O)N(R^8)_2$, $C(O)R^8$, $SR^8$, $SO_3R^8$, $P(O)(OR^8)_{2-y}(R^9)_y$, $P(OR^9)_{3-x}(R^9)_x$, $P(R^9)_2$, $NHR^8$, $N(R^8)_2$, $Si(OR^8)_{3-x}(R^8)_x$, $OSi(OR^8)_{3-x}(R^8)_x$, $SO_3M$, $PO_3M'_2$, $PO_3M''$, $P(O)(OR^9)_2M'$, or an epoxy-containing group (where $R^8$ represents a hydrogen atom or a hydrocarbon group having 1 to 10 carbon atoms, $R^9$ represents a hydrocarbon group having 1 to 10 carbon atoms, M' represents an alkali metal, an ammonium, a quaternary ammonium, or a phosphonium, M'' represents an alkaline earth metal, x represents an integer of 0 to 3, and y represents an integer of 0 to 2).

Of these, in consideration of the synthesis of the ligand and the complex, preferable $R^a$ includes $OR^8$, $CO_2R^8$, $C(O)N(R^8)_2$, $C(O)R^8$, $SR^8$, $P(R^9)_2$, $NHR^8$, $N(R^8)_2$, or $Si(OR^8)_{3-x}(R^8)_x$ (where $R^8$ represents a hydrogen atom or a hydrocarbon group having 1 to 10 carbon atoms, $R^9$ represents a hydrocarbon group having 1 to 10 carbon atoms, and x represents an integer of 0 to 3).

Specific structures of $R^a$ (Me=methyl group, Et=ethyl group, Ph=phenyl group) include —OH, —OMe, —$CO_2H$, —$CO_2Me$, —C(=O)$NMe_2$, —CHO, —C(=O)Me, —SH, —SMe, —$PPh_2$, —$NH_2$, —$NMe_2$, and —Si(OMe)$_3$.

Specific structures of the general formula (I) include —$CH_2CH_2OH$, —(CH$_2$)$_3$OH, —$CH_2OCH_2CH_2OH$, —$CH_2OCH_2CH_2CH_2OH$, —$CH_2CH_2OMe$, —(CH$_2$)$_3$OMe, —$CH_2OCH_2CH_2OMe$, —$CH_2OCH_2CH_2CH_2OMe$, —$CH_2CH_2CO_2H$, —(CH$_2$)$_3CO_2H$, —$CH_2OCH_2CH_2CO_2H$, —$CH_2OCH_2CH_2CH_2CO_2H$, —$CH_2CH_2CO_2Me$, —(CH$_2$)$_3CO_2Me$, —$CH_2OCH_2CH_2CO_2Me$, —$CH_2OCH_2CH_2CH_2CO_2Me$, —$CH_2CH_2CONMe_2$, —(CH$_2$)$_3CONMe_2$, —$CH_2OCH_2CH_2CONMe_2$, —$CH_2OCH_2CH_2CH_2CONMe_2$, —$CH_2CH_2CHO$, —(CH$_2$)$_3CHO$, —$CH_2CH_2COMe$, —(CH$_2$)$_3COMe$, —$CH_2OCH_2CH_2COMe$, —$CH_2CH_2CHO$, —(CH$_2$)$_3CHO$, —$CH_2CH_2SH$, —(CH$_2$)$_3SH$, —$CH_2SCH_2CH_2SH$, —$CH_2(SCH_2CH_2)_2SH$, —$CH_2CH_2SCH_2CH_2SH$, —$CH_2CH_2SMe$, —(CH$_2$)$_3SMe$, —$CH_2SCH_2CH_2SMe$, —$CH_2CH_2SCH_2CH_2SMe$, —$CH_2CH_2PPh_2$, —(CH$_2$)$_3PPh_2$, —$CH_2OCH_2CH_2PPh_2$, —$CH_2OCH_2CH_2CH_2PPh_2$, —$CH_2CH_2NH_2$, —(CH$_2$)$_3NH_2$, —$CH_2N(CH_3)CH_2CH_2NH_2$, —$CH_2CH_2NMe_2$, —(CH$_2$)$_3NMe_2$, —$CH_2N(CH_3)CH_2CH_2NMe_2$, —$CH_2CH_2Si(OME)_3$, and —(CH$_2$)$_3Si(OMe)_3$.

Of these, preferable ones include —$CH_2CH_2OH$, —(CH$_2$)$_3$OH, —$CH_2OCH_2CH_2OH$, —$CH_2CH_2OMe$, —(CH$_2$)$_3$OMe, —$CH_2CH_2CO_2H$, —(CH$_2$)$_3CO_2H$, —$CH_2OCH_2CH_2CO_2H$, —$CH_2OCH_2CH_2CH_2CO_2H$, —$CH_2CH_2CO_2Me$, —(CH$_2$)$_3CO_2Me$, —$CH_2OCH_2CH_2CO_2Me$, —$CH_2OCH_2CH_2CH_2CO_2Me$, —$CH_2CH_2CONMe_2$, —(CH$_2$)$_3CONMe_2$, —$CH_2OCH_2CH_2CONMe_2$, —$CH_2OCH_2CH_2CONMe_2$, —$CH_2CH_2CHO$, —(CH$_2$)$_3CHO$, —$CH_2CH_2COMe$, —(CH$_2$)$_3COMe$, —$CH_2OCH_2CH_2COMe$, —$CH_2CH_2SH$, —(CH$_2$)$_3SH$, —$CH_2SCH_2CH_2SH$, —$CH_2(SCH_2CH_2)_2SH$, —$CH_2CH_2$—$SCH_2CH_2SH$, —$CH_2CH_2PPh_2$, —(CH$_2$)$_3PPh_2$, —$CH_2OCH_2CH_2PPh_2$, —$CH_2OCH_2CH_2CH_2PPh_2$, —$CH_2CH_2NH_2$, —(CH$_2$)$_3NH_2$, —$CH_2N(CH_3)CH_2CH_2NH_2$, —$CH_2CH_2Si(OMe)_3$, and —(CH$_2$)$_3Si(OMe)_3$.

Further preferable ones include —(CH$_2$)$_3$OH, —$CH_2OCH_2CH_2OH$, —$CH_2CH_2CO_2Me$, —(CH$_2$)$_3CO_2Me$, —$CH_2CH_2CONMe_2$, —(CH$_2$)$_3CONMe_2$, —$CH_2CH_2COMe$, —(CH$_2$)$_3COMe$, —$CH_2CH_2Si(OMe)_3$, and —(CH$_2$)$_3Si(OMe)_3$.

At least one of $R^{20}$ to $R^{26}$ is necessarily a substituent containing a reactive group represented by the general formula (I).

Moreover, the metal catalyst component (2) to be used in the invention preferably contains the compound represented by the general formula (A) or (B) and the transition metal compound (C) containing a transition metal M belonging to Group 9, 10, or 11 of the periodic table and more preferably can be obtained by bringing these compounds into contact with each other.

[Chem 5]

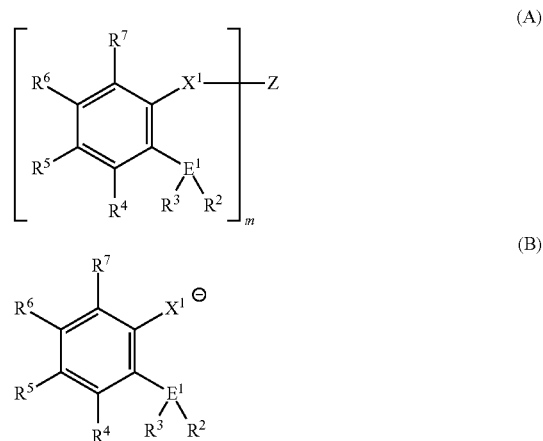

In the general formula (A) or (B), Z is a hydrogen atom or a leaving group and specifically can include a hydrogen atom, an $R^{14}SO_2$ group (wherein $R^{14}$ is a hydrocarbon group having 1 to 20 carbon atoms and specifically, a methyl group, a phenyl group, or a p-tolyl group may be mentioned), a $CF_3SO_2$ group, and the like.

Though the general formula (B) is shown in a form of an anion, as the counter cation thereof, any cation can be used, so long as the cation does not inhibit the reaction with the transition metal complex (C) of the invention.

Specifically, the counter cation can include an ammonium ($NH_4^+$), a quaternary ammonium ($R^{15}_4N^+$), or a phosphonium ($R^{16}_4P^+$) and metal ions of Group 1 to 14 of the periodic table.

Of these cations, preferred are $NH_4^+$, $R^{15}_4N^+$ (wherein $R^{15}$ is a hydrocarbon group having 1 to 20 carbon atoms and four $R^{15}$s may be the same or different from each other), $R^{16}_4P^+$ (wherein $R^{16}$ is a hydrocarbon group having 1 to 20 carbon atoms and four $R^{16}$s may be the same or different from each other), $Li^+$, $Na^+$, $K^+$, $Mg^{2+}$, $Ca^{2+}$, and $Al^{3+}$, and further preferred are $R^{15}_4N^+$ (wherein $R^{15}$ is as aforementioned, and four $R^{15}$s may be the same or different from each other), $Li^+$, $Na^+$, and $K^+$.

In the general formula (A) or (B), $X^1$ represents an oxygen atom or a sulfur atom. Of these, an oxygen atom is preferable. In addition, in the general formula (A) or (B), $E^1$ represents a phosphorus atom, an arsenic atom, or an antimony atom. Of these, a phosphorus atom is preferable.

In the general formula (A) or (B), $R^2$ and $R^3$ each independently represent a hydrocarbon group having 1 to 30 carbon atoms which may contain a hetero atom and may be combined with each other to form a ring. $R^2$ and $R^3$ are located in the neighborhood of the transition metal M, and have interaction with the transition metal M sterically and/or electronically. In order to have such effect, $R^2$ and $R^3$ are preferably bulky. $R^2$ and $R^3$ have preferably 3 to 30 carbon atoms, and more preferably 6 to 30 carbon atoms.

More specific structures of $R^2$ and $R^3$ each independently include a hydrogen atom or a linear hydrocarbon group which may contain a hetero atom, a branched linear hydrocarbon group which may contain a hetero atom, an alicyclic hydrocarbon group which may contain a hetero atom, and an aryl group which may contain a hetero atom. As described above, since bulky $R^2$ and $R^3$ is preferable, an alicyclic hydrocarbon group which may contain a hetero atom or an aryl group which may contain a hetero atom is preferable, and an aryl group which may contain a hetero atom is most preferable. Such an aryl group includes a phenyl group, a naphthyl group, an anthracenyl group, and the like. Of these, a phenyl group and a naphthyl group are preferable and a phenyl group is particularly preferable.

In $R^2$ and $R^3$, as the hetero atom contained in the hetero atom-containing group, oxygen, nitrogen, phosphorus, sulfur, selenium, silicon, fluorine, and boron are mentioned. As the hetero atom contained in the aforementioned hetero atom-containing group, the one capable of coordinating to a transition metal is preferable. Specific examples of such a hetero atom-containing group containing a hetero atom capable of coordinating to a transition metal include the following groups.

That is, the oxygen-containing groups can include alkoxy groups such as a methoxy group, an ethoxy group, an n-propoxy group, an isopropoxy group, an n-butoxy group, and a t-butoxy group, aryloxy groups such as a phenoxy group, a p-methylphenoxy group, and a p-methoxyphenoxy group, acyl groups such as an acetyl group and a benzoyl group, carboxylate groups such as an acetoxy group, an ethylcarboxylate group, a t-butylcarboxylate group, and a phenylcarboxylate group, and the like.

The nitrogen-containing groups can include dialkylamino groups such as a dimethylamino group, a diethylamino group, a di-n-propylamino group, and a dicyclohexylamino group, and the like.

The sulfur-containing groups can include thioalkoxy groups such as a thiomethoxy group, a thioethoxy group, a thio-n-propoxy group, a thioisopropoxy group, a thio-n-butoxy group, a thio-t-butoxy group, and a thiophenoxy group, thioaryloxy groups such as a p-methylthiophenoxy group and a p-methoxythiophenoxy group, and the like.

The phosphorus-containing groups can include dialkylphosphino groups such as a dimethylphosphino group, a diethylphosphino group, a di-n-propylphosphino group, and a dicyclohexylphosphino group, and the like.

The selenium-containing groups can include selenyl groups such as a methylselenyl group, an ethylselenyl group, an n-propylselenyl group, an n-butylselenyl group, a t-butylselenyl group, and a phenylselenyl group, and the like.

Of these, preferable ones are alkoxy groups such as a methoxy group, an ethoxy group, an n-propoxy group, an isopropoxy group, an n-butoxy group, and a t-butoxy group, aryloxy groups such as a phenoxy group, a p-methylphenoxy group, and a p-methoxyphenoxy group, dialkylamino groups such as a dimethylamino group, a diethylamino group, a di-n-propylamino group, and a cyclohexylamino group, thioalkoxy groups such as a thiomethoxy group, a thioethoxy group, a thio-n-propoxy group, a thioisopropoxy group, a thio-n-butoxy group, a thio-t-butoxy group, and a thiophenoxy group, and thioaryloxy groups such as a p-methylthiophenoxy group and a p-methoxythiophenoxy group, and further preferable ones are alkoxy groups such as a methoxy group, an ethoxy group, an n-propoxy group, an isopropoxy group, an n-butoxy group, and a t-butoxy group and aryloxy groups such as a phenoxy group, a p-methylphenoxy group, and a p-methoxyphenoxy group.

In $R^2$ and $R^3$, when the aforementioned hetero atom-containing group is bonded to an aromatic skeleton of these aryl groups, as for bonding mode, the hetero atom-containing group may be bonded directly to the aromatic skeleton, or may be bonded to the aromatic skeleton via a spacer like a methylene group. Incidentally, in the case where the hetero atom-containing group is bonded to an aromatic skeleton via a methylene group, the number of the methylene group is preferably one. Moreover, as for the position of substitution, in the aromatic skeletons of $R^2$ and $R^3$, an ortho-position to the carbon bonded to $E^1$ is preferable. By controlling the bonding mode to such a manner, the hetero atom in $R^2$ and $R^3$ can take a spatial configuration so as to have an interaction with M.

Specific examples of preferable $R^2$ and $R^3$ include a 2,6-dimethoxyphenyl group, a 2,4,6-trimethoxyphenyl group, a 4-methyl-2,6-dimethoxyphenyl group, a 4-t-butyl-2,6-dimethoxyphenyl group, a 1,3-dimethoxy-2-naphthyl group, a 2,6-diethoxyphenyl group, a 2,4,6-triethoxyphenyl group, a 4-methyl-2,6-diethoxyphenyl group, a 4-t-butyl-2,6-diethoxyphenyl group, a 1,3-diethoxy-2-naphthyl group, a 2,6-diisopropoxyphenyl group, a 2,4,6-triisopropoxyphenyl group, a 4-methyl-2,6-diisopropoxyphenyl group, a 4-t-butyl-2,6-diisopropoxyphenyl group, a 1,3-diisopropoxy-2-naphthyl group, a 2,6-diphenoxyphenyl group, a 2,4,6-triphenoxyphenyl group, a 4-methyl-2,6-diphenoxyphenyl group, a 4-t-butyl-2,6-diphenoxyphenyl group, a 1,3-diphenoxy-2-naphthyl group, a 2,6-di(methoxymethyl)phenyl group, a 2,4,6-tri(methoxymethyl)phenyl group, a 4-methyl-2,6-di(methoxymethyl)phenyl group, a 4-t-butyl-2,6-di(methoxymethyl)phenyl group, a 1,3-di(methoxymethyl)-2-naphthyl group, a 2,6-di(ethoxymethyl)phenyl group, a 2,4,6-tri(ethoxymethyl)phenyl group, a 4-methyl-2,6-di(ethoxymethyl)phenyl group, a 4-t-butyl-2,6-di(ethoxymethyl)phenyl group, a 1,3-di(ethoxymethyl)-2-naphthyl group, a 2,6-di(isopropoxymethyl)phenyl group, a 2,4,6-tri(isopropoxymethyl)phenyl group, a 4-methyl-2,6-di(isopropoxymethyl)phenyl group, a 4-t-butyl-2,6-di(isopropoxymethyl)phenyl group, a 1,3-di(isopropoxymethyl)-2-naphthyl group, a 2,6-di(phenoxymethyl)phenyl group, a 2,4,6-tri(phenoxymethyl)phenyl group, a 4-methyl-2,6-di(phenoxymethyl)phenyl group, a 4-t-butyl-2,6-di(phenoxymethyl)phenyl group, a 1,3-di(phenoxymethyl)-2-naphthyl group, and the like.

Of these, preferable ones include a 2,6-dimethoxyphenyl group, a 2,4,6-trimethoxyphenyl group, a 4-methyl-2,6-dimethoxyphenyl group, a 4-t-butyl-2,6-dimethoxyphenyl group, a 2,6-diethoxyphenyl group, a 2,4,6-triethoxyphenyl group, a 4-methyl-2,6-diethoxyphenyl group, a 4-t-butyl-2,6-diethoxyphenyl group, a 2,6-diisopropoxyphenyl group, a 2,4,6-triisopropoxyphenyl group, a 4-methyl-2,6-diisopropoxyphenyl group, a 4-t-butyl-2,6-diisopropoxyphenyl group, a 2,6-diphenoxyphenyl group, a 2,4,6-triphenoxyphenyl group, a 4-methyl-2,6-diphenoxyphenyl group, a 4-t-butyl-2,6-diphenoxyphenyl group, a 2,6-di(methoxymethyl)phenyl group, a 2,4,6-tri(methoxymethyl)phenyl group, a 4-methyl-2,6-di(methoxymethyl)phenyl group, a 4-t-butyl-2,6-di(methoxymethyl)phenyl group, a 2,6-di(ethoxymethyl)phenyl group, a 2,4,6-tri(ethoxymethyl)phenyl group, a 4-methyl-2,6-di(ethoxymethyl)phenyl group, a 4-t-butyl-2,6-di(ethoxymethyl)phenyl group, a 2,6-di(isopropoxymethyl)phenyl group, a 2,4,6-tri(isopropoxymethyl)

phenyl group, a 4-methyl-2,6-di(isopropoxymethyl)phenyl group, a 4-t-butyl-2,6-di(isopropoxymethyl)phenyl group, a 2,6-di(phenoxymethyl)phenyl group, a 2,4,6-tri(phenoxymethyl)phenyl group, a 4-methyl-2,6-di(phenoxymethyl)phenyl group, and a 4-t-butyl-2,6-di(phenoxymethyl)phenyl group. Particularly preferable ones include a 2,6-dimethoxyphenyl group, a 2,4,6-trimethoxyphenyl group, a 4-methyl-2,6-dimethoxyphenyl group, a 4-t-butyl-2,6-dimethoxyphenyl group, a 2,6-diethoxyphenyl group, a 2,4,6-triethoxyphenyl group, a 4-methyl-2,6-diethoxyphenyl group, a 4-t-butyl-2,6-diethoxyphenyl group, a 2,6-diisopropoxyphenyl group, a 2,4,6-triisopropoxyphenyl group, a 4-methyl-2,6-diisopropoxyphenyl group, a 4-t-butyl-2,6-diisopropoxyphenyl group, a 2,6-diphenoxyphenyl group, a 2,4,6-triphenoxyphenyl group, a 4-methyl-2,6-diphenoxyphenyl group, and a 4-t-butyl-2,6-diphenoxyphenyl group.

In the general formula (A) or (B), $R^4$ to $R^6$ each independently represent a hydrogen atom, a halogen atom, a hydrocarbon group having 1 to 30 carbon atoms which may contain a hetero atom, a cyano group, or a nitro group. In $R^4$ to $R^6$, the hetero atom contained in the hetero atom-containing group includes oxygen, silicon, and fluorine.

Of these, preferable ones include a hydrogen atom, a halogen atom such as a fluorine atom, a chlorine atom, or a bromine atom, an alkyl group such as a methyl group, an ethyl group, or an isopropyl group, an aryl group such as a phenyl group, a perfluoroalkyl group such as a trifluoromethyl group, a perfluoroaryl group such as a pentafluorophenyl group, a trialkylsilyl group such as a trimethylsilyl group, an alkoxy group such as a methoxy group and an ethoxy group, an aryloxy group such as a phenoxy group, a cyano group, a nitro group, and the like. Particularly preferable ones include a hydrogen atom, a fluorine atom, a methyl group, a phenyl group, a trifluoromethyl group, a pentafluorophenyl group, a trimethylsilyl group, a cyano group, a nitro group, and the like.

In the general formula (A) or (B), $R^7$ represents a hydrocarbon group having 1 to 30 carbon atoms which may contain a hetero atom. As for $R^7$, a bulky group is preferable because more bulky one tends to give a polymer having higher molecular weight. Therefore, although the carbon number of $R^7$ is 1 to 30, it is preferably 3 to 30. Specific examples of $R^7$ include, as hydrocarbon groups, an isopropyl group, an isobutyl group, a t-butyl group, a phenyl group, a 1-naphthyl group, a 2-naphthyl group, a 1-anthracenyl group, a 2-anthracenyl group, a 9-anthracenyl group, a 4-t-butylphenyl group, a 2,4-di-t-butylphenyl group, a 9-fluorenyl group, and a cyclohexyl group; and as hetero atom-containing hydrocarbon groups, a trimethylsilyl group, a triethylsilyl group, a tri-n-propylsilyl group, a triphenylsilyl group, a 2,6-difluorophenyl group, a 2,4,6-trifluorophenyl group, a pentafluorophenyl group, and a carbazole group; and the like.

Of these, as preferable $R^7$, there may be mentioned a t-butyl group, a phenyl group, a 1-anthracenyl group, a 2-anthracenyl group, a 9-anthracenyl group, a 4-t-butylphenyl group, a 2,4-di-t-butylphenyl group, a 9-fluorenyl group, a cyclohexyl group, a trimethylsilyl group, a triethylsilyl group, a tri-n-propylsilyl group, a triphenylsilyl group, a 2,6-difluorophenyl group, a 2,4,6-trifluorophenyl group, a pentafluorophenyl group, and a carbazole group. Further preferred ones include a t-butyl group, a 9-anthracenyl group, a trimethylsilyl group, a pentafluorophenyl group, and a carbazole group.

At least one of $R^2$ to $R^7$ is necessarily a substituent containing a reactive group represented by the general formula (I).

$$-Q-R^a \qquad (I).$$

In the general formula (I), Q and $R^a$ are as mentioned above. At least one of $R^2$ to $R^7$ is necessarily a substituent containing a reactive group represented by the general formula (I).

The position at which the substituent containing the reactive group represented by the general formula (I) is not limited but is preferably $R^2$, $R^3$, $R^5$, $R^6$, or $R^7$ and particularly preferably $R^2$, $R^3$, or $R^5$. Particularly preferable basic skeletons of $R^2$ and $R^3$ are each a phenyl group and the reactive group represented by the general formula (I) may be bonded to a 2-position, a 3-position, or a 4-position of the phenyl group but a preferable bonding position is a 3-position or a 4-position of the phenyl group and further preferable bonding position is a 4-position of the phenyl group.

Hereinafter, Tables 1 to 5 illustrate compounds to be used as the metal catalyst component in the invention but they are not limited to the following illustrations. (Incidentally, Q1=—(CH$_2$)$_3$OH, Q2=—CH$_2$OCH$_2$CH$_2$OH, Q3=—CH$_2$CH$_2$CO$_2$Me, Q4=(CH$_2$)$_3$CO$_2$Me, Q5=—CH$_2$CH$_2$CONMe$_2$, Q6=—(CH$_2$)$_3$CONMe$_2$, Q7=—CH$_2$CH$_2$COMe, Q8=—(CH$_2$)$_3$COMe, Q9=—CH$_2$CH$_2$Si(OMe)$_3$, Q10=—(CH$_2$)$_3$Si(OMe)$_3$, Me represents a methyl group, Ph represents a phenyl group, and Carb represents a carbazole group.

TABLE 1

| Compound Number | Substituents on phosphorus | | | p-Position of phenol | | o-Position of phenol |
|---|---|---|---|---|---|---|
| | R2 | R3 | R4 | R5 | R6 | R7 |
| 1 | 2,6-(MeO)2Ph | 2,6-(MeO)2Ph | hydrogen | Q1 | hydrogen | C6F5 |
| 2 | 2,6-(MeO)2Ph | 2,6-(MeO)2Ph | hydrogen | Q2 | hydrogen | C6F5 |
| 3 | 2,6-(MeO)2Ph | 2,6-(MeO)2Ph | hydrogen | Q3 | hydrogen | C6F5 |
| 4 | 2,6-(MeO)2Ph | 2,6-(MeO)2Ph | hydrogen | Q4 | hydrogen | C6F5 |
| 5 | 2,6-(MeO)2Ph | 2,6-(MeO)2Ph | hydrogen | Q5 | hydrogen | C6F5 |
| 6 | 2,6-(MeO)2Ph | 2,6-(MeO)2Ph | hydrogen | Q6 | hydrogen | C6F5 |
| 7 | 2,6-(MeO)2Ph | 2,6-(MeO)2Ph | hydrogen | Q7 | hydrogen | C6F5 |
| 8 | 2,6-(MeO)2Ph | 2,6-(MeO)2Ph | hydrogen | Q8 | hydrogen | C6F5 |
| 9 | 2,6-(MeO)2Ph | 2,6-(MeO)2Ph | hydrogen | Q9 | hydrogen | C6F5 |
| 10 | 2,6-(MeO)2Ph | 2,6-(MeO)2Ph | hydrogen | Q10 | hydrogen | C6F5 |
| 11 | 2,6-(MeO)2Ph | 2,6-(MeO)2Ph | hydrogen | Q1 | hydrogen | Me3Si |
| 12 | 2,6-(MeO)2Ph | 2,6-(MeO)2Ph | hydrogen | Q2 | hydrogen | Me3Si |
| 13 | 2,6-(MeO)2Ph | 2,6-(MeO)2Ph | hydrogen | Q3 | hydrogen | Me3Si |
| 14 | 2,6-(MeO)2Ph | 2,6-(MeO)2Ph | hydrogen | Q4 | hydrogen | Me3Si |
| 15 | 2,6-(MeO)2Ph | 2,6-(MeO)2Ph | hydrogen | Q5 | hydrogen | Me3Si |
| 16 | 2,6-(MeO)2Ph | 2,6-(MeO)2Ph | hydrogen | Q6 | hydrogen | Me3Si |

TABLE 1-continued

| Compound Number | Substituents on phosphorus | | | p-Position of phenol | | o-Position of phenol |
|---|---|---|---|---|---|---|
| | R2 | R3 | R4 | R5 | R6 | R7 |
| 17 | 2,6-(MeO)2Ph | 2,6-(MeO)2Ph | hydrogen | Q7 | hydrogen | Me3Si |
| 18 | 2,6-(MeO)2Ph | 2,6-(MeO)2Ph | hydrogen | Q8 | hydrogen | Me3Si |
| 19 | 2,6-(MeO)2Ph | 2,6-(MeO)2Ph | hydrogen | Q9 | hydrogen | Me3Si |
| 20 | 2,6-(MeO)2Ph | 2,6-(MeO)2Ph | hydrogen | Q10 | hydrogen | Me3Si |
| 21 | 2,6-(MeO)2Ph | 2,6-(MeO)2Ph | hydrogen | Q1 | hydrogen | Carb |
| 22 | 2,6-(MeO)2Ph | 2,6-(MeO)2Ph | hydrogen | Q2 | hydrogen | Carb |
| 23 | 2,6-(MeO)2Ph | 2,6-(MeO)2Ph | hydrogen | Q3 | hydrogen | Carb |
| 24 | 2,6-(MeO)2Ph | 2,6-(MeO)2Ph | hydrogen | Q4 | hydrogen | Carb |
| 25 | 2,6-(MeO)2Ph | 2,6-(MeO)2Ph | hydrogen | Q5 | hydrogen | Carb |
| 26 | 2,6-(MeO)2Ph | 2,6-(MeO)2Ph | hydrogen | Q6 | hydrogen | Carb |
| 27 | 2,6-(MeO)2Ph | 2,6-(MeO)2Ph | hydrogen | Q7 | hydrogen | Carb |
| 28 | 2,6-(MeO)2Ph | 2,6-(MeO)2Ph | hydrogen | Q8 | hydrogen | Carb |
| 29 | 2,6-(MeO)2Ph | 2,6-(MeO)2Ph | hydrogen | Q9 | hydrogen | Carb |
| 30 | 2,6-(MeO)2Ph | 2,6-(MeO)2Ph | hydrogen | Q10 | hydrogen | Carb |
| 31 | 2,6-(MeO)2Ph | 2,6-(MeO)2Ph | hydrogen | Q1 | hydrogen | Anth |
| 32 | 2,6-(MeO)2Ph | 2,6-(MeO)2Ph | hydrogen | Q2 | hydrogen | Anth |
| 33 | 2,6-(MeO)2Ph | 2,6-(MeO)2Ph | hydrogen | Q3 | hydrogen | Anth |
| 34 | 2,6-(MeO)2Ph | 2,6-(MeO)2Ph | hydrogen | Q4 | hydrogen | Anth |
| 35 | 2,6-(MeO)2Ph | 2,6-(MeO)2Ph | hydrogen | Q5 | hydrogen | Anth |
| 36 | 2,6-(MeO)2Ph | 2,6-(MeO)2Ph | hydrogen | Q6 | hydrogen | Anth |
| 37 | 2,6-(MeO)2Ph | 2,6-(MeO)2Ph | hydrogen | Q7 | hydrogen | Anth |
| 38 | 2,6-(MeO)2Ph | 2,6-(MeO)2Ph | hydrogen | Q8 | hydrogen | Anth |
| 39 | 2,6-(MeO)2Ph | 2,6-(MeO)2Ph | hydrogen | Q9 | hydrogen | Anth |
| 40 | 2,6-(MeO)2Ph | 2,6-(MeO)2Ph | hydrogen | Q10 | hydrogen | Anth |
| 41 | 2,6-(MeO)2Ph | 2,6-(MeO)2Ph | hydrogen | Q1 | hydrogen | tBu |
| 42 | 2,6-(MeO)2Ph | 2,6-(MeO)2Ph | hydrogen | Q2 | hydrogen | tBu |
| 43 | 2,6-(MeO)2Ph | 2,6-(MeO)2Ph | hydrogen | Q3 | hydrogen | tBu |
| 44 | 2,6-(MeO)2Ph | 2,6-(MeO)2Ph | hydrogen | Q4 | hydrogen | tBu |
| 45 | 2,6-(MeO)2Ph | 2,6-(MeO)2Ph | hydrogen | Q5 | hydrogen | tBu |
| 46 | 2,6-(MeO)2Ph | 2,6-(MeO)2Ph | hydrogen | Q6 | hydrogen | tBu |
| 47 | 2,6-(MeO)2Ph | 2,6-(MeO)2Ph | hydrogen | Q7 | hydrogen | tBu |
| 48 | 2,6-(MeO)2Ph | 2,6-(MeO)2Ph | hydrogen | Q8 | hydrogen | tBu |
| 49 | 2,6-(MeO)2Ph | 2,6-(MeO)2Ph | hydrogen | Q9 | hydrogen | tBu |
| 50 | 2,6-(MeO)2Ph | 2,6-(MeO)2Ph | hydrogen | Q10 | hydrogen | tBu |

TABLE 2

| Compound Number | Substituents on phosphorus | | | p-Position of phenol | | o-Position of phenol |
|---|---|---|---|---|---|---|
| | R2 | R3 | R4 | R5 | R6 | R7 |
| 51 | 2,6-(MeO)2Ph | 2,6-(PhO)2Ph | hydrogen | Q1 | hydrogen | C6F5 |
| 52 | 2,6-(MeO)2Ph | 2,6-(PhO)2Ph | hydrogen | Q2 | hydrogen | C6F5 |
| 53 | 2,6-(MeO)2Ph | 2,6-(PhO)2Ph | hydrogen | Q3 | hydrogen | C6F5 |
| 54 | 2,6-(MeO)2Ph | 2,6-(PhO)2Ph | hydrogen | Q4 | hydrogen | C6F5 |
| 55 | 2,6-(MeO)2Ph | 2,6-(PhO)2Ph | hydrogen | Q5 | hydrogen | C6F5 |
| 56 | 2,6-(MeO)2Ph | 2,6-(PhO)2Ph | hydrogen | Q6 | hydrogen | C6F5 |
| 57 | 2,6-(MeO)2Ph | 2,6-(PhO)2Ph | hydrogen | Q7 | hydrogen | C6F5 |
| 58 | 2,6-(MeO)2Ph | 2,6-(PhO)2Ph | hydrogen | Q8 | hydrogen | C6F5 |
| 59 | 2,6-(MeO)2Ph | 2,6-(PhO)2Ph | hydrogen | Q9 | hydrogen | C6F5 |
| 60 | 2,6-(MeO)2Ph | 2,6-(PhO)2Ph | hydrogen | Q10 | hydrogen | C6F5 |
| 61 | 2,6-(MeO)2Ph | 2,6-(PhO)2Ph | hydrogen | Q1 | hydrogen | Me3Si |
| 62 | 2,6-(MeO)2Ph | 2,6-(PhO)2Ph | hydrogen | Q2 | hydrogen | Me3Si |
| 63 | 2,6-(MeO)2Ph | 2,6-(PhO)2Ph | hydrogen | Q3 | hydrogen | Me3Si |
| 64 | 2,6-(MeO)2Ph | 2,6-(PhO)2Ph | hydrogen | Q4 | hydrogen | Me3Si |
| 65 | 2,6-(MeO)2Ph | 2,6-(PhO)2Ph | hydrogen | Q5 | hydrogen | Me3Si |
| 66 | 2,6-(MeO)2Ph | 2,6-(PhO)2Ph | hydrogen | Q6 | hydrogen | Me3Si |
| 67 | 2,6-(MeO)2Ph | 2,6-(PhO)2Ph | hydrogen | Q7 | hydrogen | Me3Si |
| 68 | 2,6-(MeO)2Ph | 2,6-(PhO)2Ph | hydrogen | Q8 | hydrogen | Me3Si |
| 69 | 2,6-(MeO)2Ph | 2,6-(PhO)2Ph | hydrogen | Q9 | hydrogen | Me3Si |
| 70 | 2,6-(MeO)2Ph | 2,6-(PhO)2Ph | hydrogen | Q10 | hydrogen | Me3Si |
| 71 | 2,6-(MeO)2Ph | 2,6-(PhO)2Ph | hydrogen | Q1 | hydrogen | Carb |
| 72 | 2,6-(MeO)2Ph | 2,6-(PhO)2Ph | hydrogen | Q2 | hydrogen | Carb |
| 73 | 2,6-(MeO)2Ph | 2,6-(PhO)2Ph | hydrogen | Q3 | hydrogen | Carb |
| 74 | 2,6-(MeO)2Ph | 2,6-(PhO)2Ph | hydrogen | Q4 | hydrogen | Carb |
| 75 | 2,6-(MeO)2Ph | 2,6-(PhO)2Ph | hydrogen | Q5 | hydrogen | Carb |
| 76 | 2,6-(MeO)2Ph | 2,6-(PhO)2Ph | hydrogen | Q6 | hydrogen | Carb |
| 77 | 2,6-(MeO)2Ph | 2,6-(PhO)2Ph | hydrogen | Q7 | hydrogen | Carb |
| 78 | 2,6-(MeO)2Ph | 2,6-(PhO)2Ph | hydrogen | Q8 | hydrogen | Carb |
| 79 | 2,6-(MeO)2Ph | 2,6-(PhO)2Ph | hydrogen | Q9 | hydrogen | Carb |
| 80 | 2,6-(MeO)2Ph | 2,6-(PhO)2Ph | hydrogen | Q10 | hydrogen | Carb |

TABLE 2-continued

| Compound | Substituents on phosphorus | | | p-Position of phenol | | o-Position of phenol |
|---|---|---|---|---|---|---|
| Number | R2 | R3 | R4 | R5 | R6 | R7 |
| 81 | 2,6-(MeO)2Ph | 2,6-(PhO)2Ph | hydrogen | Q1 | hydrogen | Anth |
| 82 | 2,6-(MeO)2Ph | 2,6-(PhO)2Ph | hydrogen | Q2 | hydrogen | Anth |
| 83 | 2,6-(MeO)2Ph | 2,6-(PhO)2Ph | hydrogen | Q3 | hydrogen | Anth |
| 84 | 2,6-(MeO)2Ph | 2,6-(PhO)2Ph | hydrogen | Q4 | hydrogen | Anth |
| 85 | 2,6-(MeO)2Ph | 2,6-(PhO)2Ph | hydrogen | Q5 | hydrogen | Anth |
| 86 | 2,6-(MeO)2Ph | 2,6-(PhO)2Ph | hydrogen | Q6 | hydrogen | Anth |
| 87 | 2,6-(MeO)2Ph | 2,6-(PhO)2Ph | hydrogen | Q7 | hydrogen | Anth |
| 88 | 2,6-(MeO)2Ph | 2,6-(PhO)2Ph | hydrogen | Q8 | hydrogen | Anth |
| 89 | 2,6-(MeO)2Ph | 2,6-(PhO)2Ph | hydrogen | Q9 | hydrogen | Anth |
| 90 | 2,6-(MeO)2Ph | 2,6-(PhO)2Ph | hydrogen | Q10 | hydrogen | Anth |
| 91 | 2,6-(MeO)2Ph | 2,6-(PhO)2Ph | hydrogen | Q1 | hydrogen | tBu |
| 92 | 2,6-(MeO)2Ph | 2,6-(PhO)2Ph | hydrogen | Q2 | hydrogen | tBu |
| 93 | 2,6-(MeO)2Ph | 2,6-(PhO)2Ph | hydrogen | Q3 | hydrogen | tBu |
| 94 | 2,6-(MeO)2Ph | 2,6-(PhO)2Ph | hydrogen | Q4 | hydrogen | tBu |
| 95 | 2,6-(MeO)2Ph | 2,6-(PhO)2Ph | hydrogen | Q5 | hydrogen | tBu |
| 96 | 2,6-(MeO)2Ph | 2,6-(PhO)2Ph | hydrogen | Q6 | hydrogen | tBu |
| 97 | 2,6-(MeO)2Ph | 2,6-(PhO)2Ph | hydrogen | Q7 | hydrogen | tBu |
| 98 | 2,6-(MeO)2Ph | 2,6-(PhO)2Ph | hydrogen | Q8 | hydrogen | tBu |
| 99 | 2,6-(MeO)2Ph | 2,6-(PhO)2Ph | hydrogen | Q9 | hydrogen | tBu |
| 100 | 2,6-(MeO)2Ph | 2,6-(PhO)2Ph | hydrogen | Q10 | hydrogen | tBu |

TABLE 3

| Compound | Substituents on phosphorus | | | p-Position of phenol | | o-Position of phenol |
|---|---|---|---|---|---|---|
| Number | R2 | R3 | R4 | R5 | R6 | R7 |
| 101 | 2-MeO-6-PhOPh | 2,6-(PhO)2Ph | hydrogen | Q1 | hydrogen | C6F5 |
| 102 | 2-MeO-6-PhOPh | 2,6-(PhO)2Ph | hydrogen | Q2 | hydrogen | C6F5 |
| 103 | 2-MeO-6-PhOPh | 2,6-(PhO)2Ph | hydrogen | Q3 | hydrogen | C6F5 |
| 104 | 2-MeO-6-PhOPh | 2,6-(PhO)2Ph | hydrogen | Q4 | hydrogen | C6F5 |
| 105 | 2-MeO-6-PhOPh | 2,6-(PhO)2Ph | hydrogen | Q5 | hydrogen | C6F5 |
| 106 | 2-MeO-6-PhOPh | 2,6-(PhO)2Ph | hydrogen | Q6 | hydrogen | C6F5 |
| 107 | 2-MeO-6-PhOPh | 2,6-(PhO)2Ph | hydrogen | Q7 | hydrogen | C6F5 |
| 108 | 2-MeO-6-PhOPh | 2,6-(PhO)2Ph | hydrogen | Q8 | hydrogen | C6F5 |
| 109 | 2-MeO-6-PhOPh | 2,6-(PhO)2Ph | hydrogen | Q9 | hydrogen | C6F5 |
| 110 | 2-MeO-6-PhOPh | 2,6-(PhO)2Ph | hydrogen | Q10 | hydrogen | C6F5 |
| 111 | 2-MeO-6-PhOPh | 2,6-(PhO)2Ph | hydrogen | Q1 | hydrogen | Me3Si |
| 112 | 2-MeO-6-PhOPh | 2,6-(PhO)2Ph | hydrogen | Q2 | hydrogen | Me3Si |
| 113 | 2-MeO-6-PhOPh | 2,6-(PhO)2Ph | hydrogen | Q3 | hydrogen | Me3Si |
| 114 | 2-MeO-6-PhOPh | 2,6-(PhO)2Ph | hydrogen | Q4 | hydrogen | Me3Si |
| 115 | 2-MeO-6-PhOPh | 2,6-(PhO)2Ph | hydrogen | Q5 | hydrogen | Me3Si |
| 116 | 2-MeO-6-PhOPh | 2,6-(PhO)2Ph | hydrogen | Q6 | hydrogen | Me3Si |
| 117 | 2-MeO-6-PhOPh | 2,6-(PhO)2Ph | hydrogen | Q7 | hydrogen | Me3Si |
| 118 | 2-MeO-6-PhOPh | 2,6-(PhO)2Ph | hydrogen | Q8 | hydrogen | Me3Si |
| 119 | 2-MeO-6-PhOPh | 2,6-(PhO)2Ph | hydrogen | Q9 | hydrogen | Me3Si |
| 120 | 2-MeO-6-PhOPh | 2,6-(PhO)2Ph | hydrogen | Q10 | hydrogen | Me3Si |
| 121 | 2-MeO-6-PhOPh | 2,6-(PhO)2Ph | hydrogen | Q1 | hydrogen | Carb |
| 122 | 2-MeO-6-PhOPh | 2,6-(PhO)2Ph | hydrogen | Q2 | hydrogen | Carb |
| 123 | 2-MeO-6-PhOPh | 2,6-(PhO)2Ph | hydrogen | Q3 | hydrogen | Carb |
| 124 | 2-MeO-6-PhOPh | 2,6-(PhO)2Ph | hydrogen | Q4 | hydrogen | Carb |
| 125 | 2-MeO-6-PhOPh | 2,6-(PhO)2Ph | hydrogen | Q5 | hydrogen | Carb |
| 126 | 2-MeO-6-PhOPh | 2,6-(PhO)2Ph | hydrogen | Q6 | hydrogen | Carb |
| 127 | 2-MeO-6-PhOPh | 2,6-(PhO)2Ph | hydrogen | Q7 | hydrogen | Carb |
| 128 | 2-MeO-6-PhOPh | 2,6-(PhO)2Ph | hydrogen | Q8 | hydrogen | Carb |
| 129 | 2-MeO-6-PhOPh | 2,6-(PhO)2Ph | hydrogen | Q9 | hydrogen | Carb |
| 130 | 2-MeO-6-PhOPh | 2,6-(PhO)2Ph | hydrogen | Q10 | hydrogen | Carb |
| 131 | 2-MeO-6-PhOPh | 2,6-(PhO)2Ph | hydrogen | Q1 | hydrogen | Anth |
| 132 | 2-MeO-6-PhOPh | 2,6-(PhO)2Ph | hydrogen | Q2 | hydrogen | Anth |
| 133 | 2-MeO-6-PhOPh | 2,6-(PhO)2Ph | hydrogen | Q3 | hydrogen | Anth |
| 134 | 2-MeO-6-PhOPh | 2,6-(PhO)2Ph | hydrogen | Q4 | hydrogen | Anth |
| 135 | 2-MeO-6-PhOPh | 2,6-(PhO)2Ph | hydrogen | Q5 | hydrogen | Anth |
| 136 | 2-MeO-6-PhOPh | 2,6-(PhO)2Ph | hydrogen | Q6 | hydrogen | Anth |
| 137 | 2-MeO-6-PhOPh | 2,6-(PhO)2Ph | hydrogen | Q7 | hydrogen | Anth |
| 138 | 2-MeO-6-PhOPh | 2,6-(PhO)2Ph | hydrogen | Q8 | hydrogen | Anth |
| 139 | 2-MeO-6-PhOPh | 2,6-(PhO)2Ph | hydrogen | Q9 | hydrogen | Anth |
| 140 | 2-MeO-6-PhOPh | 2,6-(PhO)2Ph | hydrogen | Q10 | hydrogen | Anth |
| 141 | 2-MeO-6-PhOPh | 2,6-(PhO)2Ph | hydrogen | Q1 | hydrogen | tBu |
| 142 | 2-MeO-6-PhOPh | 2,6-(PhO)2Ph | hydrogen | Q2 | hydrogen | tBu |
| 143 | 2-MeO-6-PhOPh | 2,6-(PhO)2Ph | hydrogen | Q3 | hydrogen | tBu |
| 144 | 2-MeO-6-PhOPh | 2,6-(PhO)2Ph | hydrogen | Q4 | hydrogen | tBu |

TABLE 3-continued

| Compound Number | Substituents on phosphorus | | | p-Position of phenol | | o-Position of phenol |
|---|---|---|---|---|---|---|
| | R2 | R3 | R4 | R5 | R6 | R7 |
| 143 | 2-MeO-6-PhOPh | 2,6-(PhO)2Ph | hydrogen | Q5 | hydrogen | tBu |
| 145 | 2-MeO-6-PhOPh | 2,6-(PhO)2Ph | hydrogen | Q6 | hydrogen | tBu |
| 146 | 2-MeO-6-PhOPh | 2,6-(PhO)2Ph | hydrogen | Q7 | hydrogen | tBu |
| 147 | 2-MeO-6-PhOPh | 2,6-(PhO)2Ph | hydrogen | Q8 | hydrogen | tBu |
| 148 | 2-MeO-6-PhOPh | 2,6-(PhO)2Ph | hydrogen | Q9 | hydrogen | tBu |
| 150 | 2-MeO-6-PhOPh | 2,6-(PhO)2Ph | hydrogen | Q10 | hydrogen | tBu |

TABLE 4

| Compound Number | Substituents on phosphorus | | | p-Position of phenol | | o-Position of phenol |
|---|---|---|---|---|---|---|
| | R2 | R3 | R4 | R5 | R6 | R7 |
| 151 | 2,6-(iPrO)2Ph | 2,6-(iPrO)2Ph | hydrogen | Q1 | hydrogen | C6F5 |
| 152 | 2,6-(iPrO)2Ph | 2,6-(iPrO)2Ph | hydrogen | Q2 | hydrogen | C6F5 |
| 153 | 2,6-(iPrO)2Ph | 2,6-(iPrO)2Ph | hydrogen | Q3 | hydrogen | C6F5 |
| 154 | 2,6-(iPrO)2Ph | 2,6-(iPrO)2Ph | hydrogen | Q4 | hydrogen | C6F5 |
| 155 | 2,6-(iPrO)2Ph | 2,6-(iPrO)2Ph | hydrogen | Q5 | hydrogen | C6F5 |
| 156 | 2,6-(iPrO)2Ph | 2,6-(iPrO)2Ph | hydrogen | Q6 | hydrogen | C6F5 |
| 157 | 2,6-(iPrO)2Ph | 2,6-(iPrO)2Ph | hydrogen | Q7 | hydrogen | C6F5 |
| 158 | 2,6-(iPrO)2Ph | 2,6-(iPrO)2Ph | hydrogen | Q8 | hydrogen | C6F5 |
| 159 | 2,6-(iPrO)2Ph | 2,6-(iPrO)2Ph | hydrogen | Q9 | hydrogen | C6F5 |
| 160 | 2,6-(iPrO)2Ph | 2,6-(iPrO)2Ph | hydrogen | Q10 | hydrogen | C6F5 |
| 161 | 2,6-(iPrO)2Ph | 2,6-(iPrO)2Ph | hydrogen | Q1 | hydrogen | Me3Si |
| 162 | 2,6-(iPrO)2Ph | 2,6-(iPrO)2Ph | hydrogen | Q2 | hydrogen | Me3Si |
| 163 | 2,6-(iPrO)2Ph | 2,6-(iPrO)2Ph | hydrogen | Q3 | hydrogen | Me3Si |
| 164 | 2,6-(iPrO)2Ph | 2,6-(iPrO)2Ph | hydrogen | Q4 | hydrogen | Me3Si |
| 165 | 2,6-(iPrO)2Ph | 2,6-(iPrO)2Ph | hydrogen | Q5 | hydrogen | Me3Si |
| 166 | 2,6-(iPrO)2Ph | 2,6-(iPrO)2Ph | hydrogen | Q6 | hydrogen | Me3Si |
| 167 | 2,6-(iPrO)2Ph | 2,6-(iPrO)2Ph | hydrogen | Q7 | hydrogen | Me3Si |
| 168 | 2,6-(iPrO)2Ph | 2,6-(iPrO)2Ph | hydrogen | Q8 | hydrogen | Me3Si |
| 169 | 2,6-(iPrO)2Ph | 2,6-(iPrO)2Ph | hydrogen | Q9 | hydrogen | Me3Si |
| 170 | 2,6-(iPrO)2Ph | 2,6-(iPrO)2Ph | hydrogen | Q10 | hydrogen | Me3Si |
| 171 | 2,6-(iPrO)2Ph | 2,6-(iPrO)2Ph | hydrogen | Q1 | hydrogen | Carb |
| 172 | 2,6-(iPrO)2Ph | 2,6-(iPrO)2Ph | hydrogen | Q2 | hydrogen | Carb |
| 173 | 2,6-(iPrO)2Ph | 2,6-(iPrO)2Ph | hydrogen | Q3 | hydrogen | Carb |
| 174 | 2,6-(iPrO)2Ph | 2,6-(iPrO)2Ph | hydrogen | Q4 | hydrogen | Carb |
| 175 | 2,6-(iPrO)2Ph | 2,6-(iPrO)2Ph | hydrogen | Q5 | hydrogen | Carb |
| 176 | 2,6-(iPrO)2Ph | 2,6-(iPrO)2Ph | hydrogen | Q6 | hydrogen | Carb |
| 177 | 2,6-(iPrO)2Ph | 2,6-(iPrO)2Ph | hydrogen | Q7 | hydrogen | Carb |
| 178 | 2,6-(iPrO)2Ph | 2,6-(iPrO)2Ph | hydrogen | Q8 | hydrogen | Carb |
| 179 | 2,6-(iPrO)2Ph | 2,6-(iPrO)2Ph | hydrogen | Q9 | hydrogen | Carb |
| 180 | 2,6-(iPrO)2Ph | 2,6-(iPrO)2Ph | hydrogen | Q10 | hydrogen | Carb |
| 181 | 2,6-(MeO)2Ph | 2,6-(MeO)2-4-(Q2)Ph | hydrogen | hydrogen | hydrogen | C6F5 |
| 182 | 2,6-(MeO)2Ph | 2,6-(MeO)2-4-(Q2)Ph | hydrogen | hydrogen | hydrogen | Me3Si |
| 183 | 2,6-(MeO)2Ph | 2,6-(MeO)2-4-(Q2)Ph | hydrogen | hydrogen | hydrogen | Carb |
| 184 | 2,6-(MeO)2Ph | 2,6-(MeO)2-4-(Q7)Ph | hydrogen | hydrogen | hydrogen | C6F5 |
| 185 | 2,6-(MeO)2Ph | 2,6-(MeO)2-4-(Q7)Ph | hydrogen | hydrogen | hydrogen | Me3Si |
| 186 | 2,6-(MeO)2Ph | 2,6-(MeO)2-4-(Q7)Ph | hydrogen | hydrogen | hydrogen | Carb |
| 187 | 2,6-(MeO)2Ph | 2,6-(MeO)2-4-(Q9)Ph | hydrogen | hydrogen | hydrogen | C6F5 |
| 188 | 2,6-(MeO)2Ph | 2,6-(MeO)2-4-(Q9)Ph | hydrogen | hydrogen | hydrogen | Me3Si |
| 189 | 2,6-(MeO)2Ph | 2,6-(MeO)2-4-(Q9)Ph | hydrogen | hydrogen | hydrogen | Carb |
| 190 | 2,6-(MeO)2-4-(Q2)Ph | 2,6-(MeO)2-4-(Q2)Ph | hydrogen | hydrogen | hydrogen | C6F5 |
| 191 | 2,6-(MeO)2-4-(Q2)Ph | 2,6-(MeO)2-4-(Q2)Ph | hydrogen | hydrogen | hydrogen | Me3Si |
| 192 | 2,6-(MeO)2-4-(Q2)Ph | 2,6-(MeO)2-4-(Q2)Ph | hydrogen | hydrogen | hydrogen | Carb |
| 193 | 2,6-(MeO)2-4-(Q7)Ph | 2,6-(MeO)2-4-(Q7)Ph | hydrogen | hydrogen | hydrogen | C6F5 |
| 194 | 2,6-(MeO)2-4-(Q7)Ph | 2,6-(MeO)2-4-(Q7)Ph | hydrogen | hydrogen | hydrogen | Me3Si |
| 195 | 2,6-(MeO)2-4-(Q7)Ph | 2,6-(MeO)2-4-(Q7)Ph | hydrogen | hydrogen | hydrogen | Carb |
| 196 | 2,6-(MeO)2-4-(Q9)Ph | 2,6-(MeO)2-4-(Q9)Ph | hydrogen | hydrogen | hydrogen | C6F5 |
| 197 | 2,6-(MeO)2-4-(Q9)Ph | 2,6-(MeO)2-4-(Q9)Ph | hydrogen | hydrogen | hydrogen | Me3Si |
| 198 | 2,6-(MeO)2-4-(Q9)Ph | 2,6-(MeO)2-4-(Q9)Ph | hydrogen | hydrogen | hydrogen | Carb |
| 199 | 2,6-(MeO)2Ph | 2,6-(PhO)2-4-(Q2)Ph | hydrogen | hydrogen | hydrogen | C6F5 |
| 200 | 2,6-(MeO)2Ph | 2,6-(PhO)2-4-(Q2)Ph | hydrogen | hydrogen | hydrogen | Me3Si |

TABLE 5

| Compound Number | Substituents on phosphorus | | | p-Position of phenol | | o-Position of phenol |
|---|---|---|---|---|---|---|
| | R2 | R3 | R4 | R5 | R6 | R7 |
| 201 | 2,6-(MeO)2Ph | 2,6-(PhO)2-4-(Q2)Ph | hydrogen | hydrogen | hydrogen | Carb |
| 202 | 2,6-(MeO)2Ph | 2,6-(PhO)2-4-(Q7)Ph | hydrogen | hydrogen | hydrogen | C6F5 |
| 203 | 2,6-(MeO)2Ph | 2,6-(PhO)2-4-(Q7)Ph | hydrogen | hydrogen | hydrogen | Me3Si |
| 204 | 2,6-(MeO)2Ph | 2,6-(PhO)2-4-(Q7)Ph | hydrogen | hydrogen | hydrogen | Carb |
| 205 | 2,6-(MeO)2Ph | 2,6-(PhO)2-4-(Q9)Ph | hydrogen | hydrogen | hydrogen | C6F5 |
| 206 | 2,6-(MeO)2Ph | 2,6-(PhO)2-4-(Q9)Ph | hydrogen | hydrogen | hydrogen | Me3Si |
| 207 | 2,6-(MeO)2Ph | 2,6-(PhO)2-4-(Q9)Ph | hydrogen | hydrogen | hydrogen | Carb |
| 208 | 2-MeO-6-PhO-4-(Q2)Ph | 2,6-(PhO)2-4-(Q2)Ph | hydrogen | hydrogen | hydrogen | C6F5 |
| 209 | 2-MeO-6-PhO-4-(Q2)Ph | 2,6-(PhO)2-4-(Q2)Ph | hydrogen | hydrogen | hydrogen | Me3Si |
| 210 | 2-MeO-6-PhO-4-(Q2)Ph | 2,6-(PhO)2-4-(Q2)Ph | hydrogen | hydrogen | hydrogen | Carb |
| 211 | 2-MeO-6-PhO-4-(Q7)Ph | 2,6-(PhO)2-4-(Q7)Ph | hydrogen | hydrogen | hydrogen | C6F5 |
| 212 | 2-MeO-6-PhO-4-(Q7)Ph | 2,6-(PhO)2-4-(Q7)Ph | hydrogen | hydrogen | hydrogen | Me3Si |
| 213 | 2-MeO-6-PhO-4-(Q7)Ph | 2,6-(PhO)2-4-(Q7)Ph | hydrogen | hydrogen | hydrogen | Carb |
| 214 | 2-MeO-6-PhO-4-(Q9)Ph | 2,6-(PhO)2-4-(Q9)Ph | hydrogen | hydrogen | hydrogen | C6F5 |
| 215 | 2-MeO-6-PhO-4-(Q9)Ph | 2,6-(PhO)2-4-(Q9)Ph | hydrogen | hydrogen | hydrogen | Me3Si |
| 216 | 2-MeO-6-PhO-4-(Q9)Ph | 2,6-(PhO)2-4-(Q9)Ph | hydrogen | hydrogen | hydrogen | Carb |

[Chem 6]

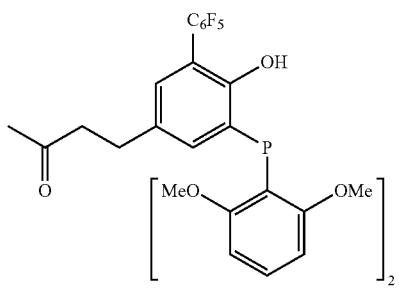

For the sake of understanding the structures of the compounds, the structure and name of the compound of Compound Number 7 described in the above table are shown. The compound of the structural formula is referred to as 2-bis(2,6-dimethoxyphenyl)phosphanyl-4-(3-butanon-1-yl)-6-pentafluorophenylphenol (B-195).

As for the transition metal compound (C) to be used in the invention, there are used those which are capable of forming a complex having polymerizing ability by reacting with a compound represented by the general formula (A) or (B). They are sometimes referred to as precursors.

For example, as the transition metal compound (C) containing nickel, bis(1,5-cyclooctadiene)nickel (0), a complex represented by the general formula $(CH_2CR^{17}CH_2)_2Ni$, bis(cyclopentadienyl)nickel (II), a complex represented by the general formula $Ni(CH_2SiR^{17}_3)_2L^1$, a complex represented by the general formula $NiR^{17}_2L^1_2$, and the like can be used. (wherein $R^{17}$ is a hydrogen atom, a halogen atom, a hydrocarbon group having 1 to 20 carbon atoms which may contain a hetero atom, $OR^8$, or $CO_2R^8$; $L^1$ is a ligand that coordinates to the transition metal M; $R^8$ is a hydrogen atom or a hydrocarbon group having 1 to 20 carbon atoms)

In addition, as for the transition metal compound (C) containing a transition metal M belonging to Group 9, 10, or 11, the general formula: $MR^{17}_pL^1_q$ (wherein M represents a transition metal belonging to Group 9, 10, or 11 of the periodic table, $R^{17}$ and $L^1$ are as described above, and p and q are each an integer of 0 or more satisfying the valence of M) can be used.

Among these transition metal compounds (C), those to be used preferably include bis(1,5-cyclooctadiene)nickel (0), a complex represented by the general formula: $(CH_2CR^{17}CH_2)_2Ni$ (wherein $R^{17}$ is as described herein), a complex represented by the general formula: $Ni(CH_2SiR^{17}_3)_2 L^1_2$ (wherein $R^{17}$ and $L^1$ are as described herein), a complex represented by the general formula: $NiR^{17}_2L^1_2$ (wherein and $R^{17}$ and $L^1$ are described herein), $Pd(dba)_2$, $Pd_2(dba)_3$, $Pd_3(dba)_4$ (wherein dba represents dibenzylideneacetone), $Pd(OCOCH_3)_2$, and (1,5-cyclooctadiene) Pd(methyl)(chloride).

Particularly preferable ones are bis(1,5-cyclooctadiene) nickel (0), $(CH_2CHCH_2)_2Ni$, $(CH_2CMeCH_2)_2Ni$, $Ni(CH_2SiMe_3)_2(Py)_2$ (hereinafter, Py represents pyridine), $Ni(CH_2SiMe_3)_2(Lut)_2$ (hereinafter, Lut represents 2,6-lutidine), $NiPh_2(Py)_2$ (hereinafter, Ph represents phenyl), $Ni(Ph)_2(Lut)_2$, $Pd(dba)_2$, $Pd_2(dba)_3$, $Pd_3(dba)_4$ (wherein dba represents dibenzylideneacetone), $Pd(OCOCH_3)_2$, and (1,5-cyclooctadiene)Pd(methyl)(chloride).

The reaction product of the invention can be obtained by bringing the aforementioned compound represented by the general formula (A) or (B) into contact with the aforementioned transition metal compound (C), for example, in a ratio of ((A)+(B)):(C)=1:99 to 99:1 (molar ratio), in an organic solvent such as toluene or benzene at 0 to 100° C. for 1 to 86400 seconds under reduced pressure to increased pressure. In the case where a toluene or benzene solution of bis(1,5-cyclooctadiene)nickel (0) $(Ni(COD)_2)$ is used as the transition metal compound (C), formation of the reaction product can be confirmed by the change of color of the solution from yellow to, for example, red.

After the reaction, a component, which constitutes the transition metal compound (C) but is other than the transition metal of the transition metal compound (C), is substituted by the part of the component represented by the general formula (A) excluding Z or the component represented by the general formula (B) to form the metal complex represented by the general formula (D) of the invention. The metal complex represented by the general formula (D) will be mentioned later.

This substitution reaction preferably proceeds quantitatively, but may not completely proceed in some cases. After completion of the reaction, although other components derived from the components represented by the general formulae (A), (B), and (C) are co-present other than the complex represented by the general formula (D), these other components may be removed or may not be removed when the polymerization reaction or copolymerization reaction of the invention is carried out. Generally, these other components are preferably removed because higher activity can be obtained.

When the reaction is carried out, the ligand $L^1$ that coordinates to the transition metal M may coexist. In the case where nickel or palladium is used as the transition metal M, stability of the formed complex represented by the general formula (D) is sometimes increased by the coexistence of $L^1$ having a nature of a Lewis base in the system and, in such case, the coexistence of $L^1$ is preferable, so long as $L^1$ does not inhibit the polymerization reaction or copolymerization reaction of the invention.

In the invention, the reaction may be conducted in a vessel other than the reactor which is used for polymerization of the olefin having 2 or more carbon atoms or copolymerization of the olefin having 2 or more carbon atoms and a (meth)acrylate ester, in advance, and then the resultant complex represented by the general formula (D) may be used for polymerization of the olefin having 2 or more carbon atoms or copolymerization of the olefin having 2 or more carbon atoms and a (meth)acrylate ester, or the reaction may be carried out in the presence of these monomers. In addition, the reaction may be conducted in the reactor which is used for polymerization of the olefin having 2 or more carbon atoms or copolymerization of the olefin having 2 or more carbon atoms and a (meth)acrylate ester. In this case, these monomers may be present or absent. Moreover, as for the component represented by the general formula (A) or (B), each single component may be used, or a plurality of the components may be used in combination. In particular, for the purposes of broadening molecular weight distribution or comonomer content distribution, such combined use of a plurality of the components is useful.

6. Metal Complex

The metal catalyst component (2) of the invention preferably contains the metal complex represented by the following general formula (D). The compound represented by the general formula (D) may be obtained by bringing the compound represented by the general formula (A) or (B) into contact with the transition metal compound containing the transition metal M or a compound having a structure represented by the following general formula (D) may be incorporated beforehand.

[Chem 7]

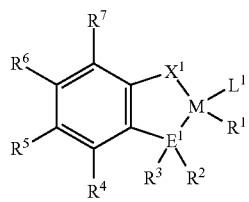

(D)

M represents a transition metal belonging to Group 9, 10, or 11 of the periodic table. $R^1$ represents a hydrogen atom or a hydrocarbon group having 1 to 20 carbon atoms which may contain a hetero atom. $L^1$ represents a ligand that has coordinated to M. Also, $L^1$ and $R^1$ may be combined with each other to form a ring. $X^1$, $E^1$, $R^2$, $R^3$, $R^4$, $R^5$, $R^6$, and $R^7$ are as mentioned above.

M is a transition metal belonging to Group 9, 10, or 11 of the periodic table, and preferably nickel, palladium and platinum of Group 10, cobalt and rhodium of Group 9, and copper of Group 11, and more preferably nickel, palladium, and platinum of Group 10, and most preferably nickel or palladium of Group 10.

As for the valence of M, bivalent is preferable. Here, the valence of M means formal oxidation number used in the organometallic chemistry. That is, when an electron pair in a bond in which certain elements are involved is assigned to an element having greater electronegativity, the valence means the number of charge that remains on an atom of the element. For example, in the general formula (D) of the invention, in the case where $E^1$ is phosphorus, $X^1$ is oxygen, M is nickel, $R^1$ is a phenyl group, and $L^1$ is pyridine and the nickel forms bonds with the phosphorus, oxygen, carbon of the phenyl group, and nitrogen of pyridine, the formal oxidation number of nickel, i.e., the valence of nickel becomes divalent. This is because, according to the above-described definition, in these bonds, since electron pairs are assigned to phosphorus, oxygen, carbon, and nitrogen which have greater electronegativity than nickel, charge of each group becomes 0 for phosphorus, −1 for oxygen, −1 for the phenyl group, and 0 for pyridine, and the complex is electrically neutral as a whole, charge remaining on nickel becomes +2.

As a divalent transition metal, for example, nickel (II), palladium (II), platinum (II), and cobalt (II) are preferable, and as a transition metal other than divalent one, copper (I) or rhodium (III) is also preferable.

In the present invention, $R^1$ represents a hydrogen atom or a hydrocarbon group having 1 to 20 carbon atoms which may contain a hetero atom. The polymerization or copolymerization reaction in the invention is considered to be initiated by inserting (a) α-olefin component or (b) (meth)acrylate ester component in the invention into the bond of M and $R^1$. Therefore, when the number of carbon of $R^1$ is excessively large, this initiation reaction tends to be inhibited. For this reason, $R^1$ is a group having preferably 1 to 16 carbon atoms, and more preferably 1 to 10 carbon atoms.

Specific example of $R^1$ includes a hydride group, a methyl group, an ethyl group, an n-propyl group, an isopropyl group, an n-butyl group, an isobutyl group, an n-hexyl group, an n-octyl group, an n-decyl group, an n-dodecyl group, a cyclopentyl group, a cyclohexyl group, a benzyl group, a phenyl group, a p-methylphenyl group, a trimethylsilyl group, a triethylsilyl group, a triphenylsilyl group, and the like.

In the invention, $L^1$ represents a ligand that has coordinated to M. The ligand $L^1$ in the invention is a hydrocarbon compound having 1 to 20 carbon atoms which has oxygen, nitrogen, or sulfur as an atom capable of forming a coordination bond. Moreover, as $L^1$, there can be also used a hydrocarbon compound having a carbon-carbon unsaturated bond (which may contain a hetero atom) capable of coordinating to a transition metal. The number of carbon of $L^1$ is preferably 1 to 16, and more preferably 1 to 10. Furthermore, as $L^1$ forming a coordination bond with M in the general formula (D), a compound having no charge is preferable.

Although $L^1$ forms a coordination bond with M, in the invention, it is not necessary to use a compound which removes $L^1$ from M, in order to progress the polymerization of the α-olefin component (a) or the copolymerization of the α-olefin component (a) and the (meth)acrylate ester component (b).

It should be noted that, in the case of so-called SHOP type metal complex, a complex similar to the one in the present invention can be synthesized even by using a phosphine, for example, trimethylphosphine or triphenylphosphine, instead of $L^1$ in the invention. However, it is known that when such ligand is used, it is essential for expressing polymerizing ability of an olefin to use a compound which removes the ligand from the transition metal M in combination (e.g., see U. Klahunde et al., "J. Polym. Sci.: Part A: Polym. Chem.", 1987, Vol. 25, p 1989). As a scavenger to be used for such a purpose, Ni(COD)$_2$ (COD: cyclooctadiene), B(C$_6$F$_5$)$_3$, aluminoxanes, rhodium complexes, and the like are known.

As preferable $L^1$ in the invention, there may be mentioned pyridines, piperidines, alkyl ethers, aryl ethers, alkyl aryl ethers, cyclic ethers, alkylnitrile derivatives, arylnitril derivatives, alcohols, amides, aliphatic esters, aromatic esters, amines, cyclic unsaturated hydrocarbons, and the like. As more preferable $L^1$, there may be mentioned pyridines, cyclic ethers, aliphatic esters, aromatic esters, and cyclic olefins, and as particularly preferable $L^1$, there may be mentioned pyridine, lutidine (dimethylpyridine), picoline (methylpyridine), R$^9$CO$_2$R$^8$ (definitions of R$^8$ and R$^9$ are as described above).

Incidentally, $R^1$ and $L^1$ may be combined with each other to form a ring. As such an example, a cyclooct-1-enyl group can be mentioned, and this case is also a preferable embodiment in the invention.

7. Olefin Polymerization

In the invention, polymerization style is not particularly limited. There are preferably used slurry polymerization in which at least a part of the formed polymer takes a form of slurry in a medium; bulk polymerization in which liquefied monomer itself is used as a medium; gas phase polymerization in which polymerization is carried out in a vaporized monomer; or high pressure ionic polymerization in which at least a part of the formed polymer dissolves in a monomer liquefied at high temperature and high pressure; and the like. Moreover, any of batch polymerization, semi-hatch polymerization, and continuous polymerization may be used. In addition, living polymerization may be conducted or polymerization occurring in conjunction with chain transfer may be carried out. Furthermore, chain shuttling or coordinative chain transfer polymerization (CCTP) may be carried out by using a so-called chain transfer agent (CSA) in combination.

The polymerization reaction in the invention may be carried out in the presence or absence of a liquid of a hydrocarbon solvent such as propane, n-butane, isobutane, n-hexane, n-heptane, toluene, xylene, cyclohexane, or methylcyclohexane, a liquefied α-olefin, or the like, or a polar solvent such as diethyl ether, ethylene glycol dimethyl ether, tetrahydrofuran, dioxane, ethyl acetate, methyl benzoate, acetone, methyl ethyl ketone, formamide, acetonitrile, methanol, isopropyl alcohol, or ethylene glycol. In addition, a mixture of liquid compounds described here may be used as a solvent. Furthermore, an ionic liquid can also be used as a solvent. The above-described hydrocarbon solvent and ionic liquid are more preferable for obtaining high polymerization activity and high molecular weight.

In the invention, the polymerization reaction can be carried out in the presence or absence of a known additive. As the additive, a polymerization inhibitor that inhibits radical polymerization and an additive having an action to stabilize the formed copolymer are preferable. For example, quinone derivatives, hindered phenol derivatives, and the like may be mentioned as examples of preferable additives. Specifically, hydroquinone monomethyl ether, 2,6-di-t-butyl-4-methylphenol (BHT), a reaction product of trimethylaluminium and BHT, a reaction product of a titanium (IV) alkoxide and BHT, and the like can be used. Moreover, using an inorganic and/or organic filler as an additive, the polymerization may be carried out in the presence of such a filler. Furthermore, $L^1$ according to the invention or an ionic liquid may be used as an additive.

As preferable additive in the invention, a Lewis bases may be mentioned. By selecting an appropriate Lewis base, activity, molecular weight, and copolymerizing ability of an acrylate ester can be improved. The amount of the Lewis base is 0.0001 to 1000 equivalents, preferably 0.1 to 100 equivalents, and further preferably 0.3 to 30 equivalents relative to the transition metal M in the catalyst component present in the polymerization system. A method for adding the Lewis base to the polymerization system is not particularly limited, and any technique can be used. For example, the Lewis base may be added in admixture with the catalyst component of the invention, may be added in admixture with a monomer, or may be added to the polymerization system independently of the catalyst component and a monomer. In addition, a plurality of Lewis bases may be used in combination. Moreover, the same Lewis base as $L^1$ according to the invention may be used or it may be different from $L^1$.

The Lewis base includes aromatic amines, aliphatic amities, alkyl ethers, aryl ethers, alkyl aryl ethers, cyclic ethers, alkylnitriles, arylnitriles, alcohols, amides, aliphatic esters, aromatic esters, phosphates, phosphites, thiophenes, thianthrenes, thiazoles, oxazoles, morpholines, cyclic unsaturated hydrocarbons, and the like. Of these, particularly preferable Lewis base includes aromatic amines, aliphatic amines, cyclic ethers, aliphatic esters, and aromatic esters. Of these, preferable Lewis bases are pyridine derivative, pyrimidine derivative, piperidine derivative, imidazole derivative, aniline derivative, piperidine derivative, triazine derivative, pyrrole derivative, furan derivative, and aliphatic ester derivative.

Specific Lewis base compounds include pyridine, pentafluoropyridine, 2,6-lutidine, 2,4-lutidine, 3,5-lutidine, pyrimidine, N,N-dimethylammopyridine, N-methylimidazole, 2,2-bipyridine, aniline, piperidine, 1,3,5-triazine, 2,4,6-tris(trifluoromethyl)-1,3,5-triazine, 2,4,6-tris(2-pyridyl)-s-triazine, quinoline, 8-methylquinoline, phenazine, 1,10-phenanthroline, N-methylpyrrole, 1,8-diazabicyclo-[5.4.0]-undeca-7-ene, 1,4-diazabicyclo-[2.2.2]-octane, triethylamine, benzonitrile, picoline, triphenylamine, N-methyl-2-pyrrolidone, 4-methylmorpholine, benzoxazole, benzothiazole, furan, 2,5-dimethylfuran, dibenzofuran, xanthene, 1,4-dioxane, 1,3,5-trioxane, dibenzothiophene, thianthrene, triphenylphosphonium cyclopentadienide, triphenylphosphite, triphenylphosphate, tripyrrolidinophosphine, methyl acetate, ethyl acetate, n-propyl acetate, n-butyl acetate, isobutyl acetate, methyl butyrate, methyl salicylate, ethyl formate, ethyl butyrate, ethyl caproate, pentyl acetate, isopentyl acetate, pentyl valerate, pentyl butyrate, octyl acetate, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, hydroxyethyl (meth)acrylate, dimethylaminoethyl (meth)acrylate, diethylaminoethyl (meth)acrylate, 2-aminoethyl (meth)acrylate, 2-methoxyethyl (meth)acrylate, 3-methoxypropyl (meth)acrylate, glycidyl (meth)acrylate, ethylene oxide (meth)acrylate, trifluoromethyl (meth)acrylate, 2-trifluoromethylethyl (meth)acrylate, perfluoroethyl (meth)acrylate, (meth)acrylamide, (meth)acryldimethylamide, 2-hydroxybutyl (meth)acrylate, 4-hydroxybutyl (meth)acrylate, and the like.

As preferred additives in the invention, a Lewis acid may be also mentioned. By selecting a suitable Lewis acid, it is possible to improve activity, molecular weight, and copolymerizing ability of an acrylate ester. The amount of the Lewis acid is 0.0001 to 100 equivalents, preferably 0.1 to 50 equivalents, and more preferably, 0.3 to 30 equivalents relative to the transition metal M in the catalyst component present in the polymerization system. A method of adding the Lewis acid to the polymerization system is not particularly limited and any method may be used. For example, it may be added in admixture with the catalyst component of the invention, may be added in admixture with a monomer, may be added to the polymerization system independently of the catalyst component and the monomer, or may be added in admixture with the monomer and/or the Lewis base. Also, a plurality of Lewis acids may be used in combination.

As the Lewis acid to be added, there may be used a modified Lewis acid generated by mixing a monomer or a Lewis base but the order of the mixing is not particularly limited. The monomer or the Lewis base may be added to the Lewis acid or the Lewis acid may be added to the monomer or the Lewis base.

Each contact pressure and time is not particularly limited and the modified Lewis acid can be obtained under increased pressure to reduced pressure for 1 second to 24 hours.

The contact may be performed in an inert gas such as nitrogen or in an inert hydrocarbon solvent such as pentane, hexane, heptane, toluene, or xylene. These solvents are preferably used after having been subjected to an operation for removing poisoning substances such as water and sulfur compounds. As for the contact temperature, the contact is carried out at a temperature between −20° C. and the boiling point of the solvent used, particularly preferably carried out at a temperature between room temperature and the boiling point of the solvent used.

There is no particular limitation on the use ratio of the Lewis acid to the monomer or the Lewis base, but the molar ratio of the Lewis acid to the monomer or the Lewis base is preferably controlled so as to be 1:0.5 to 10,000, preferably, 1:0.8 to 1,000, similarly in view of polymerization activity and the like.

Specific Lewis acids include trimethylaluminum, triethylaluminum, tripropylaluminum, tri-n-butylaluminum, tri-isobutylaluminum, tri-n-pentylaluminum, tri-n-octylaluminum, and tri-n-decylaluminum.

Unreacted monomer and medium may be separated from the formed polymer and may be recycled and used. At the time of recycling, these monomer and medium may be reused after purification or may be reused without purification. For the separation of the formed polymer from the unreacted monomer and medium, a hitherto known method can be used. For example, a method such as filtration, centrifugation, solvent extraction, or reprecipitation with a poor solvent can be used.

Polymerization temperature, polymerization pressure, and polymerization time are not particularly limited, but, in general, optimum setting can be done from the following ranges with considering productivity and process capacity. That is, the polymerization temperature can be selected from a range of generally −20° C. to 290° C., and preferably 0° C. to 250° C., the copolymerization pressure can be selected from a range of 0.1 MPa to 300 MPa, preferably 0.3 MPa to 250 MPa, and the polymerization time can be selected from a range of 0.1 minute to 10 hours, preferably 0.5 minute to 7 hours, and further preferably 1 minute to 6 hours.

In the invention, polymerization is generally conducted under an inert gas atmosphere. For example, an atmosphere of nitrogen, argon or carbon dioxide can be used, and a nitrogen atmosphere is preferably used. Incidentally, commingling of a small amount of oxygen or air may be accepted.

Supply of the catalyst and the monomer to a polymerization reactor is also not particularly limited, and various supplying methods can be employed depending on each purpose. For example, in the case of batch polymerization, such a technique can be employed that a predetermined amount of the monomer is supplied to the polymerization reactor in advance and the catalyst is supplied thereto. In this case, an additional monomer or an additional catalyst may be supplied to the polymerization reactor. In the case of continuous polymerization, such a technique can be employed that predetermined amounts of the monomer and the catalyst are supplied to the polymerization reactor continuously or intermittently to carry out the polymerization reaction continuously.

As for control of the copolymer composition, generally such a method can be used that a plurality of monomers are supplied to the reactor and the copolymer composition is controlled by varying a supplying ratio thereof. In addition, there may be mentioned a method of controlling the copolymer composition by utilizing a difference in monomer reactivity ratio depending on a difference in catalyst structure and a method of controlling the copolymer composition by utilizing dependency of the monomer reactivity ratio on polymerization temperature.

For controlling the molecular weight of the polymer, a hitherto known method can be used. That is, there may be mentioned a method of controlling the molecular weight by controlling the polymerization temperature, a method of controlling the molecular weight by controlling monomer concentrations, a method of controlling the molecular weight by using a chain transfer agent, a method of controlling the molecular weight by controlling the ligand structure in the transition metal complex, and the like. In the case where a chain transfer agent is used, a hitherto known chain transfer agent can be used. For example, hydrogen, a metal alkyl, and the like can be used.

In addition, in the case where the (meth)acrylate ester component (b) itself works as a kind of the chain transfer agent, the molecular weight can be also adjusted by controlling the ratio of the (meth)acrylate ester component (b) to the α-olefin component (a) or the concentration of the (meth)acrylate ester component (b). In the case where the molecular weight is adjusted by controlling the ligand structure in the transition metal complex, such a tendency can be utilized that molecular weight is generally improved by controlling the kind, number and configuration of the hetero atom-containing group in the aforementioned $R^2$ or $R^3$, by arranging a bulky substituent around the transition metal M, or by introducing a hetero atom into the aforementioned $R^6$. Incidentally, it is possible to arrange an electron-donating group such as an aryl group or a hetero atom-containing substituent is preferably arranged so that the electron-donating group can have an interaction with the transition metal M. The possibility of an interaction of such an electron-donating group with the metal M can be generally judged by measuring a distance between the electron donating group and the metal M using a molecular model or molecular orbital calculation.

The copolymer of the invention expresses superior paintability, printability, antistatic properties, inorganic filler dispersibility, adhesive properties to other resins, compatibilizing ability with other resins, and the like. Utilizing such properties, the copolymer of the invention can be used for various use applications. For example, the copolymer can be used as a film, a sheet, an adhesive resin, a binder, a compatibilizing agent, a wax, and the like.

EXAMPLES

The present invention is described further in detail in the following Examples and Comparative Examples, but the present invention is not limited thereto.

In the following Synthetic Examples, operations were conducted under a purified nitrogen atmosphere and, as solvents, anhydrous and deoxygenated ones were used unless otherwise noted.

1. Evaluation Method (1) Weight-Average Molecular Weight Mw, Number-Average Molecular Weight Mn, and Molecular Weight Distribution Mw/Mn:

They were determined by the following GPC measurement.

Firstly, a sample (about 20 mg) was collected in a vial for a pretreatment apparatus PL-SP 260VS for high temperature GPC manufactured by Polymer Laboratories Ltd., o-dichlorobenzene containing BHT as a stabilizer (concentration of BHT=0.5 g/L) was added thereto, and polymer concentration was adjusted so as to be 0.1% by weight. The polymer was dissolved by heating at 135° C. in the above-described pretreatment apparatus PL-SP 260VS for high temperature GPC, and filtered through a glass filter to prepare a sample. Incidentally, no polymer was trapped by the glass filter in the GPC measurement of the present invention.

Next, GPC measurement was carried out using GPCV 2000 manufactured by Waters equipped with TSKgel GMH-HT (30 cm×4 columns) manufactured by Tosoh Corporation as a column and an RI detector. The following measuring conditions were employed: injection amount of sample solution: about 520 µL; column temperature: 135° C.; solvent: o-dichlorobenzene; and flow rate: 1.0 ml/minute. Calculation of molecular weight was carried out as follows. That is, commercially available monodisperse polystyrene was used as a standard sample, a calibration curve regarding to retention time versus molecular weight was prepared from viscosity formulas of the polystyrene standard sample and an ethylene-based polymer, and calculation of molecular weight was performed based on the calibration curve. Incidentally, as the viscosity formula, $[\eta]=K \times M^{\alpha}$ was used, and there were used $K=1.38E^{-4}$, $\alpha=0.70$ for polystyrene, and $K=4.77E^{-4}$, $\alpha=0.70$ for an ethylene-based polymer.

(2) IR Analysis:

A comonomer content ([RA]) was determined by IR measurement of a sample transformed into a sheet by hot pressing. At that time, for an ethylene/acrylate ester copolymer, the content is a value obtained by converting an area ratio of 1,740 to 1,690 $cm^{-1}$/730 to 720 $cm^{-1}$ using the following equation.

[RA]=1.3503(area ratio)−0.2208

(3) Measurement of Polymer Bulk Density (BD): It was Measured in Accordance with JIS K 7365 (1999).

2. Synthesis of Ligand

Synthetic Example 1: Synthesis of 2-bis(2,6-dimethoxyphenyl)phosphanyl-4-(3-butanon-1-yl)-6-pentafluorophenylphenol Ligand (B-195)

(1) Synthesis of 1,3-dimethoxy-2-iodobenzene (2)

1,3-Dimethoxybenzene (50 g, 0.36 mol) was dissolved in anhydrous tetrahydrofuran (500 mL). An n-hexane solution of n-butyllithium (166 mL, 2.5M, 0.42 mol) was slowly added thereto at 0° C. under a nitrogen atmosphere. To the resultant solution, a solution of iodine (96.5 g, 0.38 mol) dissolved in anhydrous tetrahydrofuran (200 mL) was added dropwise at 0° C. over a period of 40 minutes. The resultant solution was stirred at room temperature overnight. After completion thereof, methanol (80 mL) was added dropwise, the resultant mixture was concentrated under reduced pressure, and after adding water (200 mL), the mixture was extracted with ethyl acetate (250 mL) three times. After the extraction liquid was washed with sodium thiosulfate and a saturated sodium chloride solution, the liquid was dried over anhydrous sodium sulfate and concentrated to obtain 1,3-dimethoxy-2-iodobenzene (2) as a yellow solid (63 g, 66% yield).

(2) Synthesis of bis(2,6-dimethoxyphenyl)phosphine Chloride (3)

The compound (2, 19.4 g, 73.5 mmol) was dissolved in anhydrous tetrahydrofuran (50 mL) and a tetrahydrofuran solution of isopropylmagnesium chloride (36.8 mL, 2.0M, 73.6 mmol) was gradually added thereto at 30° C., followed by stirring the resultant mixture at 15° C. for 1 hour. Then, the mixture was cooled to −78° C. and phosphorus trichloride (5.0 g, 36.4 mmol) was gradually added thereto. After the mixture was gradually warmed to 15° C. and stirred at 15° C. for 1 hour, the solvent was removed in vacuo. Anhydrous tetrahydrofuran (150 mL) was added to the resultant reaction intermediate containing bis(2,6-dimethoxyphenyl)phosphine chloride (3) and the resultant solution was used in the following reaction.

(3) Synthesis of 4-(3,5-dibromo-4-hydroxyphenyl)-2-butanone (B-195_5)

Sodium bromide (231 g, 2.25 mol) and Oxone (registered trademark) (monopersulfate salt compound) (843 g, 1.37 mol) were added to an acetone (1 L)/water (1 L) mixed solution of 4-(4-hydroxyphenyl)-2-butanone (150 g, 0.91 mol) at 0° C. under an argon atmosphere and then the mixture was stirred for 14 hours. The reaction mixture was filtrated and the filtrate was washed with ethyl acetate (500 mL×3). The filtrate and the washing liquid were concentrated under reduced pressure and the resultant concentrate was extracted with ethyl acetate (800 mL×3). The extraction liquid was dehydrated over anhydrous sodium sulfate and then filtrated and the filtrate was concentrated to obtain the objective compound (B-195_5) (250 g, 0.78 mol, 86% yield).

(4) Synthesis of 2-methyl-2-(2-(3,5-dibromo-4-hydroxyphenyl)ethyl)-1,3-dioxolane (B-195_6)

Trimethyl orthoformate (709 g, 6.68 mol) and p-toluenesulfonic acid (43 g, 0.20 mol) were added to a mixed solution of the compound (B-195_5), 430 g, 1.34 mol) and ethylene glycol (415 g, 6.69 mol) at 15° C. under an argon atmosphere and then the mixture was stirred for 14 hours. A saturated sodium hydrogen carbonate solution (500 mL) was added to the reaction mixture, followed by performing extraction with ethyl acetate (1 L×3). After the extraction liquid was dehydrated over anhydrous sodium sulfate and filtrated, a crude product obtained by concentrating the filtrate was purified by silica gel column chromatography (petroleum ether/ethyl acetate=10/1) to obtain the objective compound (B-195_6) (420 g, 1.15 mol, 86% yield) as a white solid.

(5) Synthesis of 2-methyl-2-(2-(3,5-dibromo-4-(methoxymethoxy)phenyl)ethyl)-1,3-dioxolane (B-195_7)

The compound (B-195_6, 246 g, 0.67 mol) was added to an anhydrous tetrahydrofuran (500 mL) suspension of sodium hydride (54.4 g, 1.36 mol, mineral oil 40 wt % at 0° C. under an argon atmosphere and then the mixture was stirred for 1 hour. After chloromethyl methyl ether (112 g, 1.39 mol) was added thereto at 0° C. under an argon atmosphere, the mixture was stirred for 4 hours. Ice-water (500 mL) was added to the mixture, followed by extraction with ethyl acetate (500 mL×3). The resultant extraction liquid was washed with a saturated sodium chloride solution, dehydrated over anhydrous sodium sulfate, and filtrated and then the filtrate was concentrated to obtain a crude product. The crude product was purified by silica gel column chromatography (petroleum ether/ethyl acetate=10/1) to obtain the objective compound (B-195_7) (250 g, 0.61 mol, 90% yield) as a colorless transparent liquid.

(6) Synthesis of 2-methyl-2-(2-(3-bromo-4-(methoxymethoxy)-5-bis(2,6-dimethoxyphenyl)-phosphanylphenyl)ethyl)-1,3-dioxolane (B-195_8)

An n-hexane solution of n-butyllithium (29.4 mL, 2.5M, 73.5 mmol) was added to an anhydrous tetrahydrofuran (75 mL) solution of the compound (B-195_7, 30.2 g, 73.5 mmol) at −78° C. under an argon atmosphere and then the mixture was stirred for 1 hour. The solution of the compound (3, 73.5 mmol) obtained in (2) was added dropwise to the reaction mixture cooled to −78° C. and then the whole was gradually warmed to 15° C., followed by stirring for 14 hours. Ice-water (100 mL) was added to the reaction mixture, followed by extraction with methylene chloride (150 mL×3). The extraction liquid was washed with a saturated sodium chloride solution (50 mL) and then dehydrated over anhydrous sodium sulfate. The dehydrated extraction liquid was concentrated and the resultant crude product was purified by silica gel column chromatography (petroleum ether/ethyl acetate=10/1) to obtain the objective compound (B-195_8) (15.0 g, 23.6 mmol, 32% yield) as a colorless transparent liquid.

(7) Synthesis of 2-methyl-2-(2-(3-(pentafluorophenyl)-4-(methoxymethoxy)-5-bis(2,6-dimethoxyphenyl)-phosphanylphenyl)ethyl)-1,3-dioxolane (B-195_9)

An n-hexane solution of n-butyllithium (5.0 mL, 2.5M, 12.5 mmol) was added dropwise to an anhydrous tetrahydrofuran (40 mL) solution of the compound (B-195_8, 8.0 g, 12.6 mmol) at −78° C. under an argon atmosphere and then the mixture was stirred at −78° C. for 1 hour. Hexafluorobenzene (7.7 g, 41.4 mmol) was added dropwise to the reaction mixture at −78° C. and the whole was gradually warmed to 15° C., followed by stirring for 14 hours. Ice-water (50 mL) was added to the reaction mixture, followed by extraction with methylene chloride (75 mL×3). The extraction liquid was washed with a saturated sodium chloride solution (50 mL) and then dehydrated over anhydrous sodium sulfate. The dehydrated extraction liquid was concentrated and the resultant crude product was purified by silica gel column chromatography (petroleum ether/ethyl acetate=10/1) to obtain the objective compound (B-195_9) (4.0 g, 5.5 mmol, 44% yield) as a colorless liquid.

(8) Synthesis of 2-bis(2,6-dimethoxyphenyl)phosphanyl-4-(3-butanon-1-yl)-6-pentafluorophenylphenol Ligand (B-195)

An ethyl acetate solution of hydrogen chloride (4M, 40 mL) was added to an ethyl acetate (20 mL) solution of the compound (B-195_9, 4.0 g, 5.5 mmol) at 0° C. under an argon atmosphere. The mixture was gradually warmed to 25° C. and stirred for 1 hours. A saturated sodium hydrogen carbonate solution (50 mL) was added to the reaction mixture, followed by extraction with ethyl acetate (60 mL×3). The extraction liquid was washed with a saturated sodium chloride solution (30 mL) and then dehydrated over anhydrous sodium sulfate. The dehydrated extraction liquid was concentrated under reduced pressure and the resultant crude product was purified by silica gel column chromatography (petroleum ether/ethyl acetate=5/1) to obtain the objective compound (B-195) (1.3 g, 2.1 mmol, 38% yield) as a white powder.

$^1$H-NMR ($C_6D_6$, δ, ppm): 7.72 (dd, J=14.0, 2.0 Hz, 1H), 7.73 (s, 6.99 (t, J=8.4 Hz, 2H), 6.89 (s, 1H), 6.20 (dd, J=8.4, 2.4 Hz, 4H), 3.17 (s, 12H), 2.73 (t, J=7.6 Hz, 2H), 2.16 (t, J=7.6 Hz, 2H), 1.55 (s, 3H); $^{31}$P-NMR ($C_6D_6$, δ, ppm): −58.4 (s).

Synthetic Example 2: Synthesis of 2-bis(2,6-dimethoxy-4-(3-butanon-1-yl)phenyl)phosphanyl-6-pentafluorophenylphenol Ligand (B-200)

(1) Synthesis of 1-bromo-2-(methoxymethoxy)-3-bis(2,6-dimethoxy-4-((2-methyl-1,3-dioxolan-2-yl)ethyl)phenyl)phosphanylbenzene (B-200_5A)

(1-1) Isopropylmagnesium chloride (25.0 mL, 2.0M, 50.0 mmol) was added dropwise to an anhydrous tetrahydrofuran (60 mL) solution of 1,3-dibromo-2-(methoxymethoxy)benzene (14.8 g, 50 mmol) at −30° C. under an argon atmosphere and the mixture was gradually warmed to 25° C., followed by stirring for 2 hours. Thereafter, the reaction mixture was cooled to −78° C. and stirred for 15 minutes and then phosphorus trichloride (20.5 g, 149 mmol) was added dropwise to the mixture cooled to −78° C. After the reaction mixture was gradually warmed to 25° C. and stirred for 1 hour, the solvent was removed by distillation in vacuo. The resultant residue was dissolved in anhydrous tetrahydrofuran (100 mL).

(1-2) An n-hexane solution of n-butyllithium (40.0 mL, 2.5M, 100 mmol) was added dropwise to an anhydrous tetrahydrofuran (100 mL) of 1,3-dimethoxy-5-(2-methyl-1,3-dioxolan-2-yl)-2-ethyl)benzene (25.2 g, 99.9 mmol) at 0° C. under an argon atmosphere and then the whole was gradually warmed to 25° C. and stirred for 2 hours. The reaction mixture was added dropwise to the mixture synthesized in (1-1) at −78° C. and then the whole was gradually warmed to 25° C., followed by stirring for 16 hours. Ice-water (300 mL) was added to the reaction mixture and then the organic solvent was removed under reduced pressure. After it was extracted with ethyl acetate (150 mL×3), the extraction liquid was washed with a saturated sodium chloride solution (300 mL) and then dehydrated over anhydrous sodium sulfate. The resultant extraction liquid was concentrated and the resultant crude product was purified by silica gel column chromatography (petroleum ether/ethyl acetate=5/1) to obtain the objective compound (B-200_5A) (13.8 g, 18.4 mmol, 37% yield) as a white solid.

(2) Synthesis of 1-(pentafluorophenyl)-2-(methoxymethoxy)-3-bis(2,6-dimethoxy-4-((2-methyl-1,3-dioxolan-2-yl)ethyl)phenyl)phosphanylbenzene (B-200_6)

An n-hexane solution of n-butyllithium (7.3 mL, 2.5M, 18.3 mmol) was added dropwise to an anhydrous tetrahydrofuran (20 mL) solution of the compound (B-200_5A, 13.8 g, 18.4 mmol) at −78° C. under an argon atmosphere and then the mixture was stirred at −78° C. for 1 hour. Hexafluorobenzene (11.3 g, 60.7 mmol) was added dropwise thereto and the whole was gradually warmed to 25° C., followed by stirring for 16 hours. After ice-water (100 mL) was added to the reaction mixture, the organic solvent was removed under reduced pressure. It was extracted with ethyl acetate (50 mL×3). The extraction liquid was washed with a saturated sodium chloride solution (100 mL) and then dehydrated over anhydrous sodium sulfate, followed by filtration. The filtrate was concentrated and the resultant crude product was purified by silica gel column chromatography (petroleum ether/ethyl acetate=5/1) to obtain the objective compound (B-200_6) (5.80 g, 6.9 mmol, 38% yield) as a white solid.

(3) Synthesis of 2-bis(2,6-dimethoxy-4-(3-butanon-1-yl)phenyl)phosphanyl-6-pentafluorophenylphenol Ligand (B-200)

An ethyl acetate solution of hydrogen chloride (4M, 10.0 mL) was added dropwise to an ethyl acetate (6.0 mL) solution of the compound (B-200_6, 0.200 g, 0.239 mmol) at 0° C. under an argon atmosphere. The mixture was gradually warmed to 15° C. and stirred for 1.0 hours and then the organic solvent was removed under reduced pressure. A saturated sodium hydrogen carbonate solution (30 mL) was added thereto, followed by extraction with ethyl acetate (30 mL×3). The extraction liquid was washed with a saturated sodium chloride solution (30 mL) and then dehydrated over anhydrous sodium sulfate, followed by filtration. The filtrate was concentrated under reduced pressure and the resultant crude product was purified by silica gel column chromatography (petroleum ether/ethyl acetate=5/1) to obtain the objective compound (B-200) (0.100 g, 0.142 mmol, 59% yield) as a white solid.

$^1$H-NMR ($C_6D_6$, δ, ppm): 7.72 (ddd, J=13.2, 7.6, 1.2 Hz, 1H), 7.83 (br(s), 1H), 7.03 (d, J=7.2 Hz, 1H), 6.84 (t, J=7.6 Hz, 1H), 6.15 (d, J=2.8 Hz, 4H), 3.24 (s, 12H), 2.72 (t, J=7.6 Hz, 4H), 2.18 (t, J=7.6 Hz, 4H), 1.62 (s, 6H); $^{31}$P-NMR ($C_6D_6$, δ, ppm): −59.7 (s).

Synthetic Example 3: Synthesis of 2-(2,6-dimethoxyphenyl)(2,6-diphenoxyphenyl)phosphanyl-4-(3-butanon-1-yl)-6-pentafluorophenyl Phenol Ligand (B-203)

(1) Synthesis of 2-methyl-2-(3-bromo-4-(methoxymethoxy)-5-(2,6-dimethoxyphenyl)(2,6-diphenoxyphenyl)phosphanylphenyl)ethyl)-1,3-dioxolane (B-203_11A)

(1-1) 1,3-Dimethoxy-2-iodobenzene (2, 1.3.2 g, 50.0 mmol) was dissolved in anhydrous tetrahydrofuran (60 mL) and a tetrahydrofuran solution of isopropylmagnesium chloride (25.0 mL, 2.0M, 50.0 mmol) was gradually added thereto at −30° C., followed by stirring the resultant mixture at 15° C. for 1 hour. Then, the mixture was cooled to −78° C. and phosphorus trichloride (8.40 g, 61.2 mmol) was added thereto, followed by stirring for another 1 hour. Thereafter, the solvent and excessive phosphorus trichloride were removed in vacuo and then anhydrous tetrahydrofuran (80 mL) was added to the residue. The resultant one was used in the next reaction.

(1-2) An n-hexane solution of n-butyllithium (20.0 mL, 2.50M, 50.0 mmol) was added dropwise to an anhydrous tetrahydrofuran (40 mL) solution of 1,3-diphenoxybenzene (13.1 g, 49.9 mmol) at 0° C. under an argon atmosphere and then the whole was gradually warmed to 15° C. and stirred for 2 hours. The mixed solution was added dropwise to the tetrahydrofuran solution obtained in (1-1) at −78° C. and the whole was gradually warmed to 15° C., followed by stirring for 1 hour.

(1-3) An n-hexane solution of n-butyllithium (20.0 mL, 2.50M, 50.0 mmol) was added dropwise to an anhydrous tetrahydrofuran (50 mL) solution of 2-methyl-2-(2-(3,5-dibromo-4-(methoxymethoxy)phenyl)ethyl)-1,3-dioxolane (B-195_7, 20.5 g, 50.0 mmol) at −78° C. under an argon atmosphere, followed by stirring for another 1 hour. The mixture was added to the mixture obtained in (1-2) at −78° C. and the whole was gradually warmed to 15° C., followed by stirring for 16 hours. Ice-water (300 mL) was added to the reaction mixture and then the organic solvent was removed under reduced pressure, followed by extraction with ethyl acetate (150 mL×3). The extraction liquid was washed with a saturated sodium chloride solution (300 mL) and then dehydrated over anhydrous sodium sulfate, followed by filtration. Thereafter, the filtrate was concentrated and the resultant crude product was purified by silica gel column chromatography (petroleum ether/ethyl acetate=20/1) to obtain the objective compound (B-203_11A) (13.8 g, 18.2 mmol, 36% yield) as a white solid.

(2) Synthesis of 2-methyl-2-(2-(3-(pentafluorophenyl)-4-(methoxymethoxy)-5-(2,6-dimethoxyphenyl)(2,6-diphenoxyphenyl)phosphanylphenyl)ethyl)-1,3-dioxolane (B-203_12A)

An n-hexane solution of n-butyllithium (7.3 mL, 2.5M, 18.3 mmol) was added dropwise to an anhydrous tetrahydrofuran (50 mL) solution of the compound (B-203_11A, 13.8 g, 18.2 mmol) at −78° C. under an argon atmosphere and then the mixture was stirred at −78° C. for 1 hour. Hexafluorobenzene (12.5 g, 67.2 mmol) was added dropwise thereto and the whole was gradually warmed to 15° C., followed by stirring for 16 hours. After ice-water (100 mL) was added to the reaction mixture, the organic solvent was removed under reduced pressure. The residue was extracted with ethyl acetate (150 mL×3). The extraction liquid was washed with a saturated sodium chloride solution (150 mL) and then dehydrated over anhydrous sodium sulfate, followed by filtration. The filtrate was concentrated and the resultant crude product was purified by silica gel column chromatography (petroleum ether/ethyl acetate=20/1) to obtain the objective compound (B-203_12A) (9.50 g, 11.2 mmol, 62% yield) as a white solid.

(3) Synthesis of 2-(2,6-dimethoxyphenyl)(2,6-diphenoxyphenyl)phosphanyl-4-(3-butanon-1-yl)-6-pentafluorophenylphenol Ligand (B-203)

An ethyl acetate solution of hydrogen chloride (4M, 15 mL) was added dropwise to an ethyl acetate (8 mL) solution of the compound (B-203_12A, 0.403 g, 0.486 mmol) at 0° C. under an argon atmosphere. The mixture was gradually warmed to 25° C. and stirred for 1 hours and then the organic solvent was removed under reduced pressure. A saturated sodium hydrogen carbonate solution (30 mL) was added to the resultant residue, followed by extraction with ethyl acetate (30 mL×2). The extraction liquid was washed with a saturated sodium chloride solution (30 mL) and then dehydrated over anhydrous sodium sulfate, followed by filtration. The filtrate was concentrated under reduced pressure to obtain the objective compound (B-203) (0.36 g, 0.474 mmol, 98% yield) as a white powder.

$^1$H-NMR (C$_6$D$_6$, δ, ppm): 7.68 (s, 1H), 7.64 (dd, J=13.2, 2.0 Hz, 1H), 6.99-6.94 (m, 4H), 6.90 (t, J=8.4 Hz, 1H), 6.80-6.71 (m, 8H), 6.50 (dd, J=8.0, 2.8 Hz, 2H), 6.09 (dd, J=8.0, 2.8 Hz, 2H), 3.17 (s, 6H), 2.53 (t, J=7.6 Hz, 2H), 1.98 (t, J=7.6 Hz, 2H), 1.53 (s, 3H); $^{31}$P-NMR (C$_6$D$_6$, δ, ppm): −59.2 (s).

Synthetic Example 4: Synthesis of 2-bis(2,6-dimethoxy-4-(3-butanon-1-yl)phenyl)phosphanyl-6-trimethylsilylphenol Ligand (B-302)

(1) Synthesis of 1-(trimethylsilyl)-2-(methoxymethoxy)-3-bis(2,6-dimethoxy-4-((2-methyl-1,3-dioxolan-2-yl)ethyl)phenyl)phosphanyl-benzene (B-302_10)

An n-hexane solution of n-butyllithium (6.70 mL, 2.5M, 16.8 mmol) was added dropwise to an anhydrous tetrahydrofuran (60 mL) solution of 1-bromo-2-(methoxymethoxy)-3-bis(2,6-dimethoxy-4-((2-methyl-1,3-dioxolan-2-yl)ethyl)phenyl)phosphanylbenzene (B-200_5A, 12.5 g, 16.7 mmol) at −78° C. under an argon atmosphere and then the mixture was stirred at −78° C. for 1 hour. Trimethylsilyl chloride (2.20 g, 20.3 mmol) was added dropwise thereto and then the mixture was gradually warmed to 15° C., followed by stirring for 14 hours. Ice-water (100 mL) was added to the reaction mixture, followed by extraction with ethyl acetate (100 mL×3). The extraction liquid was washed with a saturated sodium chloride solution (150 mL) and then dehydrated over anhydrous sodium sulfate, followed by filtration. The filtrate was concentrated and the resultant crude product was purified by silica gel column chromatography (petroleum ether/ethyl acetate=5/1) to obtain the objective compound (B-302_10) (7.50 g, 10.1 mmol, 60% yield) as a white solid.

(2) Synthesis of 2-bis(2,6-dimethoxy-4-(3-butanon-1-yl)phenyl)phosphanyl-6-trimethylsilylphenol Ligand (B-302)

An ethyl acetate solution of hydrogen chloride (4M, 20.0 mL) was added dropwise to an ethyl acetate (60 mL) solution of the compound (B-302_10, 3.00 g, 4.04 mmol) at 0° C. under an argon atmosphere, followed by stirring for another 1 hour. A saturated sodium hydrogen carbonate solution (60 mL) was added to the reaction mixture, followed by extraction with ethyl acetate (60 ml×3). The extraction liquid was washed with a saturated sodium chloride solution (60 mL) and then dehydrated over anhydrous sodium sulfate, followed by filtration. The filtrate was concentrated under reduced pressure and the resultant crude product was purified by silica gel column chromatography (petroleum ether/ethyl acetate=1/1) to obtain the objective compound (B-302) (1.50 g, 2.46 mmol, 61% yield) as a white solid.

$^1$H-NMR (C$_6$D$_6$, δ, ppm): 7.72 (ddd, J=12.8, 7.2, 1.6 Hz, 1H), 7.55 (d, J=4.8 Hz, 1H), 7.39 (d, J=7.2, 1.6 Hz, 1H), 6.89 (t, J=7.2 Hz, 1H), 6.15 (d, J=2.8 Hz, 4H), 3.24 (s, 12H), 2.73 (t, J=7.6 Hz, 4H), 2.19 (t, J=7.6 Hz, 4H), 1.63 (s, 6H), 0.40 (s, 9H); $^{31}$P-NMR (C$_6$D$_6$, δ, ppm): −61.9 (s).

Synthetic Example 5: Synthesis of 2-bis(2,6-dimethoxyphenyl)phosphanyl-4-(2-hydroxyethoxy) methyl)-6-pentafluorophenylphenol Ligand (B-304)

(1) Synthesis of 3,5-dibromo-4-(methoxymethoxy)benzaldehyde (B-304_6)

Diisopropylethylamine (84.1 g, 0.651 mol) and chloromethyl methyl ether (52.4 g, 0.651 mol) were added to an anhydrous methylene chloride (500 mL) solution of 1,3-dibromo-4-hydroxybenzaldehyde (90.8 g, 0.324 mol), followed by stirring for another 14 hours. A saturated sodium hydrogen carbonate solution (30 mL) was added to the reaction mixture, followed by extraction with methylene chloride (300 mL×3). The extraction liquid was washed with a saturated sodium chloride solution (300 mL) and then dehydrated over anhydrous sodium sulfate, followed by filtration. The filtrate was concentrated under reduced pressure to obtain the objective compound (B-304_6) (97.0 g, 0.299 mol, 92% yield) as a white solid.

(2) Synthesis of 3,5-dibromo-4-(methoxymethoxy)benzenemethanol (B-304_7)

Sodium borohydride (84.1 g, 2.22 mol) was added to a solution of anhydrous tetrahydrofuran (200 mL) and anhydrous methanol (200 mL) of the compound (B-304_6, 97.0 g, 0.324 mol) at 0° C. under an argon atmosphere, followed by stirring for another 1 hour. A saturated ammonium chloride solution (300 mL) was added to the reaction mixture, followed by extraction with methylene chloride (300 mL×3). The extraction liquid was washed with a saturated sodium chloride solution (300 mL) and then dehydrated over anhydrous sodium sulfate, followed by filtration. The filtrate was concentrated under reduced pressure to obtain the objective compound (B-304_7) (82.4 g, 0.253 mol, 78% yield) as a white solid.

(3) Synthesis of 3,5-dibromo-4-(methoxymethoxy)benzyl Bromide (B-304_8)

Triphenylphosphine (21.9 g, 83.5 mmol) and N-bromosuccinimide (14.9 g, 83.7 mmol) were added to an anhydrous methylene chloride (100 mL) solution of the compound (B-304_7, 18.0 g, 55.2 mmol) at 0° C. under an argon atmosphere, followed by stirring for another 1 hour. Ice-water (100 mL) was added to the reaction mixture, followed by extraction with methylene chloride (100 mL×3). The extraction liquid was washed with a saturated sodium chloride solution (100 mL) and then dehydrated over anhydrous sodium sulfate, followed by filtration. A crude product obtained by concentrating the filtrate under reduced pressure was purified by silica gel column chromatography (petroleum ether/ethyl acetate=10/1) to obtain the objective compound (B-304_8) (14.0 g, 36.0 mmol, 65% yield) as a white solid.

(4) Synthesis of 1-(methoxymethoxy)-2,6-dibromo-4-(2-(1-tetrahydro-2H-pyran-2-yl)ethoxymethyl)benzene (B-304_10)

Sodium hydride (1.10 g, 27.5 mmol, mineral oil 40 wt %) was added to an anhydrous tetrahydrofuran (60 mL) of 2-(1-tetrahydro-2H-pyran-2-yl)oxy)ethanol (3.80 g, 26.0 mmol) at 0° C. under an argon atmosphere and then the mixture was stirred for another 15 minutes. After an anhydrous tetrahydrofuran (20 mL) solution of the compound (B-304_8, 10.0 g, 25.7 mmol) was added dropwise thereto at 0° C. under an argon atmosphere, the mixture was gradually warmed to 15° C. and stirred for 24 hours. Ice-water (100 mL) was added to the reaction mixture, followed by extraction with methylene chloride (100 mL×3). The extraction liquid was washed with a saturated sodium chloride solution (100 mL), dehydrated over anhydrous sodium sulfate, and filtrated. A crude product obtained by concentrating the filtrate under reduced pressure was purified by silica gel column chromatography (petroleum ether/ethyl acetate=10/1) to obtain the objective compound (B-304_10) (7.94 g, 17.5 mmol, 68% yield) as a white solid.

(5) Synthesis of 1-(methoxymethoxy)-2-bromo-4-(2-(1-tetrahydro-2H-pyran-2-yl)ethoxymethyl)-6-(bis(2,6-dimethoxyphenyl)phosphanyl)benzene (B-304_11)

(5-1) 2,6-Dimethoxyiodobenzene (2, 11.0 g, 41.7 mmol) was dissolved in anhydrous tetrahydrofuran (40 mL) and a tetrahydrofuran solution of isopropylmagnesium chloride (21.0 mL, 2.0M, 42.0 mmol) was gradually added thereto at −30° C. and then the whole was warmed to 15° C. and stirred for 1 hour. Then, the mixture was cooled to −78° C. and phosphorus trichloride (2.90 g, 21.1 mmol) was gradually added thereto, and then the mixture was gradually warmed to 15° C. and stirred for 1 hour. After the solvent was removed from the reaction mixture in vacuo, anhydrous tetrahydrofuran (50 mL) was added to the residue.

(5-2) An n-hexane solution of n-butyllithium (8.4 mL, 2.5M, 21.0 mmol) was added dropwise to an anhydrous tetrahydrofuran (60 mL) solution of the compound (B-304_10, 9.50 g, 20.9 mmol) at −78° C. under an argon atmosphere and then the mixture was stirred for 1 hour. The reaction solution obtained in (5-1) was added dropwise thereto at −78° C. and the whole was gradually warmed to 15° C. for 14 hours. Ice-water (100 mL) was added to the reaction mixture, followed by extraction with methylene chloride (150 mL×3). The extraction liquid was washed with a saturated sodium chloride solution (50 mL) and then dehydrated over anhydrous sodium sulfate. The dehydrated extraction liquid was concentrated and the resultant crude product was purified by silica gel column chromatography (petroleum ether/ethyl acetate=2/1) to obtain the objective compound (B-304_11) (13.0 g, 19.1 mmol, 91% yield) as a colorless transparent liquid.

(6) Synthesis of 1-(methoxymethoxy)-2-(bis(2,6-dimethoxyphenyl)phosphanyl)-4-(2-(1-tetrahydro-2H-pyran-2-yl)ethoxymethyl)-6-pentafluorophenyl-benzene (B-304_12)

An n-hexane solution of n-butyllithium (7.80 mL, 2.5M, 19.5 mmol) was added dropwise to an anhydrous tetrahydrofuran (100 mL) solution of the compound (B-304_11, 13.0 g, 19.1 mmol) at −78° C. under an argon atmosphere and then the mixture was stirred at −78° C. for 1 hour. Hexafluorobenzene (9.60 g, 51.6 mmol) was added dropwise thereto and then the whole was gradually warmed to 15° C. and stirred for 14 hours. Ice-water (100 mL) was added to the reaction mixture, followed by extraction with ethyl acetate (100 mL×3). The extraction liquid was washed with a saturated sodium chloride solution (150 mL) and then dehydrated over anhydrous sodium sulfate, followed by filtration. A crude product obtained by concentrating the filtrate was purified by silica gel column chromatography (petroleum ether/ethyl acetate=1/1) to obtain the objective compound (B-304_12) (5.00 g, 6.52 mmol, 34% yield) as a white solid.

(7) Synthesis of 2-bis(2,6-methoxyphenyl)phosphanyl-4-(2-hydroxyethoxy)methyl)-6-pentafluorophenylphenol Ligand (B-304)

An ethyl acetate solution of hydrogen chloride (2M, 30 mL) was added dropwise to a methylene chloride (30 mL) solution of the compound (B-304_12, 4.00 g, 5.22 mmol) at 0° C. under an argon atmosphere, followed by stirring for another 15 minutes. A saturated sodium hydrogen carbonate solution (60 mL) was added to the reaction mixture, followed by extraction with ethyl acetate (60 mL×2). The extraction liquid was washed with a saturated sodium chloride solution (60 mL) and then dehydrated over anhydrous sodium sulfate. A crude product obtained by concentrating the filtrate was purified by silica gel column chromatography (petroleum ether/ethyl acetate=1/1) to obtain the objective compound (B-304) (1.00 g, 1.57 mmol, 30% yield) as a white solid.

$^1$H-NMR ($C_6D_6$, δ, ppm): 8.20 (dd, J=13.6, 2.0 Hz, 1H), 7.96 (br(s), 1H), 7.21 (s, 1H), 7.07 (t, J=8.4 Hz, 2H), 6.27 (dd, J=8.4, 2.8 Hz, 4H), 4.30 (s, 2H), 3.56 (br, 2H), 3.32 (t, J=4.0 Hz, 2H), 3.23 (s, 12H), 1.75 (br(s), 1H); $^{31}$P-NMR ($C_6D_6$, δ, ppm): −58.6 (s).

Synthetic Example 6: Synthesis of B-27DM and B-111

Synthesis of B-27DM and is preformed with reference to WO2010/050256 and JP-A-2013-043871.

3. Preparation of Olefin Polymerization Catalyst

The following operations are all conducted under a nitrogen atmosphere.

Solvent: toluene and n-hexane are used as deoxygenated and dehydrated ones.

TiBA: triisobutylaluminum, BHT: dibutylhydroxytoluene, Et; ethyl group, iBu: isobutyl group, iPr: isopropyl group, Ni(COD)$_2$: bis(cyclooctadiene)nickel, AliBu$_2$BHT: (2,6-di-t-butyl-4-methylphenoxy)diisobutylaluminum <Preparation of Polymerization Catalyst 1>

Preparation of solid carrier 1: Silica calcinated at 600° C. (1.03 g) (Grace 948) was collected and toluene (4 mL) was added thereto. Thereafter, a toluene solution of AliBu$_2$BHT (0.25M, 6.2 mL, 1.5 mmol) was added at room temperature with stirring, followed by reaction at 70° C. for 1 hour. The toluene solution of AliBu$_2$BHT was prepared by adding a toluene solution of BHT (0.47M, 14.0 mL, 6.6 mmol) to a toluene solution of TIBA (0.51M, 13.0 mL, 6.6 mmol) dropwise at room temperature over a period of 5 minutes and stirring the whole at room temperature for 10 minutes and for another 1 hour after heating to 100° C. The toluene solution containing silica was washed with toluene (20 mL) three times and then dried under reduced pressure to obtain 1.18 g of the solid carrier 1.

Preparation of metal catalyst component 1: Ni(COD)$_2$ (51.3 mg, 0.187 mmol) was dissolved in 4 mL of toluene to prepare a toluene solution of 0.047M Ni(COD)$_2$. The prepared toluene solution of Ni(COD)$_2$ (4 mL) was added to B-195 (114.6 mg, 0.181 mmol) and the whole was stirred at room temperature for 20 minutes to obtain a toluene solution containing the metal catalyst component 1.

Preparation of polymerization catalyst 1: The metal catalyst component 1 (4 mL) was added to the solid carrier 1 (1.18 g) at room temperature and they were brought into contact with each other at 40° C. for 1 hour. The mixture was washed with toluene (20 mL) three times and with n-hexane (20 mL) twice and then dried under reduced pressure to obtain 1.28 g of the polymerization catalyst 1.

<Preparation of Polymerization Catalyst 2>

Preparation of solid carrier 2: Silica calcinated at 600° C. (1.05 g) (Grace 948) was collected and toluene (8 mL) was added thereto. Thereafter, a toluene solution of AliBu$_2$BHT (0.25M, 2.1 mL, 0.5 mmol) was added at room temperature with stirring, followed by a reaction at 70° C. for 1 hour. The toluene solution of AliBu$_2$BHT was prepared in the same manner as in Example 1 to be mentioned later. The toluene solution containing silica was washed with toluene (20 mL) three times and then dried under reduced pressure to obtain 1.18 g of the solid carrier 2.

Preparation of metal catalyst component 2: Ni(COD)$_2$ (48.5 mg, 0.176 mmol) was dissolved in 4 mL of toluene to prepare a toluene solution of 0.044M Ni(COD)$_2$. The prepared toluene solution of Ni(COD)$_2$ (4 mL) was added to B-200 (135.3 mg, 0.192 mmol) and the whole was stirred at room temperature for 20 minutes to obtain a toluene solution containing the metal catalyst component 2.

Preparation of polymerization catalyst 2: The metal catalyst component 2 (4 mL) was added to the solid carrier 2 (1.18 g) at room temperature and they were brought into contact with each other at 40° C. for 1 hour. The mixture was washed with toluene (20 mL) three times and with n-hexane (20 mL) twice and then dried under reduced pressure to obtain 1.27 g of the polymerization catalyst 2.

<Preparation of Polymerization Catalyst 3>

Preparation of solid carrier 3: Silica calcinated at 600° C. (1.06 g) (Grace 948) was collected and toluene (4 mL) was added thereto. Thereafter, a toluene solution of AliBu$_2$BHT (0.25M, 6.5 mL, 1.6 mmol) was added at room temperature with stirring, followed by a reaction at 70° C. for 1 hour. The toluene solution of AliBu$_2$BHT was prepared in the same manner as in Example 1. The toluene solution containing silica was washed with toluene (20 mL) three times and then dried under reduced pressure to obtain 1.21 g of the solid carrier 3.

Preparation of metal catalyst component 3: Ni(COD)$_2$ (57.6 mg, 0.209 mmol) was dissolved in 4 mL of toluene to prepare a toluene solution of 0.052M Ni(COD)$_2$. The prepared toluene solution of Ni(COD)$_2$ (4 mL) was added to B-203 (156.7 mg, 0.207 mmol) and the whole was stirred at room temperature for 20 minutes to obtain a toluene solution containing the metal catalyst component 3.

Preparation of polymerization catalyst 3: The metal catalyst component 3 (4 mL) was added to the solid carrier 3 (1.21 g) at room temperature and they were brought into contact with each other at 40° C. for 1 hour. The mixture was washed with toluene (20 mL) three times and with n-hexane (20 mL) twice and then dried under reduced pressure to obtain 1.35 g of the polymerization catalyst 3.

<Preparation of Polymerization Catalyst 4>

Preparation of solid carrier 4: Silica calcinated at 600° C. (1.02 g) (Grace 948) was collected and toluene (4 mL) was added thereto. Thereafter, a toluene solution of AliBu$_2$BHT (0.25M, 6.2 mL, 1.5 mmol) was added at room temperature with stirring, followed by a reaction at 70° C. for 1 hour. The toluene solution of AliBu$_2$BHT was prepared in the same manner as in Example 1. The toluene solution containing silica was washed with toluene (20 mL) three times and then dried under reduced pressure to obtain 1.18 g of the solid carrier 4.

Preparation of metal catalyst component 4: Ni(COD)$_2$ (52.2 mg, 0.190 mmol) was dissolved in 4 mL of toluene to prepare a toluene solution of 0.048M Ni(COD)$_2$. The prepared toluene solution of Ni(COD)$_2$ (4 mL) was added to B-302 (114.3 mg, 0.187 mmol) and the whole was stirred at room temperature for 20 minutes to obtain a toluene solution containing the metal catalyst component 4.

Preparation of polymerization catalyst 4: The metal catalyst component 4 (4 mL) was added to the solid carrier 4 (1.18 g) at room temperature and they were brought into contact with each other at 40° C. for 1 hour. The mixture was washed with toluene (20 mL) three times and with n-hexane (20 mL) twice and then dried under reduced pressure to obtain 1.26 g of the polymerization catalyst 4.

<Preparation of Polymerization Catalyst 5>

Preparation of solid carrier 5: Silica calcinated at 600° C. (1.01 g) (Grace 948) was collected and toluene (4 mL) was added thereto. Thereafter, a toluene solution of AliBu$_2$BHT (0.25M, 6.2 mL, 1.5 mmol) was added at room temperature with stirring, followed by a reaction at 70° C. for 1 hour. The toluene solution of AliBu$_2$BHT was prepared in the same manner as in Example 1. The toluene solution containing silica was washed with toluene (20 mL) three times and then dried under reduced pressure to obtain 1.15 g of the solid carrier 5.

Preparation of metal catalyst component 5: Ni(COD)$_2$ (58.9 mg, 0.214 mmol) was dissolved in 4 mL of toluene to prepare a toluene solution of 0.054M Ni(COD)$_2$. The prepared toluene solution of Ni(COD)$_2$ (4 mL) was added to B-304 (131.7 mg, 0.206 mmol) and the whole was stirred at room temperature for 20 minutes to obtain a toluene solution containing the metal catalyst component 5.

Preparation of polymerization catalyst 5: The metal catalyst component 5 (4 mL) was added to the solid carrier 5 (1.15 g) at room temperature and they were brought into contact with each other at 40° C. for 1 hour. The mixture was washed with toluene (20 mL) three times and with n-hexane (20 mL) twice and then dried under reduced pressure to obtain 1.21 g of the polymerization catalyst 5.

<Preparation of Polymerization Catalyst 6>

Preparation of solid carrier 6: Silica calcinated at 600° C. (0.98 g) (Grace 948) was collected and toluene (5 mL) was added thereto. Thereafter, a toluene solution of Al(OiPr)$_3$ (0.46M, 4.2 mL, 1.9 mmol) was added at room temperature with stirring, followed by a reaction at 70° C. for 1 hour. Thereafter, the mixture was washed with toluene (20 mL) three times and then dried under reduced pressure to obtain 1.10 g of the solid carrier 6.

Preparation of metal catalyst component 6: Ni(COD)$_2$ (58.2 mg, 0.212 mmol) was dissolved in 4 mL of toluene to prepare a toluene solution of 0.053M Ni(COD)$_2$. The prepared toluene solution of Ni(COD)$_2$ (4 mL) was added to B-203 (155.7 mg, 0.205 mmol) and the whole was stirred at room temperature for 30 minutes to obtain a toluene solution containing the metal catalyst component 6.

Preparation of polymerization catalyst 6: The metal catalyst component 6 (4 mL) was added to the solid carrier 6 (1.10 g) at room temperature and they were brought into contact with each other at 40° C. for 2 hours. The mixture was washed with toluene (20 mL) four times and with n-hexane (20 mL) twice and then dried under reduced pressure to obtain 1.14 g of the polymerization catalyst 6.

<Preparation of Polymerization Catalyst 7>

Preparation of solid carrier 7: Silica calcinated at 600° C. (1.00 g) (Grace 948) was collected and toluene (6 mL) was added thereto. Thereafter, a toluene solution of AliBu$_2$(OEt) (0.47M, 4.3 mL, 2.0 mmol) was added at room temperature with stirring, followed by a reaction at 70° C. for 1 hour. The toluene solution of AliBu$_2$(OEt) was prepared by adding a toluene solution of Al(OEt)$_3$ (0.40M, 10.0 mL, 4.0 mmol) to a toluene solution of TIBA (0.51M, 16.0 mL, 8.2 mmol) dropwise at 80° C. over a period of 3 minutes and stirring the whole at 80° C. for 1 hour. The toluene solution containing silica was washed with toluene (20 mL) three times and then dried under reduced pressure to obtain 1.13 g of the solid carrier 7.

Preparation of metal catalyst component 7: Ni(COD)$_2$ (58.0 mg, 0.211 mmol) was dissolved in 4 mL of toluene to prepare a toluene solution of 0.053M Ni(COD)$_2$. The prepared toluene solution of Ni(COD)$_2$ (4 mL) was added to B-203 (157.4 mg, 0.208 mmol) and the whole was stirred at room temperature for 30 minutes to obtain a toluene solution containing the metal catalyst component 7.

Preparation of polymerization catalyst 7: The metal catalyst component 7 (4 mL) was added to the solid carrier 7 (1.13 g) at room temperature and they were brought into contact with each other at 40° C. for 1 hour. The mixture was washed with toluene (20 mL) three times and with n-hexane (20 mL) twice and then dried under reduced pressure to obtain 1.22 g of the polymerization catalyst 7.

<Preparation of Polymerization Catalyst 8>

Preparation of solid carrier 8: Silica calcinated at 600° C. (1.04 g) (Grace 948) was collected and a toluene solution of AliBu(OEt)$_2$ (0.29M, 5.3 mL, 1.60 mmol) was added thereto at room temperature, followed by stirring at 70° C. for 1 hour. The toluene solution of AliBu(OEt)$_2$ was prepared by adding a toluene solution of TIBA (0.51M, 3.6 mL, 1.8 mmol) to a toluene solution of Al(OEt)$_3$ (0.24M, 15.0 mL, 3.6 mmol) at room temperature and stirring the whole for 1 hour after heating to 105° C. The toluene solution containing silica was washed with toluene (20 mL) three times and then dried under reduced pressure to obtain 1.23 g of the solid carrier 8.

Preparation of metal catalyst component 8: Ni(COD)$_2$ (55.8 mg, 0.203 mmol) was dissolved in 4 mL of toluene to prepare a toluene solution of 0.051M Ni(COD)$_2$. The prepared toluene solution of Ni(COD)$_2$ (4 mL) was added to B-203 (147.8 mg, 0.195 mmol) and the whole was stirred at room temperature for 20 minutes to obtain a toluene solution containing the metal catalyst component 8.

Preparation of polymerization catalyst 8: The metal catalyst component 8 (4 mL) was added to the solid carrier 8 (1.23 g) at room temperature and they were brought into contact with each other at 40° C. for 1 hour. The mixture was washed with toluene (20 mL) four times and with n-hexane (20 mL) twice and then dried under reduced pressure to obtain 1.24 g of the polymerization catalyst 8.

<Preparation of Polymerization Catalyst 9>

Preparation of solid carrier 9: Silica calcinated at 600° C. (1.05 g) (Grace 948) was collected and toluene (9 mL) was added thereto. Thereafter, a toluene solution of AlEt$_2$(OEt) (0.50M, 1.0 mL, 0.5 mmol) was added at room temperature, followed by stirring at 70° C. for 1 hour. The mixture was washed with toluene (20 mL) twice and then dried under reduced pressure to obtain 1.10 g of the solid carrier 9.

Preparation of metal catalyst component 9: Ni(COD)$_2$ (59.8 mg, 0.217 mmol) was dissolved in 4 mL of toluene to prepare a toluene solution of 0.054M Ni(COD)$_2$. The prepared toluene solution of Ni(COD)$_2$ (4 mL) was added to B-203 (161.0 mg, 0.212 mmol) and the whole was stirred at room temperature for 25 minutes to obtain a toluene solution containing the metal catalyst component 9.

Preparation of polymerization catalyst 9: The metal catalyst component 9 (4 mL) was added to the solid carrier 9 (1.10 g) at room temperature and they were brought into contact with each other at 40° C. for 1 hour. The mixture was washed with toluene (20 mL) three times and with n-hexane (20 mL) twice and then dried under reduced pressure to obtain 1.19 g of the polymerization catalyst 9.

<Preparation of Polymerization Catalyst 10>

Preparation of solid carrier 10: Silica calcinated at 600° C. (0.98 g) (Grace 948) was collected and toluene (5 mL) was added thereto. Thereafter, a toluene solution of Al(OEt)$_3$ (0.08M, 6.4 mL, 0.5 mmol) was added at room temperature, followed by stirring at 70° C. for 1 hour. Thereafter, the mixture was washed with toluene (20 mL) twice and then dried under reduced pressure to obtain 1.04 g of the solid carrier 10.

Preparation of metal catalyst component 10: Ni(COD)$_2$ (50.7 mg, 0.184 mmol) was dissolved in 4 mL of toluene to prepare a toluene solution of 0.046M Ni(COD)$_2$. The prepared toluene solution of Ni(COD)$_2$ (4 mL) was added to B-203 (140.0 mg, 0.185 mmol) and the whole was stirred at room temperature for 20 minutes to obtain a toluene solution containing the metal catalyst component 10.

Preparation of polymerization catalyst 10: The metal catalyst component 10 (4 mL) was added to the solid carrier 10 (1.04 g) at room temperature and they were brought into contact with each other at 40° C. for 1 hour. The mixture was washed with toluene (20 mL) four times and with n-hexane (20 mL) twice and then dried under reduced pressure to obtain 1.07 g of the polymerization catalyst 10.

<Preparation of Polymerization Catalyst 11>

Preparation of solid carrier 11: Silica calcinated at 600° C. (1.05 g) (Grace 948) was collected and toluene (7.3 mL) was added thereto. Thereafter, a toluene solution of B(OnBu)$_3$ (0.20M, 2.7 mL, 0.5 mmol) was added at room temperature, followed by stirring at 70° C. for 1 hour. Thereafter, the mixture was washed with toluene (20 mL) twice and then dried under reduced pressure to obtain 1.09 g of the solid carrier 11.

Preparation of metal catalyst component 11: Ni(COD)$_2$ (56.6 mg, 0.206 mmol) was dissolved in 4 mL of toluene to prepare a toluene solution of 0.052M Ni(COD)$_2$. The prepared toluene solution of Ni(COD)$_2$ (4 mL) was added to B-203 (153.1 mg, 0.202 mmol) and the whole was stirred at room temperature for 30 minutes to obtain a toluene solution containing the metal catalyst component 11.

Preparation of polymerization catalyst 11: The metal catalyst component 11 (4 mL) was added to the solid carrier 11 (1.09 g) at room temperature and they were brought into contact with each other at 50° C. for 1 hour. The mixture was washed with toluene (20 mL) four times and with n-hexane (20 mL) twice and then dried under reduced pressure to obtain 1.13 g of the polymerization catalyst 11.

<Preparation of Polymerization Catalyst 12>

Preparation of solid carrier 12: Silica calcinated at 600° C. (1.04 g) (Grace 948) was collected and toluene (4 mL) was added thereto. Thereafter, a toluene solution of B(OEt)$_3$ (0.26M, 6.1 mL, 1.6 mmol) was added at room temperature, followed by stirring at 70° C. for 1 hour. Thereafter, the mixture was washed with toluene (20 mL) twice and then dried under reduced pressure to obtain 1.09 g of the solid carrier 12.

Preparation of metal catalyst component 12: Ni(COD)$_2$ (51.9 mg, 0.189 mmol) was dissolved in 4 mL of toluene to prepare a toluene solution of 0.047M Ni(COD)$_2$. The prepared toluene solution of Ni(COD)$_2$ (4 mL) was added to B-203 (147.4 mg, 0.194 mmol) and the whole was stirred at room temperature for 20 minutes to obtain a toluene solution containing the metal catalyst component 12.

Preparation of polymerization catalyst 12: The metal catalyst component 12 (4 mL) was added to the solid carrier 12 (1.09 g) at room temperature and they were brought into contact with each other at 60° C. for 30 minutes. The mixture was washed with toluene (20 mL) four times and with n-hexane (20 mL) twice and then dried under reduced pressure to obtain 1.10 g of the polymerization catalyst 12.

<Preparation of Polymerization Catalyst 13>

Preparation of solid carrier 13: Silica calcinated at 600° C. (1.03 g) (Grace 948) was collected and toluene (9 mL) was added thereto. Thereafter, a toluene solution of Et$_2$Zn (0.50M, 0.5 mL, 0.3 mmol) was added at room temperature, followed by stirring at 70° C. for 1 hour. Thereafter, the mixture was washed with toluene (20 mL) three times and then dried under reduced pressure to obtain 1.05 g of the solid carrier 13.

Preparation of metal catalyst component 13: Ni(COD)$_2$ (58.9 mg, 0.214 mmol) was dissolved in 4 mL of toluene to prepare a toluene solution of 0.054M Ni(COD)$_2$. The prepared toluene solution of Ni(COD)$_2$ (4 mL) was added to B-203 (147.6 mg, 0.195 mmol) and the whole was stirred at room temperature for 20 minutes to obtain a toluene solution containing the metal catalyst component 13.

Preparation of polymerization catalyst 13: The metal catalyst component 13 (4 mL) was added to the solid carrier 13 (1.05 g) at room temperature and they were brought into contact with each other at 30° C. for 1 hour. The mixture was washed with toluene (20 mL) four times and with n-hexane (20 mL) twice and then dried under reduced pressure to obtain 1.16 g of the polymerization catalyst 13.

<Preparation of Polymerization Catalyst 14>

Preparation of solid carrier 14: Silica calcinated at 600° C. (1.01 g) (Grace 948) was collected and toluene (7 mL) was added thereto. Thereafter, a toluene solution of nBuLi (0.50M, 3.0 mL, 1.5 mmol) was added at room temperature, followed by stirring at 70° C. for 1 hour. Thereafter, the mixture was washed with toluene (20 mL) three times and then dried under reduced pressure to obtain 1.13 g of the solid carrier 14.

Preparation of metal catalyst component 14: Ni(COD)$_2$ (55.1 mg, 0.200 mmol) was dissolved in 4 mL of toluene to prepare a toluene solution of 0.050M Ni(COD)$_2$. The prepared toluene solution of Ni(COD)$_2$ (4 mL) was added to B-203 (143.0 mg, 0.189 mmol) and the whole was stirred at room temperature for 20 minutes to obtain a toluene solution containing the metal catalyst component 14.

Preparation of polymerization catalyst 14: The metal catalyst component 14 (4 mL) was added to the solid carrier 14 (1.13 g) at room temperature and they were brought into contact with each other at 40° C. for 1 hour. The mixture was washed with toluene (20 mL) four times and with n-hexane (20 mL) twice and then dried under reduced pressure to obtain 1.07 g of the polymerization catalyst 14.

<Preparation of Polymerization Catalyst 15>

Preparation of solid carrier 15: An aqueous solution of LiOH (0.0072 wt %, 100 g) was added to 6.0 g of granulated Montmorillonite (Mizusawa Industrial Chemicals, Ltd.) and the whole was stirred and mixed at room temperature to react them at room temperature for 1 hour. After the resultant one was washed with water and then dried at 100° C., it was further dried at 200° C. under reduced pressure for 1 hour. A toluene solution of B(OEt)$_3$ (0.25M, 6.0 mL, 1.5 mmol) was added to 0.98 g of the dried product at room temperature, followed by reaction at 70° C. for 1 hour. Thereafter, the mixture was washed with toluene (20 mL) twice to obtain 1.03 g of the solid carrier 15.

Preparation of metal catalyst component 15: Ni(COD)$_2$ (56.0 mg, 0.204 mmol) was dissolved in 4 mL of toluene to prepare a toluene solution of 0.050M Ni(COD)$_2$. The prepared toluene solution of Ni(COD)$_2$ (4 mL) was added to B-195 (154.6 mg, 0.204 mmol) and the whole was stirred at room temperature for 20 minutes to obtain a toluene solution containing the metal catalyst component 15.

Preparation of polymerization catalyst 15: The metal catalyst component 15 (4 mL) was added to the solid carrier 15 (1.03 g) at room temperature and they were brought into contact with each other at 60° C. for 1 hour. The mixture was washed with toluene (20 mL) three times and with n-hexane (20 mL) twice and then dried under reduced pressure to obtain 1.06 g of the polymerization catalyst 15.

<Preparation of Polymerization Catalyst 16>

Preparation of solid carrier 16: Silica (1.02 g) (Grace 948) was collected and toluene (8 mL) was added thereto. Thereafter, a toluene solution of B(OEt)$_3$ (0.26M, 2.0 mL, 0.5 mmol) was added at room temperature, followed by stirring at 70° C. for 1 hour. Thereafter, the mixture was washed with toluene (20 mL) three times and then dried under reduced pressure to obtain 1.02 g of the solid carrier 16.

Preparation of metal catalyst component 16: Ni(COD)$_2$ (57.7 mg, 0.210 mmol) was dissolved in 4 mL of toluene to prepare a toluene solution of 0.053M Ni(COD)$_2$. The prepared toluene solution of Ni(COD)$_2$ (4 mL) was added to B-203 (157.2 mg, 0.207 mmol) and the whole was stirred at room temperature for 20 minutes to obtain a toluene solution containing the metal catalyst component 16.

Preparation of polymerization catalyst 16: The metal catalyst component 16 (4 mL) was added to the solid carrier 16 (1.02 g) at room temperature and they were brought into contact with each other at 50° C. for 2 hours. The mixture was washed with toluene (20 mL) four times and with n-hexane (20 mL) twice and then dried under reduced pressure to obtain 1.08 g of the polymerization catalyst 16.

<Preparation of Polymerization Catalyst 16>

Preparation of solid carrier 16: Silica calcinated at 600° C. (1.02 g) (Grace 948) was collected and toluene (8 mL) was added thereto. Thereafter, a toluene solution of B(OEt)$_3$ (0.26M, 2.0 mL, 0.5 mmol) was added at room temperature, followed by stirring at 70° C. for 1 hour. Thereafter, the mixture was washed with toluene (20 mL) three times and then dried under reduced pressure to obtain 1.02 g of the solid carrier 16.

Preparation of metal catalyst component 16: Ni(COD)$_2$ (57.7 mg, 0.210 mmol) was dissolved in 4 mL of toluene to prepare a toluene solution of 0.053M Ni(COD)$_2$. The prepared toluene solution of Ni(COD)$_2$ (4 mL) was added to B-203 (157.2 mg, 0.207 mmol) and the whole was stirred at room temperature for 20 minutes to obtain a toluene solution containing the metal catalyst component 16.

Preparation of polymerization catalyst 16: The metal catalyst component 16 (4 mL) was added to the solid carrier 16 (1.02 g) at room temperature and they were brought into contact with each other at 50° C. for 2 hours. The mixture was washed with toluene (20 mL) four times and with n-hexane (20 mL) twice and then dried under reduced pressure to obtain 1.08 g of the polymerization catalyst 16.

<Preparation of Polymerization Catalyst 17>

Preparation of solid carrier 17: Silica calcinated at 600° C. (0.99 g) (Grace 948) was collected and toluene (8 mL) was added thereto. Thereafter, a toluene solution of AliBu$_2$(OEt) (0.50M, 3.0 mL, 1.5 mmol) was added at room temperature, followed by stirring at 70° C. for 1 hour. The toluene solution of AliBu$_2$(OEt) was prepared in the same manner as in the case of the polymerization catalyst 7. The solution containing silica was washed with toluene (20 mL) three times and then dried under reduced pressure to obtain 1.08 g of the solid carrier 17.

Preparation of metal catalyst component 17: Ni(COD)$_2$ (59.9 mg, 0.218 mmol) was dissolved in 4 mL of toluene to prepare a toluene solution of 0.055M Ni(COD)$_2$. The prepared toluene solution of Ni(COD)$_2$ (4 mL) was added to B-195 (128.9 mg, 0.203 mmol) and the whole was stirred at room temperature for 30 minutes to obtain a toluene solution containing the metal catalyst component 17.

Preparation of polymerization catalyst 17: The metal catalyst component 17 (4 mL) was added to the solid carrier 17 (1.08 g) at room temperature and they were brought into contact with each other at 40° C. for 1 hour. The mixture was washed with toluene (20 mL) three times and with n-hexane (20 mL) twice and then dried under reduced pressure to obtain 1.16 g of the polymerization catalyst 17.

<Preparation of Polymerization Catalyst 18>

Preparation of solid carrier 18: Silica calcinated at 600° C. (1.01 g) (Grace 948) was collected and toluene (4 mL) was added thereto. Thereafter, a toluene solution of AliBu$_2$BHT (0.25M, 4.1 mL, 1.0 mmol) was added at room temperature, followed by stirring at 70° C. for 1 hour. The toluene solution of AliBu$_2$BHT was prepared in the same manner as in Example 1. The toluene solution containing silica was washed with toluene (20 mL) three times and then dried under reduced pressure to obtain 1.18 g of the solid carrier 18.

Preparation of metal catalyst component 18: Ni(COD)$_2$ (52.3 mg, 0.190 mmol) was dissolved in 4 mL of toluene to prepare a toluene solution of 0.048M Ni(COD)$_2$. The prepared toluene solution of Ni(COD)$_2$ (4 mL) was added to B-111 (130.9 mg, 0.190 mmol) and the whole was stirred at room temperature for 30 minutes to obtain a toluene solution containing the metal catalyst component 18.

Preparation of polymerization catalyst 18: The metal catalyst component 18 (4 mL) was added to the solid carrier 18 (1.18 g) at room temperature and they were brought into contact with each other at 40° C. for 1 hour. The mixture was washed with toluene (20 mL) four times and with n-hexane (20 mL) twice and then dried under reduced pressure to obtain 1.19 g of the polymerization catalyst 18.

<Preparation of Polymerization Catalyst 19>

Preparation of solid carrier 19: Silica calcinated at 600° C. (1.01 g) (Grace 948) was collected and toluene (6 mL) was added thereto. Thereafter, a toluene solution of B(OEt)$_3$ (0.26M, 4.0 mL, 1.0 mmol) was added at room temperature, followed by stirring at 70° C. for 1 hour. Thereafter, the mixture was washed with toluene (20 mL) three times and then dried under reduced pressure to obtain 1.05 g of the solid carrier 19.

Preparation of metal catalyst component 19: Ni(COD)$_2$ (27.8 mg, 0.101 mmol) was dissolved in 4 mL of toluene to prepare a toluene solution of 0.025M Ni(COD)$_2$. The prepared toluene solution of Ni(COD)$_2$ (4 mL) was added to B-27DM (57.1 mg, 0.101 mmol) and the whole was stirred at room temperature for 30 minutes to obtain a toluene solution containing the metal catalyst component 19.

Preparation of polymerization catalyst 19: The metal catalyst component 19 (4 mL) was added to the solid carrier 19 (1.05 g) at room temperature and they were brought into contact with each other at 50° C. for 1 hour. The mixture was washed with toluene (20 mL) four times and with n-hexane (20 mL) twice and then dried under reduced pressure to obtain 0.96 g of the polymerization catalyst 19.

<Preparation of Polymerization Catalyst 20>

Preparation of solid carrier 20: Silica calcinated at 600° C. (1.17 g) (Grace 948) was collected and toluene (6.5 mL) was added thereto. Thereafter, a toluene solution of nBuLi (0.50M, 3.5 mL, 1.8 mmol) was added at room temperature, followed by stirring at 70° C. for 1 hour. Thereafter, the mixture was washed with toluene (20 mL) three times and then dried under reduced pressure to obtain 1.23 g of the solid carrier 20.

Preparation of metal catalyst component 20: Ni(COD)$_2$ (27.3 mg, 0.100 mmol) was dissolved in 4 mL of toluene to prepare a toluene solution of 0.025M Ni(COD)$_2$. The prepared toluene solution of Ni(COD)$_2$ (4 mL) was added to B-27DM (62.5 mg, 0.111 mmol) and the whole was stirred at room temperature for 30 minutes to obtain a toluene solution containing the metal catalyst component 20.

Preparation of polymerization catalyst 20: The metal catalyst component 20 (4 mL) was added to the solid carrier 20 (1.23 g) at room temperature and they were brought into contact with each other at 50° C. for 1 hour. The mixture was washed with toluene (20 mL) four times and with n-hexane (20 mL) twice and then dried under reduced pressure to obtain 1.25 g of the polymerization catalyst 20.

<Preparation of Polymerization Catalyst 21>

Preparation of solid carrier 21: Silica calcinated at 600° C. (1.00 g) (Grace 948) was collected and a toluene solution of AliBu$_3$ (0.50M, 4.0 mL, 2.0 mmol) was added at room temperature, followed by stirring for 1 hour. The toluene solution containing silica was washed with toluene (20 mL) three times and then dried under reduced pressure to obtain 1.12 g of a solid carrier 21_1. A toluene solution of BHT (0.48M, 4.2 mL, 2.0 mmol) was added to the resultant solid carrier 21_1 at room temperature, followed by stirring at 70° C. for 1 hour. The toluene solution containing silica was washed with toluene (20 mL) three times and then dried under reduced pressure to obtain 1.14 g of a solid carrier 21_2.

Preparation of polymerization catalyst 21: A toluene solution of B-195 (4.0 mL, 0.20 mmol) was added to the solid carrier 21_2 and the whole was stirred at room temperature for 60 minutes, followed by drying under reduced pressure. Thereto was added 4.0 mL of a toluene solution of Ni(COD)$_2$ (55.0 mg, 0.20 mmol), followed by stirring at 60° C. for 1 hour. The mixture was washed with toluene (20 mL) three times and with hexane (20 mL) twice and then dried under reduced pressure to obtain 1.22 g of the polymerization catalyst 21.

<Preparation of Polymerization Catalyst 22>

Preparation of solid carrier 22: Silica calcinated at 600° C. (1.00 g) (Grace 948) was collected and a toluene solution of AliBu$_3$ (0.40M, 5.0 mL, 2.0 mmol) was added at room temperature, followed by stirring for 1 hour. The solution containing silica was washed with toluene (20 mL) three times and then dried under reduced pressure to obtain 1.13 g of a solid carrier 22_1. Toluene (5 mL) was added to the resultant solid carrier 22_1 and a toluene solution of Al(OiPr)$_3$ (0.39M, 5.2 mL, 2.0 mmol) was added at room temperature, followed by stirring at 70° C. for 1 hour. The solution containing silica was washed with toluene (20 mL) three times and then dried under reduced pressure to obtain 1.12 g of a solid carrier 22_2.

Preparation of polymerization catalyst 22: A toluene solution of B-195 (5.0 mL, 0.20 mmol) was added to the solid carrier and the whole was stirred at room temperature for 30 minutes. Thereto was added 5.0 mL of a toluene solution of Ni(COD)$_2$ (55.0 mg, 0.20 mmol), followed by stirring at 70° C. for 1 hour. The mixture was washed with toluene (20 mL) three times and with hexane (20 mL) twice and then dried under reduced pressure to obtain 1.22 g of the polymerization catalyst 22.

Preparation of prepolymerization catalyst 22: Dry hexane (200 mL), a hexane solution of tri-n-octylaluminum (0.1M, 1 mL, 0.1 mmol), and nBA (0.2 mmol) were introduced into an induction-stirring-type autoclave having an inner volume of 2 L. After heating to 40° C., ethylene (0.05 MPa) was introduced and the polymerization catalyst 22 (1.0 g) was added. Ethylene was introduced up to a pressure of 0.05 MPa at every time when the pressure of ethylene decreased to 0 and the work was repeated (five times in total). By the operations, there was obtained the prepolymerization catalyst 22 containing 6.35 g of polyethylene per g of the polymerization catalyst.

4. Olefin Polymerization

Examples 1 to 23

Homopolymerization of Ethylene and Copolymerization of Ethylene Acrylate Ester Using Polymerization Catalysts 1 to 17, 21, and 22

(1) Homopolymerization of Ethylene

Examples 1 to 15, 20, and 21

Dry hexane (1 L) and a hexane solution of tri-n-octylaluminum (0.01 mL, 1 mL) were introduced into an induction-stirring-type autoclave having an inner volume of 2 L. After the autoclave was heated to 70° C. with stirring, ethylene was supplied to the autoclave up to 3.0 MPa. After completion of the adjustment, a hexane slurry of each polymerization catalyst obtained in the above-described "3. Preparation of olefin polymerization catalyst" was supplied to initiate polymerization. After polymerization was performed for 1 hour, an unreacted gas was purged, then the autoclave was opened, and filtration, washing with a solvent, and drying under heating were performed to obtain a polymer.

Table 6 shows polymerization catalysts and polymerization conditions used and physical properties of the obtained polymers. In Table 6, "Activity" represents polymer yield (g) per g of the polymerization catalyst used for the polymerization per hour of polymerization time. "BD" represents bulk density and is an apparent density in the case where a powder is placed in the loosest state in a vessel whose volume is known. Table 6 also describes weight-average molecular weight (Mw) and molecular weight distribution (Mw/Mn) obtained from the results of GPC measurement on the obtained polymers.

(2) Copolymerization of Ethylene/Acrylate Ester

Examples 16 to 19, 22, and 23

Dry toluene (0.6 L) and a predetermined amount of an acrylate ester as a comonomer were introduced into an induction-stirring-type autoclave having an inner volume of 2 L. After the autoclave was heated to 90° C. with stirring, ethylene was supplied to the autoclave up to 3.0 MPa. After completion of the adjustment, a hexane slurry of each polymerization catalyst obtained in the above-described "3. Preparation of olefin polymerization catalyst" was supplied to initiate copolymerization. After polymerization was performed for 1 hour, an unreacted gas was purged, then the autoclave was opened, and filtration, washing with a solvent, and drying under heating were performed to obtain a copolymer.

Table 6 shows polymerization catalysts and polymerization conditions used, kinds and amounts of comonomers used for the copolymerization, and physical properties of the obtained polymers. Incidentally, the comonomers were used after they were purified at room temperature under a highly pure argon atmosphere using a column packed with AldrichInhibitorRemover manufactured by Aldrich Inc.

In Table 6, tBA represents t-butyl acrylate, nBA represents n-butyl acrylate, and PA-1 represents 4-acryloyloxy-2,2,6,6-tetramethylpiperidine.

Comparative Examples 1 to 3

Homopolymerization of Ethylene Using Polymerization Catalysts 18 to 20

(3) Homopolymerization of Ethylene

Dry hexane (1 L) and a hexane solution of tri-n-octylaluminum (0.01 mL, 1 mL) were introduced into an induction-stirring-type autoclave having an inner volume of 2 L. After the autoclave was heated to 70° C. with stirring, ethylene was supplied to the autoclave up to 3.0 MPa. After completion of the adjustment, a hexane slurry of each polymerization catalyst obtained in the above-described "3. Preparation of olefin polymerization catalyst" was supplied to initiate polymerization. After polymerization was performed for 1 hour, an unreacted gas was purged, then the autoclave was opened, and filtration, washing with a solvent, and drying under heating were performed to obtain a polymer. Table 6 shows polymerization catalysts and polymerization conditions used and physical properties of the obtained polymers.

TABLE 6

| | Polymerization catalyst | Carrier-treating compound | Ligand | Pre-polymerization | Catalyst amount (mg) | Comonomer |
|---|---|---|---|---|---|---|
| Example 1 | 1 | AliBu2BHT | B-195 | No | 56 | absent |
| Example 2 | 2 | AliBu2BHT | B-200 | No | 53 | absent |
| Example 3 | 3 | AliBu2BHT | B-203 | No | 57 | absent |
| Example 4 | 4 | AliBu2BHT | B-302 | No | 60 | absent |
| Example 5 | 5 | AliBu2BHT | B-304 | No | 75 | absent |
| Example 6 | 6 | Al(OiPr)3 | B-203 | No | 136 | absent |
| Example 7 | 7 | AliBu2(OEt) | B-203 | No | 119 | absent |
| Example 8 | 8 | AliBu(OEt)2 | B-203 | No | 216 | absent |
| Example 9 | 9 | AlEt2(OEt) | B-203 | No | 62 | absent |
| Example 10 | 10 | Al(OEt)3 | B-203 | No | 136 | absent |

TABLE 6-continued

| | | | | | | |
|---|---|---|---|---|---|---|
| Example 11 | 11 | B(OnBu)3 | B-203 | No | 141 | absent |
| Example 12 | 12 | B(OEt)3 | B-203 | No | 220 | absent |
| Example 13 | 13 | Et2Zn | B-203 | No | 74 | absent |
| Example 14 | 14 | nBuLi | B-203 | No | 188 | absent |
| Example 15 | 15 | B(OEt)3 | B-195 | No | 212 | absent |
| Example 16 | 7 | AliBu2(OEt) | B-203 | No | 219 | tBA |
| Example 17 | 16 | B(OEt)3 | B-203 | No | 378 | nBA |
| Example 18 | 17 | AliBu2(OEt) | B-195 | No | 260 | nBA |
| Example 19 | 16 | B(OEt)3 | B-203 | No | 459 | PA-1 |
| Example 20 | 21 | AliBu3/BHT | B-195 | No | 82 | absent |
| Example 21 | 22 | AliBu3/Al(OiPr)3 | B-195 | Yes | 32 | absent |
| Example 22 | 21 | AliBu3/BHT | B-195 | No | 214 | nBA |
| Example 23 | 22 | AliBu3/Al(OiPr)3 | B-195 | Yes | 130 | nBA |
| Comparative Example 1 | 18 | AliBu2BHT | B-111 | No | 232 | absent |
| Comparative Example 2 | 19 | B(OEt)3 | B-27DM | No | 199 | absent |
| Comparative Example 3 | 20 | nBuLi | B-27DM | No | 265 | absent |

| | Comonomer amount (mmol) | Activity (g/g·h) | Mw (g/mol) | Mw/Mn | BD (g/cc) | Comonomer (mol %) |
|---|---|---|---|---|---|---|
| Example 1 | — | 2,130 | 1,509,000 | 5.2 | 0.33 | — |
| Example 2 | — | 4,260 | 1,626,000 | 5.2 | 0.25 | — |
| Example 3 | — | 6,320 | 1,693,000 | 6.3 | 0.26 | — |
| Example 4 | — | 3,480 | 1,634,000 | 5.3 | 0.25 | — |
| Example 5 | — | 3,330 | n.d. | n.d. | 0.25 | — |
| Example 6 | — | 650 | 2,848,000 | 5.9 | 0.33 | — |
| Example 7 | — | 3,480 | 1,330,000 | 4.6 | 0.28 | — |
| Example 8 | — | 720 | n.d. | n.d. | 0.39 | — |
| Example 9 | — | 1,330 | 2,217,000 | 4.8 | 0.39 | — |
| Example 10 | — | 350 | 1,478,000 | 3.4 | 0.4 | — |
| Example 11 | — | 580 | 1,530,000 | 3.9 | 0.41 | — |
| Example 12 | — | 760 | 1,608,000 | 4.0 | 0.39 | — |
| Example 13 | — | 580 | n.d. | n.d. | 0.4 | — |
| Example 14 | — | 270 | 1,695,000 | 4.8 | 0.36 | — |
| Example 15 | — | 230 | n.d. | n.d. | n.d. | — |
| Example 16 | 42 | 25 | 404,000 | 5.3 | 0.31 | 0.25 |
| Example 17 | 42 | 23 | 121,000 | 5.9 | n.d. | 1.36 |
| Example 18 | 42 | 110 | 930,000 | 3.5 | 0.38 | 0.29 |
| Example 19 | 16 | 110 | 660,000 | 3.7 | 0.26 | 0.03 |
| Example 20 | — | 5,830 | 995,000 | 4.1 | 0.280 | — |
| Example 21 | — | 5,810 | n.d. | n.d. | 0.316 | — |
| Example 22 | 42 | 280 | n.d. | n.d. | 0.267 | 0.18 |
| Example 23 | 42 | 430 | n.d. | n.d. | 0.376 | 0.05 |
| Comparative Example 1 | — | 1 | n.d. | n.d. | n.d. | — |
| Comparative Example 2 | — | 2 | n.d. | n.d. | n.d. | — |
| Comparative Example 3 | — | 4 | n.d. | n.d. | n.d. | — |

*n.d.: not determined

[Consideration of Comparative Results of Examples and Comparative Examples]

As is apparent from Table 6, when Examples 1 to 23 are compared to Comparative Examples 1 to 3, it is understood that the polymerization catalysts of the invention exhibit high activity and particulate polymers are obtained. The bulk density BD is used as an index for representing particle properties, and particulate polymers for which BD can be measured have been obtained in Examples 1 to 23.

While the invention has been described in detail and with reference to specific embodiments thereof, it will be apparent to one skilled in the art that various changes and modifications can be made therein without departing from the spirit and scope thereof. The present application is based on Japanese Patent Application No. 2014-150452 filed on Jul. 24, 2014, and the contents are incorporated herein by reference.

INDUSTRIAL APPLICABILITY

By using the present invention, a particulate olefin (co)polymer can be produced at high activity without using a large amount of an expensive cocatalyst, so that the olefin (co)polymer can be produced at low costs. Accordingly, the invention is industrially extremely valuable.

The invention claimed is:

1. An olefin polymerization catalyst comprising a solid carrier (1) and a metal catalyst component (2) as follows:
   Solid carrier (1): a solid carrier that has been brought into contact with $M^1(OR^b)_n R^c_{3-n}$, $ZnR^b_2$, or $LiR^b$, where:
   $M^2$ represents aluminum or boron,
   $R^b$ and $R^c$ each independently represents a hydrocarbon group having 1 to 20 carbon atoms, and
   n represents an integer of 1 to 3;
   Metal catalyst component (2): a metal catalyst component that contains a compound represented by general formula (A) or (B) and a transition metal compound (C)

containing a transition metal M belonging to Group 9, 10, or 11 of the periodic table and has a reactive group $R^a$,

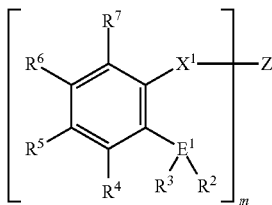

(A)

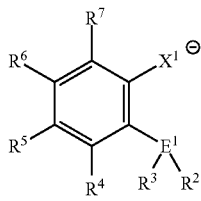

(B)

wherein:
Z is hydrogen or a leaving group;
m represents the valence of Z;
$E^1$ represents phosphorus, arsenic, or antimony;
$X^1$ represents oxygen or sulfur;
$R^2$ and $R^3$ each independently represents a hydrocarbon group having 1 to 30 carbon atoms which may contain a hetero atom, and may be combined with each other to form a ring;
$R^4$ to $R^6$ each independently represents a hydrogen atom, a halogen atom, a hydrocarbon group having 1 to 30 carbon atoms which may contain a hetero atom, a cyano group, or a nitro group;
$R^7$ represents a hydrocarbon group having 1 to 30 carbon atoms which may contain a hetero atom; and
at least one of $R^2$ to $R^7$ is necessarily a substituent containing a reactive group represented by general formula (I):

$$-Q-R^a \qquad (I)$$

where Q represents a hydrocarbon group having 1 to 20 carbon atoms which may contain a hetero atom,
$R^a$ represents $OR^8$, $CO_2R^8$, $CO^2M'$, $C(O)N(R^8)_2$, $C(O)R^8$, $SR^8$, $SO_3R^8$, $P(O)(OR^8)_{2-y}(R^9)_y$, $P(OR^9)_{3-x}(R^9)_x$, $P(R^9)_2$, $NHR^8$, $N(R^8)_2$, $Si(OR^8)_{3-x}(R^8)_x$, $OSi(OR^8)_{3-x}(R^8)_x$, $SO_3M'$, $PO_3M'_2$, $PO_3M''$, $P(O)(OR^9)_2M'$, or an epoxy-containing group;
$R^8$ represents a hydrogen atom or a hydrocarbon group having 1 to 10 carbon atoms,
$R^9$ represents a hydrocarbon group having 1 to 10 carbon atoms,
M' represents an alkali metal, an ammonium, a quaternary ammonium, or a phosphonium,
M" represents an alkaline earth metal,
x represents an integer of 0 to 3, and
y represents an integer of 0 to 2.

2. The olefin polymerization catalyst according to claim 1, which is obtained by bringing the metal catalyst component (2) into contact with the solid carrier (1).

3. The olefin polymerization catalyst according to claim 1, which is obtained by bringing a mixture resulting from contact between the compound represented by the general formula (A) or (B) and the solid carrier (1) in contact with the transition metal compound (C).

4. The olefin polymerization catalyst according to claim 1, wherein the transition metal M is nickel, palladium, platinum, cobalt, or rhodium.

5. The olefin polymerization catalyst according to claim 1, wherein the solid carrier (1) is either an inorganic oxide or a polymer carrier.

6. The olefin polymerization catalyst according to claim 1, wherein $R^a$ is $OR^8$, $CO_2R^8$, $C(O)N(R^8)_2$, $C(O)R^8$, $SR^8$, $P(R^9)_2$, $NHR^8$, $N(R^8)_2$, or $Si(OR^8)_{3-x}(R^8)_x$.

7. An olefin-prepolymerization catalyst wherein the olefin polymerization catalyst according to claim 1 is prepolymerized with an α-olefin.

8. The olefin-prepolymerization catalyst according to claim 7, wherein the prepolymerization is carried out in the presence of a Lewis base.

9. The olefin-prepolymerization catalyst according to claim 7, wherein the α-olefin is ethylene or propylene.

10. A method for producing an olefin polymer, which comprises homopolymerizing or copolymerizing an olefin having 2 or more carbon atoms in the presence of the olefin polymerization catalyst according to claim 1.

11. A method for producing an olefin/(meth)acrylate ester copolymer, which comprises copolymerizing an olefin having 2 or more carbon atoms and a (meth)acrylate ester in the presence of the olefin polymerization catalyst according to claim 1.

12. A method for producing an olefin polymer, comprising homopolymerizing or copolymerizing an olefin having 2 or more carbon atoms in the presence of the olefin-prepolymerization catalyst according to claim 7.

13. A method for producing an olefin/(meth)acrylate ester copolymer, comprising copolymerizing an olefin having 2 or more carbon atoms and a (meth)acrylate ester in the presence of the olefin-prepolymerization catalyst according to claim 7.

14. An olefin polymerization catalyst comprising a solid carrier (1) and a metal catalyst component (2) as follows:
Solid carrier (1): a solid carrier that has been brought into contact with $M^1(OR^b)_nR^c_{3-n}$, $ZnR^b_2$, or $LiR^b$, where:
$M^2$ represents aluminum or boron,
$R^b$ and $R^c$ each independently represents a hydrocarbon group having 1 to 20 carbon atoms, and
n represents an integer of 1 to 3; and
Metal catalyst component (2): a metal catalyst component that contains a metal complex represented by general formula (D):

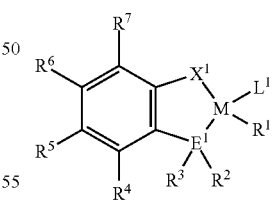

(D)

wherein:
M is a transition metal belonging to Group 9, 10, or 11 of the periodic table;
$E^1$ represents phosphorus, arsenic, or antimony;
$X^1$ represents oxygen or sulfur;
$L^1$ represents a ligand coordinated to M,
$R^1$ represents a hydrogen atom or a hydrocarbon group having 1 to 20 carbon atoms which may contain a hetero atom;
$L^1$ and $R^1$ may be combined with each other to form a ring;

$R^2$ and $R^3$ each independently represents a hydrocarbon group having 1 to 30 carbon atoms which may contain a hetero atom and may be combined with each other to form a ring;

$R^4$ to $R^6$ each independently represents a hydrogen atom, a halogen atom, a hydrocarbon group having 1 to 30 carbon atoms which may contain a hetero atom, a cyano group, or a nitro group; and $R^7$ represents a hydrocarbon group having 1 to 30 carbon atoms which may contain a hetero atom, provided that at least one of $R^2$ to $R^7$ is necessarily a substituent containing a reactive group represented by the general formula (I):

$$\text{-Q-R}^a \quad (I)$$

wherein:

Q represents a hydrocarbon group having 1 to 20 carbon atoms which may contain a hetero atom, $R^a$ represents $OR^8$, $CO_2R^8$, $CO^2M'$, $C(O)N(R^8)_2$, $C(O)R^8$, $SR^8$, $SO_3R^8$, $P(O)(OR^8)_{2-y}(R^9)_y$, $P(OR^9)_{3-x}(R^9)_x$, $P(R^9)_2$, $NHR^8$, $N(R^8)_2$, $Si(OR^8)_{3-x}(R^8)_x$, $OSi(OR^8)_{3-x}(R^8)_x$, $SO_3M'$, $PO_3M'_2$, $PO_3M''$, $P(O)(OR^9)_2M'$, or an epoxy-containing group $R^8$ represents a hydrogen atom or a hydrocarbon group having 1 to 10 carbon atoms, $R^9$ represents a hydrocarbon group having 1 to 10 carbon atoms, M' represents an alkali metal, an ammonium, a quaternary ammonium, or a phosphonium, M" represents an alkaline earth metal, x represents an integer of 0 to 3, and y represents an integer of 0 to 2.

\* \* \* \* \*

UNITED STATES PATENT AND TRADEMARK OFFICE
CERTIFICATE OF CORRECTION

PATENT NO. : 10,301,401 B2
APPLICATION NO. : 15/328196
DATED : May 28, 2019
INVENTOR(S) : Konishi et al.

Page 1 of 1

It is certified that error appears in the above-identified patent and that said Letters Patent is hereby corrected as shown below:

On the Title Page

Item (56), under FOREIGN PATENT DOCUMENTS, please change "EP 43 36 829 A1 5/1995" to --DE 43 36 829 A1 5/1995--

In the Claims

Column 56, Line 61 (Claim 1, Line 5), please change "$M^2$" to --$M^1$--

Column 58, Line 39 (Claim 14, Line 5), please change "$M^2$" to --$M^1$--

Signed and Sealed this
First Day of October, 2019

Andrei Iancu
*Director of the United States Patent and Trademark Office*